United States Patent
Kosco

(10) Patent No.: US 12,521,706 B2
(45) Date of Patent: Jan. 13, 2026

(54) PHOTOCATALYTIC REACTOR WITH WELL-DEFINED ILLUMINATION AREA ENABLING ACCURATE MEASUREMENT OF PHOTOCATALYTIC EFFICIENCY

(71) Applicant: KING ABDULLAH UNIVERSITY OF SCIENCE AND TECHNOLOGY, Thuwal (SA)

(72) Inventor: Jan Kosco, Thuwal (SA)

(73) Assignee: King Abdullah university of Science and Technology, Thuwal (SA)

( * ) Notice: Subject to any disclaimer, the term of this patent is extended or adjusted under 35 U.S.C. 154(b) by 859 days.

(21) Appl. No.: 17/717,513

(22) Filed: Apr. 11, 2022

(65) Prior Publication Data
US 2022/0339616 A1 Oct. 27, 2022

Related U.S. Application Data

(60) Provisional application No. 63/174,574, filed on Apr. 14, 2021.

(51) Int. Cl.
*B01J 35/00* (2024.01)
*B01J 8/00* (2006.01)
(Continued)

(52) U.S. Cl.
CPC .............. *B01J 35/39* (2024.01); *B01J 8/001* (2013.01); *B01J 8/0285* (2013.01); *B01J 35/45* (2024.01);
(Continued)

(58) Field of Classification Search
CPC ............ B01J 35/39; B01J 35/23; B01J 8/001; B01J 8/0285; B01J 8/067; B01J 8/0257; B01J 19/127; B01J 19/128; B01J 19/123; B01J 8/065; B01J 8/008; B01J 2219/00831; B01J 2208/00221; B01J 2219/00887; B01J 2208/00884; B01J 19/0013; B01J 19/0053; B01J 2219/0892; B01J 37/0217; B01J 23/75; B01J 35/391; B01J 2208/00044; B01J 2219/00132; B01J 2235/00;
(Continued)

(56) References Cited

U.S. PATENT DOCUMENTS

| | | | | |
|---|---|---|---|---|
| 4,517,063 A | * | 5/1985 | Cirjak | B01J 19/122 422/186 |
| 2008/0044559 A1 | * | 2/2008 | Noh | G03F 7/40 427/145 |
| 2016/0340593 A1 | * | 11/2016 | Macdonnell | B01J 8/065 |

OTHER PUBLICATIONS

Wen et al ("Recent progress of PM6:Y6-based high efficiency organic solar cells", Surface and Interfaces, 23(2021) 100921) (Year: 2021).*

(Continued)

*Primary Examiner* — Xiuyu Tai
(74) *Attorney, Agent, or Firm* — Ajay A. Jagtiani; Miles & Stockbridge P.C.

(57) ABSTRACT

The present disclosure relates to a device for accurately measuring photocatalytic efficiency. Additional embodiments of the present disclosure further relate to a method of utilizing the disclosed device, for example, to obtain accurate measurements of photocatalytic efficiency and a photocatalyst compatible with the device in the present disclosure. Application of the present disclosure may include the quantification of photocatalytic light conversion metrics such as in a research environment.

26 Claims, 42 Drawing Sheets
(40 of 42 Drawing Sheet(s) Filed in Color)

(51) Int. Cl.
  *B01J 8/02* (2006.01)
  *B01J 35/39* (2024.01)
  *B01J 35/45* (2024.01)
  *B01J 35/70* (2024.01)
  *B82Y 30/00* (2011.01)

(52) U.S. Cl.
  CPC .......... *B01J 35/733* (2024.01); *B01J 2235/00* (2024.01); *B01J 2235/15* (2024.01); *B01J 2235/30* (2024.01); *B82Y 30/00* (2013.01)

(58) Field of Classification Search
  CPC .... B01J 2208/00451; B01J 2219/00038; B01J 2219/00058; B01J 21/063; B01J 2219/0004; B01J 8/006; B01J 37/18; B01J 37/0219; B01J 9/1825; B01J 19/1818; B01J 10/007; B01J 37/0201; B01J 2219/00144; B01J 2208/00398; B82Y 30/00; C07C 27/04; C07C 29/159; C07C 31/04; C07C 31/10; C07C 41/01; C10G 2/40; C10G 2/35; C10G 2/00; C10G 2/50; C10G 2/332; C10G 2/33; C10G 2300/70; Y02P 20/52; Y02P 20/141; H01M 14/005
  See application file for complete search history.

(56) References Cited

OTHER PUBLICATIONS

Byun et al ("Conjugated polymer hydrogel photocatalysts with expandable photoactive sites in water", Chem. Mater., 2019, 31, 3381-3387). (Year: 2019).*
Buriak, J. M. Your Research Results Look Compelling, but Are They Reliable? Chem. Mater. 2014, 26, 2211-2213.
Rajeshwar, K.; Thomas, A.; Janaky, C. Photocatalytic Activity of Inorganic Semiconductor Surfaces: Myths, Hype, and Reality. J. Phys. Chem. Lett. 2015, 6, 139-147.
Kisch, H. Semiconductor Photocatalysis烟 Mechanistic and Synthetic Aspects. Angew. Chem., Int. Ed. 2013, 52, 812-847.
Snaith, H. J. The perils of solar cell efficiency measurements. Nat. Photonics 2012, 6, 337-340.
Coridan, R. H.; Nielander, A. C.; Francis, S. A.; McDowell, M. T.; Dix, V.; Chatman, S. M.; Lewis, N. S. Methods for comparing the performance of energy-conversion systems for use in solar fuels and solar electricity generation. Energy Environ. Sci. 2015, 8, 2886-2901.
Hodes, G. Photoelectrochemical Cell Measurements: Getting the Basics Right. J. Phys. Chem. Lett. 2012, 3, 1208-1213.
Buriak, J. M.; Kamat, P. V.; Schanze, K. S. Best Practices for Reporting on Heterogeneous Photocatalysis. ACS Appl. Mater. Interfaces 2014, 6, 11815-11816.
Serpone, N.; Sauve, G.; Koch, R.; Tahiri, H.; Pichat, P.; Piccinini, P.; Pelizzetti, E.; Hidaka, H. Standardization protocol of process efficiencies and activation parameters in heterogeneous photocatalysis: relative photonic efficiencies. J. Photochem. Photobiol., A 1996, 94, 191-203.
Rajeshwar, K. Solar Energy Conversion and Environmental Remediation Using Inorganic Semiconductor-Liquid Interfaces: The Road Traveled and the Way Forward. J. Phys. Chem. Lett. 2011, 2, 1301-1309.
Braslavsky, S. E.; Braun, A. M.; Cassano, A. E.; Emeline, A. V.; Litter, M. I.; Palmisano, L.; Parmon, V. N.; Serpone, N. Glossary of terms used in photocatalysis and radiation catalysis (IUPAC Recommendations 2011). Pure Appl. Chem. 2011, 83, 931-1014.
Kudo, A.; Miseki, Y. Heterogeneous photocatalyst materials for water splitting. Chem. Soc. Rev. 2009, 38, 253-278.
Chen, Z.; Dinh, H. N.; Miller, E. Photoelectrochemical Water Splitting Standards, Experimental Methods, and Protocols; Springer: New York, 2013 (EBook).
Chen, Z.; Jaramillo, T. F.; Deutsch, T. G.; Kleiman-Shwarsctein, A.; Forman, A. J.; et al. Accelerating materials development for photoelectrochemical hydrogen production: Standards for methods, definitions, and reporting protocols. J. Mater. Res. 2010, 25, 3-16.
Bisquert, J.; Gimenez, S. Photoelectrochemical Solar Fuel Production: From Basic Principles to Advanced Devices; Springer: New York, 2016 (EBook).
Kisch, H. On the Problem of Comparing Rates or Apparent Quantum Yields in Heterogeneous Photocatalysis. Angew. Chem., Int. Ed. 2010, 49, 9588-9589.
Kisch, H.; Bahnemann, D. Best Practice in Photocatalysis: Comparing Rates or Apparent Quantum Yields. J. Phys. Chem. Lett. 2015, 6, 1907-1910.
Liu, X.; Zhao, L.; Domen, K.; Takanabe, K. Photocatalytic hydrogen production using visible-light-responsive Ta3N5 photo-catalyst supported on monodisperse spherical SiO2 particulates. Mater. Res. Bull. 2014, 49, 58-65.
Kandiel, T. A.; Takanabe, K. Solvent-induced deposition of Cu—Ga—In—S nanocrystals onto a titanium dioxide surface for visible-light-driven photocatalytic hydrogen production. Appl. Catal., B 2016, 184, 264-269.
Yamakata, A.; Yoshida, M.; Kubota, J.; Osawa, M.; Domen, K. Potential-Dependent Recombination Kinetics of Photogenerated Electrons in n- and p-Type GaN Photoelectrodes Studied by Time-Resolved IR Absorption Spectroscopy. J. Am. Chem. Soc. 2011, 133, 11351-11357.
Yoshida, M.; Yamakata, A.; Takanabe, K.; Kubota, J.; Osawa, M.; Domen, K. Atr-Seiras Investigation of the Fermi Level of Pt Cocatalyst on a GaN Photocatalyst for Hydrogen Evolution under Irradiation. J. Am. Chem. Soc. 2009, 131, 13218-13219.
Townsend, T. K.; Browning, N. D.; Osterloh, F. E. Overall photocatalytic water splitting with NiOx—SrTiO3-A revised mechanism. Energy Environ. Sci. 2012, 5, 9543-9550.
Garcia-Esparza, A. T.; Takanabe, K. A simplified theoretical guideline for overall water splitting using photocatalyst particles. J. Mater. Chem. A 2016, 4, 2894-2908.
Yu, W.; Isimjan, T.; Gobbo, S. D.; Anjum, D. H.; Abdel-Azeim, S.; Cavallo, L.; Garcia-Esparza, A. T.; Domen, K.; Xu, W.; Takanabe, K. Tethering Metal Ions to Photocatalyst Particulate Surfaces by Bifunctional Molecular Linkers for Efficient Hydrogen Evolution. ChemSusChem 2014, 7, 2575-2583.
Bhunia, M. K.; Melissen, S.; Parida, M. R.; Sarawade, P.; Basset, J.-M.; Anjum, D. H.; Mohammed, O. F.; Sautet, P.; Le Bahers, T.; Takanabe, K. Denritic Tip-on Polytriazine-Based Carbon Nitride Photocatalyst with High Hydrogen Evolution Activity. Chem. Mater. 2015, 27, 8237-8247.
Buriak, J. M.; Jones, C. W.; Kamat, P. V.; Schanze, K. S.; Schatz, G. C.; Scholes, G. D.; Weiss, P. S. Virtual Issue on Best Practices for Reporting the Properties of Materials and Devices. Chem. Mater. 2016, 28, 3525-3526.
Schneider, J.; Bahnemann, D. W. Undesired Role of Sacrificial Reagents in Photocatalysis. J. Phys. Chem. Lett. 2013, 4, 3479-3483.
Ohtani, B. Preparing Articles on Photocatalysis Beyond the Illusions, Misconceptions, and Speculation. Chem. Lett. 2008, 37, 216-229.
Hoffert, M. I. et al. Advanced technology paths to global climate stability: energy for a greenhouse planet. Science 298, 981-7 (2002).
Mills, A. D. & Wiser, R. H. Strategies to mitigate declines in the economic value of wind and solar at high penetration in California. Appl. Energy 147, 269-278 (2015).
Creutzig, F. et al. The underestimated potential of solar energy to mitigate climate change. Nat. Energy 2, 17140 (2017).
Ball, M. & Weeda, M. The hydrogen economy—Vision or reality? Int. J. Hydrogen Energy 40, 7903-7919 (2015).
Jia, J. et al. Solar water splitting by photovoltaic-electrolysis with a solar-to-hydrogen efficiency over 30%. Nat. Commun. 7, 13237 (2016).
Gratzel, M. Photoelectrochemical cells. Nature vol. 414 338-344 (2001).
Pinaud, B. A. et al. Technical and economic feasibility of centralized facilities for solar hydrogen production via photocatalysis and photoelectrochemistry. Energy Environ. Sci. 6, 1983 (2013).

(56) References Cited

OTHER PUBLICATIONS

Fabian, D. M. et al. Particle suspension reactors and materials for solar-driven water splitting. Energy Environ. Sci. 8, 2825-2850 (2015).
Hisatomi, T., Kubota, J. & Domen, K. Recent advances in semiconductors for photocatalytic and photoelectrochemical water splitting. Chem. Soc. Rev. 43, 7520-7535 (2014).
Ng, B. et al. Z-Scheme Photocatalytic Systems for Solar Water Splitting. Adv. Sci. 7, 1903171 (2020).
Fujishima, A. & Honda, K. Electrochemical Photolysis of Water at a Semiconductor Electrode. Nature 238, 37-38 (1972).
Takata, T. et al. Photocatalytic water splitting with a quantum efficiency of almost unity. Nature 581, 411-414 (2020).
Maeda, K. & Domen, K. Photocatalytic Water Splitting: Recent Progress and Future Challenges. J. Phys. Chem. Lett. 1, 2655-2661 (2010).
Kosco, J., Moruzzi, F., Willner, B. & McCulloch, I. Photocatalysts Based on Organic Semiconductors with Tunable Energy Levels for Solar Fuel Applications. Adv. Energy Mater. 10, 2001935 (2020).
Dai, C. & Liu, B. Conjugated polymers for visible-light-driven photocatalysis. Energy Environ. Sci. 13, 24-52 (2019).
Kosco, J. et al. Enhanced photocatalytic hydrogen evolution from organic semiconductor heterojunction nanoparticles. Nat. Mater. 19, 559-565 (2020).
Liu, A. et al. Panchromatic Ternary Polymer Dots Involving Sub-Picosecond Energy and Charge Transfer for Efficient and Stable Photocatalytic Hydrogen Evolution. J. Am. Chem. Soc. jacs.0c12654 (2021) doi:10.1021/jacs.0c12654.
Bai, Y. et al. Accelerated Discovery of Organic Polymer Photocatalysts for Hydrogen Evolution from Water through the Integration of Experiment and Theory. J. Am. Chem. Soc. 141, 9063-9071 (2019).
Landfester, K. The Generation of Nanoparticles in Miniemulsions. Adv. Mater. 13, 765-768 (2001).
Yuan, J. et al. Single-Junction Organic Solar Cell with over 15% Efficiency Using Fused-Ring Acceptor with Electron-Deficient Core. Joule 3, 1140-1151 (2019).
Pan, M.-A. et al. 16.7%-efficiency ternary blended organic photovoltaic cells with PCBM as the acceptor additive to Increase the open-circuit voltage and phase purity. J. Mater. Chem. A 7, 20713-20722 (2019).
Wadsworth, A., Hamid, Z., Kosco, J., Gasparini, N. & McCulloch, I. The Bulk Heterojunction in Organic Photovoltaic, Photodetector, and Photocatalytic Applications. Advanced Materials vol. 32 2001763 (2020).
Wang, X. et al. Sulfone-containing covalent organic frameworks for photocatalytic hydrogen evolution from water. Nat. Chem. 10, 1180-1189 (2018).
Trasatti, S. The absolute electrode potential: an explanatory note (Recommendations 1986). J. Electroanal. Chem. Interfacial Electrochem. 209, 417-428 (1986).
Wu, J. et al. Exceptionally low charge trapping enables highly efficient organic bulk heterojunction solar cells. Energy Environ. Sci. 13, 2422-2430 (2020).
Wenderich, K. & Mul, G. Methods, Mechanism, and Applications of Photodeposition in Photocatalysis: A Review. Chem. Rev. 116, 14587-14619 (2016).
Kosco, J. et al. The Effect of Residual Palladium Catalyst Contamination on the Photocatalytic Hydrogen Evolution Activity of Conjugated Polymers. Adv. Energy Mater. 1802181 (2018) doi:10.1002/aenm.201802181.
Ran, J., Zhang, J., Yu, J., Jaroniec, M. & Qiao, S. Z. Earth-abundant cocatalysts for semiconductor-based photocatalytic water splitting. Chemical Society Reviews vol. 43 7787-7812 (2014).
Sachs, M. et al. Understanding structure-activity relationships in linear polymer photocatalysts for hydrogen evolution. Nat. Commun. 9, 4968 (2018).
Kotani, H. et al. Efficient Near-Infrared Light-Driven Hydrogen Evolution Catalyzed by a Saddle-Distorted Porphyrin as a Photocatalyst. ACS Appl. Energy Mater. 3, 3193-3197 (2020).
Jiang, W. et al. Integration of Multiple Plasmonic and Co-Catalyst Nanostructures on $TiO_2$ Nanosheets for Visible-Near-Infrared Photocatalytic Hydrogen Evolution. Small 12, 1640-1648 (2016).
Wang, P., Huang, B., Dai, Y. & Whangbo, M. H. Plasmonic photocatalysts: Harvesting visible light with noble metal nanoparticles. Physical Chemistry Chemical Physics vol. 14 9813-9825 (2012).
Jie Lv et al. Additive-induced miscibility regulation and hierarchical morphology enable 17.5% binary organic solar cells. Energy Environ. Sci. 14, 3044-3052 (2021).
Li, R. et al. Spatial separation of photogenerated electrons and holes among {010} and {110} crystal facets of $BiVO_4$. Nat. Commun. 4, 1-7 (2013).
Dimitrov, S. D. et al. Towards optimisation of photocurrent from fullerene excitons in organic solar cells. Energy Environ. Sci. 7, 1037-1043 (2014).
Cook, S., Furube, A., Katoh, R. & Han, L. Estimate of singlet diffusion lengths in PCBM films by time-resolved emission studies. Chem. Phys. Lett. 478, 33-36 (2009).
Karki, A. et al. The role of bulk and interfacial morphology in charge generation, recombination, and extraction in non-fullerene acceptor organic solar cells. Energy Environ. Sci. 13, 3679-3692 (2020).
Wang, R. et al. Charge Separation from an Intra-Moiety Intermediate State in the High-Performance PM6:Y6 Organic Photovoltaic Blend. J. Am. Chem. Soc. 142, 12751-12759 (2020).
Wang, K. et al. Interplay between Intrachain and Interchain Excited States in Donor-Acceptor Copolymers. J. Phys. Chem. B 125, 7470-7476 (2021).
Le Formal, F. et al. Rate Law Analysis of Water Oxidation on a Hematite Surface. J. Am. Chem. Soc. 137, 6629-6637 (2015).
Sachs, M. et al. Tracking Charge Transfer to Residual Metal Clusters in Conjugated Polymers for Photocatalytic Hydrogen Evolution. J. Am. Chem. Soc. 142, 14574-14587 (2020).
Pendlebury, S. R. et al. Dynamics of photogenerated holes in nanocrystalline $\alpha$-$Fe_2O_3$ electrodes for water oxidation probed by transient absorption spectroscopy. Chem. Commun. 47, 716-718 (2011).
Collado, L. et al. Unravelling the effect of charge dynamics at the plasmonic metal/semiconductor interface for $CO_2$ photoreduction. Nat. Commun. 9, 4986 (2018).
Maeda, K. et al. Photocatalytic Activities of Graphitic Carbon Nitride Powder for Water Reduction and Oxidation under Visible Light. J. Phys. Chem. C 113, 4940-4947 (2009).
Yang, W. et al. Electron Accumulation Induces Efficiency Bottleneck for Hydrogen Production in Carbon Nitride Photocatalysts. J. Am. Chem. Soc. 141, 11219-11229 (2019).
Haselmann, G. M. & Eder, D. Early-Stage Deactivation of Platinum-Loaded $TiO_2$ Using In Situ Photodeposition during Photocatalytic Hydrogen Evolution. ACS Catal. 7, 4668-4675 (2017).
Rodenberg, A. et al. Mechanism of photocatalytic hydrogen generation by a polypyridyl-based cobalt catalyst in aqueous solution. Inorg. Chem. 54, 646-657 (2015).
Lin, W.-C. et al. Effect of energy bandgap and sacrificial agents of cyclopentadithiophene-based polymers for enhanced photocatalytic hydrogen evolution. Appl. Catal. B: Environ. 298, 120577 (2021).

* cited by examiner

Prior Art

Prior Art

PM6

Y6

PC$_{71}$BM

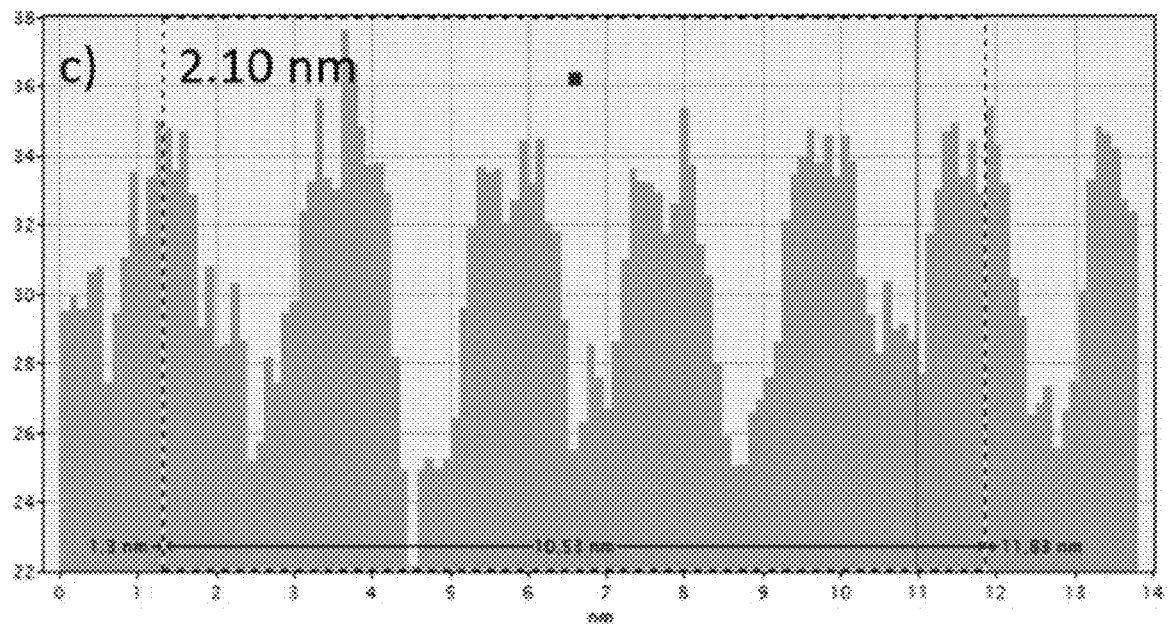
FIG. 48
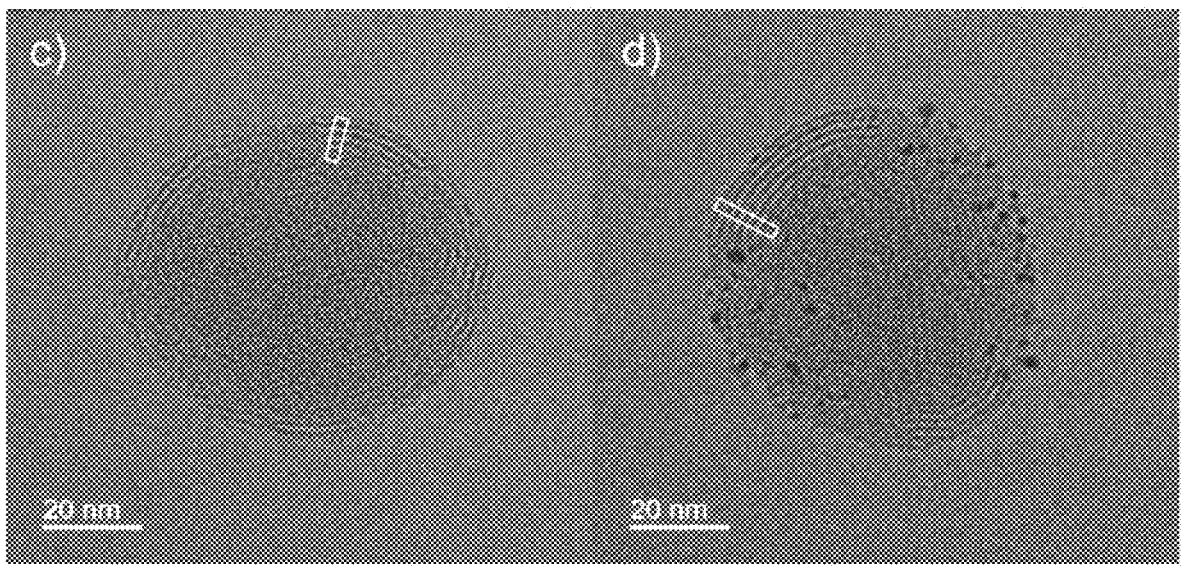
FIG. 49
FIG. 50

PHOTOCATALYTIC REACTOR WITH WELL-DEFINED ILLUMINATION AREA ENABLING ACCURATE MEASUREMENT OF PHOTOCATALYTIC EFFICIENCY

CROSS-REFERENCE TO RELATED APPLICATIONS

This application claims benefit of priority of U.S. Provisional Patent Application No. 63/174,574, entitled "Photocatalytic Reactor with Well-Defined Illumination Area Enabling Accurate Measurement of Photocatalytic Efficiency," filed Apr. 14, 2021. The entire contents and disclosures of these patent applications are incorporated herein by reference in their entirety.

BACKGROUND

Field of the Invention

The present disclosure relates to a device for accurately measuring photocatalytic efficiency. The present disclosure further relates to the use of such device to obtain accurate measurement of photocatalytic efficiency and a photocatalyst compatible with the device in the present disclosure.

Background of the Invention

To limit the effects of climate change, fossil fuels must urgently be replaced by carbon neutral energy sources.[30] Solar energy is by far the most abundant form of renewable energy but its intermittency impedes its ability to supply energy on demand.[31] Storing solar energy in the chemical bonds of a fuel is therefore highly desirable.[32] Hydrogen ($H_2$) generated from water using solar energy is one of the most promising such "solar fuels." $H_2$ can generate heat via combustion, or electricity if combined with oxygen in a fuel cell.[33] In both cases, water is the only by-product. Solar $H_2$ can be generated using photovoltaic electrolysis (PV-E),[34] photoelectrochemical cells (PEC),[35] or photocatalysis. A "particulate" system, in which photocatalyst particles are dispersed in water, is projected to be the cheapest method of generating solar $H_2$.[36] This has stimulated an intense research effort to develop particulate photocatalysts for $H_2$ evolution, $O_2$ evolution and overall water splitting.[37-39] Photocatalysts based on primarily UV-active inorganic semiconductors have been the most widely studied to date. Overall water splitting was first achieved using $TiO_2$,[40] and has recently been reported with an external quantum efficiency (EQE) of 96% at UV wavelengths (350-360 nm) using Al doped $SrTiO_3$.[41] However, less than 5% of solar energy lies in the UV spectrum.[42] Visible light active photocatalysts are therefore needed to meet the solar to hydrogen conversion efficiency ($\eta$STH) target of 5-10% deemed necessary for commercial viability.[36] This has led to the recent interest in developing photocatalysts based on organic semiconductors, which can be synthetically tuned to absorb visible light while simultaneously retaining suitable energy levels to drive a range of photocatalytic processes.[43,44] Particular attention has been given to developing photocatalysts capable of driving the hydrogen ($H_2$) evolution reaction (HER) from aqueous solutions containing a hole scavenger.[43,44] Organic nanoparticles (NPs) that contain a donor/acceptor (D/A) heterojunction are currently among the most efficient visible light active $H_2$ evolution photocatalysts (HEPs).[45-47] However, their active wavelength ranges and EQEs must be increased to achieve practical $\eta$STH. For example, a HEP operating in a Z-scheme[39] with an $O_2$ evolution catalyst (OEP) that is active up to 500 nm must achieve a minimum EQE of 30% at wavelengths up to 750 nm, or a minimum EQE of 20% at wavelengths up to 1000 nm for the Z-scheme to drive overall water splitting with 5% $\eta$STH. Relationship between the longest wavelength at which a photocatalyst is active and its maximum theoretical solar to hydrogen conversion efficiency at different external quantum efficiencies (EQEs) is shown in FIGS. 18 and 19. FIG. 18 shows the solar-to-hydrogen conversion efficiency ($\eta$STH) of a photocatalyst for one-step overall water splitting. FIG. 19 shows the $\eta$STH for overall water splitting of an $O_2$ evolution photocatalyst (OEP) and a $H_2$ evolution photocatalyst (HEP) operating in parallel in a Z-scheme. The calculations assume that the redox mediator operates with 100% efficiency and that the OEP is active at wavelengths up to 500 nm and absorbs 100% of the photons within its active wavelength range. Note that the $\eta$STH in a Z-scheme is limited by that of the less efficient photocatalyst. All calculations shown in FIGS. 18 and 19 assume AM1.5G solar irradiance. Moreover, studies addressing the photophysics that determine the function of heterojunction photocatalysts have been very limited to date, complicating the systematic optimization of photocatalyst performance.

Heterogeneous photocatalysis is a potentially competitive solution for the direct production of solar fuels. This research field has seen tremendous growth over the last five decades. However, it is becoming increasingly difficult to compare the efficiencies of heterogeneous photocatalyst powders, because different researchers report their results in different ways. The lack of rigorous measurement standard has hindered progress in the field of photocatalysis because results measured by different research groups are not easily comparable and often inaccurate. Although efforts have been made to create standards for reporting data in this field, there continues to be a discrepancy in published works.

Therefore, improved devices and methods of accurately measuring the efficiency of photocatalysis to ensure reproducibility and effective benchmarking in future research is needed.

SUMMARY

According to a first broad aspect of the present disclosure, a photocatalytic reactor capable of accurately measuring photocatalytic efficiency is provided. The photocatalytic reactor may comprise a lid; a gas tight seal; prism shaped cavity; a glass enclosure; and at least one of a photocatalyst solution, gel, powder, film or suspension, wherein the at least one of the photocatalyst solution, gel, powder, film or suspension is placed inside the prism shaped cavity, wherein the lid is disposed above the glass enclosure with the gas tight seal disposed between the lid and the glass enclosure to ensure that the photocatalytic reactor is gas-tight.

According to a second broad aspect of the present disclosure, a method of accurately measuring the photocatalytic efficiency is provided. The method may comprise steps: loading a photocatalyst, reactant(s), and solvent into the PTFE insert inside the photocatalytic reactor; closing the photocatalytic reactor; connecting the photocatalytic reactor to a gas analyzer through glass manifold connected to tubes on both sides of the lid of the photocatalytic reactor; evacuating and filling the photocatalytic reactor with a specific gas mixture to reach a predetermined pressure; stirring and cooling and/or heating the gas mixture; illuminating the photocatalytic reactor; measuring the quantities of evolved gases; and measuring the photon flux including the intensity and distribution of an incident light.

According to a third broad aspect of the present disclosure, a photocatalytic reactor capable of accurately measuring photocatalytic efficiency is provided. The photocatalytic reactor may comprise a light source above the reactor, a lid, a gas tight seal, a polytetrafluoroethylene (PTFE) inserts with prism shaped sample cavity, a glass enclosure and photocatalyst solution, gel, powder, film or suspension. In some embodiments, the photocatalytic reactor may further comprise a magnetic stirring bar and a heating, cooling, and/or thermostatic device.

According to a third broad aspect of the present disclosure, a solar fuel photocatalyst is provided. The photocatalyst comprising: at least one electron donor; and at least one electron acceptor, wherein the photocatalyst is an organic semiconductor nanoparticle (NP), and wherein the at least one electron donor and the at least one electron acceptor are conjugated.

The objects of the present disclosure are also solved by an application of the device and method in a research environment to quantify important photocatalytic light conversion metrics.

BRIEF DESCRIPTION OF THE DRAWINGS

The patent or application file contains at least one drawing executed in color. Copies of this patent or patent application publication with color drawing(s) will be provided by the office upon request and payment of the necessary fee.

The accompanying drawings, which are incorporated herein and constitute part of this specification, illustrate exemplary embodiments of the invention, and, together with the general description given above and the detailed description given below, serve to explain the features of the invention.

FIG. 48 is a graph showing the profiles of the periodic spacings in the lower rectangle in FIG. 44 according to an exemplary embodiment of the present disclosure.

FIG. 49 is a bright field cryo-TEM image showing the PM6:PCBM 2:8 NPs before photodeposition of 10 wt. % Pt and 20 h $H_2$ evolution according to an exemplary embodiment of the present disclosure.

FIG. 50 is a bright field cryo-TEM image showing the PM6:PCBM 2:8 NPs after photodeposition of 10 wt. % Pt and 20 h $H_2$ evolution according to an exemplary embodiment of the present disclosure.

DETAILED DESCRIPTION OF THE INVENTION

Definitions

Figure 1:
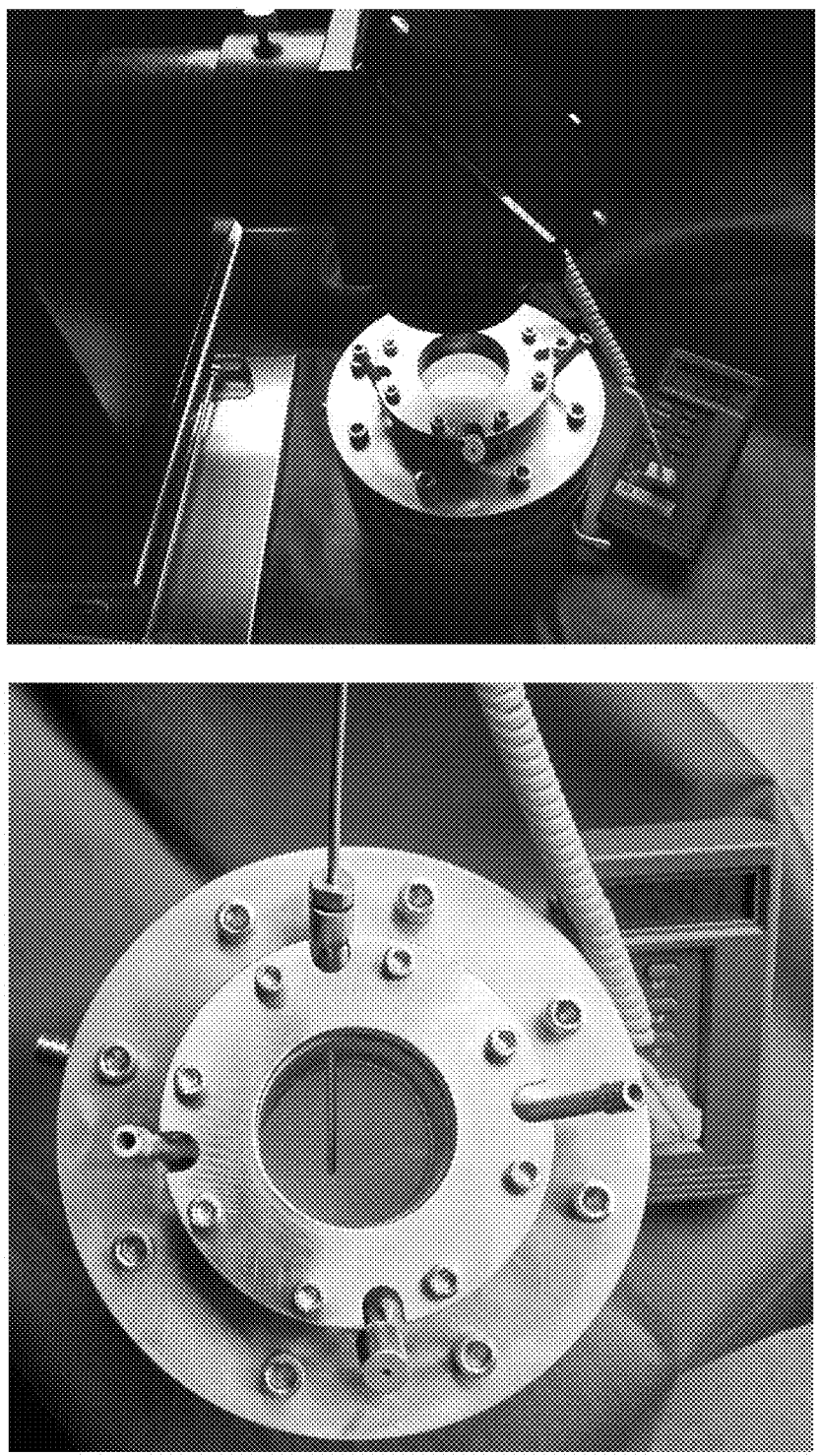
FIG. 1 illustrates an exemplary top irradiation reactor type conventionally known in the prior art.

Where the definition of terms departs from the commonly used meaning of the term, applicant intends to utilize the definitions provided below, unless specifically indicated.

Unless defined otherwise, all technical and scientific terms used herein have the same meaning as is commonly understood to which the claimed subject matter belongs. In the event that there is a plurality of definitions for terms herein, those in this section prevail. All patents, patent applications and publications referred to herein are incorporated by reference. Where reference is made to a URL or other such identifier or address, it is understood that such identifiers can change and particular information on the internet can come and go, but equivalent information can be found by searching the internet. Reference thereto evidences the availability and public dissemination of such information.

It is to be understood that the foregoing general description and the following detailed description are exemplary and explanatory only and are not restrictive of any subject matter claimed. In this application, the use of the singular includes the plural unless specifically stated otherwise. It must be noted that, as used in the specification and the appended claims, the singular forms "a," "an" and "the" include plural referents unless the context clearly dictates otherwise. In this application, the use of "or" means "and/or" unless stated otherwise. Furthermore, use of the term "including" as well as other forms, such as "include," "includes," and "included," is not limiting.

For purposes of the present disclosure, the term "comprising," the term "having," the term "including," and variations of these words are intended to be open-ended and mean that there may be additional elements other than the listed elements.

For purposes of the present disclosure, directional terms such as "top," "bottom," "upper," "lower," "above," "below," "left," "right," "horizontal," "vertical," "up," "down," etc., are used merely for convenience in describing the various embodiments of the present disclosure. The embodiments of the present disclosure may be oriented in various ways. For example, the diagrams, apparatuses, etc., shown in the drawing figures may be flipped over, rotated by 90° in any direction, reversed, etc.

For purposes of the present disclosure, a value or property is "based" on a particular value, property, the satisfaction of a condition, or other factor, if that value is derived by performing a mathematical calculation or logical decision using that value, property or other factor.

For purposes of the present disclosure, it should be noted that to provide a more concise description, some of the quantitative expressions given herein are not qualified with the term "about." It is understood that whether the term "about" is used explicitly or not, every quantity given herein is meant to refer to the actual given value, and it is also meant to refer to the approximation to such given value that would reasonably be inferred based on the ordinary skill in the art, including approximations due to the experimental and/or measurement conditions for such given value.

For purposes of the present disclosure, the term "energy conversion efficiency" refers to the ratio between the useful energy delivered or bound and the energy supplied, i.e., energy output/energy input. The term "efficiency," if used alone, is interchangeable with "energy conversion efficiency." Energy conversion efficiency or efficiency can be calculated as:

$$\text{efficiency (\%)} = \frac{\text{energy output}}{\text{energy input}} \times 100$$

For purposes of the present disclosure, the term "quantum efficiency" or "QE" refers to the rate of a given photophysical or photochemical process divided by the total absorbed photon flux. QE can be calculated as:

$$QE = \frac{\text{rate of reactant consumed or product formed}}{q_p}$$

where $q_p$ is the photon flux, which is defined as:

$$q_p = \frac{dN_p}{dt}$$

where $N_p$ is the number of photons.

For purposes of the present disclosure, the term "quantum yield" or "QY" refers to the number of defined events, occurring per photon absorbed by the system at a specified wavelength. QY can be calculated as:

$$\phi(\lambda) = \frac{\text{amount of reactant consumed or product formed}}{\text{amount of photons absorbed}}$$

For purposes of the present disclosure, the term "photonic efficiency" refers to the ratio of the rate of the photoreaction measured for a specified time interval (usually the initial conditions) to the rate of incident photons within a defined wavelength interval inside the irradiation window of the reactor. Photonic efficiency can be calculated as:

$$\xi(\lambda) = \frac{\text{rate of photochemical reaction}}{I_0(\lambda)}$$

where $I_0$ is the incident photons under initial conditions.

For purposes of the present disclosure, the term "photonic yield" refers to the ratio of the rate of the photoreaction measured for a specified time interval (usually the initial conditions) to the rate of incident photons of monochromatic light inside the irradiation window of the reactor. Photonic yield can be calculated as:

$$\xi(\lambda) = \frac{\text{rate of photochemical reaction}}{q_{p,\lambda}^0}$$

where represents the photon flux under initial conditions for monochromatic light.

For purposes of the present disclosure, the term "prism" (geometry) refers to a polyhedron comprising an n-sided polygonal base, a second base which is a translated copy (rigidly moved without rotation) of the first, and n other faces (necessarily all parallelograms) joining corresponding sides of the two bases. All cross-sections parallel to the bases are translations of the bases. Prisms may be named for their bases and be considered as a subclass of the prismatoids.

For purposes of the present disclosure, the term "optical prism" refers to a transparent optical element with flat, polished surfaces that refracts light. At least one surface must be angled. Traditional geometrical shapes of an optical prism may include that of a triangular prism with a triangular base and rectangular sides, and in colloquial use "prism" may refer to this type. Some types of optical prism are not in fact in the shape of geometric prisms. Prisms can be made from any material that is transparent to the wavelengths for which they are designed. Typical materials may include glass, plastic, and fluorite.

For purposes of the present disclosure, the term "apparent quantum yield" or "AQY" refers to the number of reacted electrons occurring per incident photon by the system at a specified wavelength. AQY can be calculated as:

$$AQY(\lambda)\ (\%) = \frac{\text{number of reacted electrons}}{I(\lambda)} \times 100$$

For purposes of the present disclosure, the term "external quantum efficiency," "EQE," "incident photon-to-current efficiency" and "IPCE" are used interchangeably. These terms may refer to the photocurrent collected per incident photon flux, as a function of illumination wavelength [essentially photonic efficiency]. EQE can be calculated as:

$$EQE(\lambda) = IPCE(\lambda) = \frac{\text{electrons cm}^{-2}\text{s}^{-1}}{\text{photons cm}^{-2}\text{s}^{-1}}$$
$$= \frac{|j_{ph}(\text{mAcm}^{-2})| \times 1239.8(V \times \text{nm})}{P_{mono}(\text{mWcm}^{-2}) \times \lambda(\text{nm})}$$

The terms "external quantum efficiency" and "EQE" refer to the only measure of $H_2$ evolution efficiency that controls for the large differences in illumination area, light spectrum, and light intensity between different experimental setups. Comparing photocatalyst EQEs over a broad wavelength range is therefore currently the most reliable way of comparing photocatalyst efficiencies measured under different conditions. Alternatively, the area normalized HER rates ($\mu$molh$^{-1}$ cm$^{-2}$) can be used to make reliable efficiency comparisons if the illumination area can be accurately quantified, and the light spectrum and intensity used to measure the HER rates correspond to standard AM1.5g 1 sun conditions. If measured under these standard conditions, the area normalized HER rate (mol h$^{-1}$ cm$^{-2}$) describes the efficiency of a photocatalyst in terms of the ratio of light power in to the amount of hydrogen out. The area normalized HER rates could then be directly compared between photocatalysts measured by different research groups. In the context of present disclosure, EQE is the ratio of two times the number of hydrogen molecules generated by a photocatalyst to the number of photons of a given energy shining on the photocatalyst.

For purposes of the present disclosure, the term "internal quantum efficiency," "IQE," "absorbed photon-to-current efficiency" and "APCE" are used interchangeably. These terms may refer to the photocurrent collected per absorbed photon flux, as a function of illumination wavelength [essentially quantum efficiency]. IQE can be calculated as:

$$IQE(\lambda) = APCE(\lambda) = \frac{\text{electrons cm}^{-2}\text{s}^{-1}}{\text{absorbed photons cm}^{-2}\text{s}^{-1}}$$
$$= \frac{|j_{ph}(\text{mAcm}^{-2})| \times 1239.8(V \times \text{nm})}{P_{mono}(\text{mWcm}^{-2}) \times \lambda(\text{nm}) \times (1 - 10^{-A})}$$

For purposes of the present disclosure, the term "applied bias photon-to-current efficiency" or "ABPE" refers to the chemical energy produced from the difference of the thermodynamic potential and the applied bias divided by solar energy input from sunlight incident on the process (e.g., STH bias). ABPE can be calculated as:

$$ABPE = \left[\frac{j_{sc}(\text{mAcm}^{-2}) \times (V_{redox} - V_{app}) \times \eta_p}{P_{light}(\text{mWcm}^{-2})}\right]_{AM1.5G}$$

For purposes of the present disclosure, the term "solar-to-hydrogen efficiency" or "STH" refers to the chemical energy of the hydrogen produced divided by solar energy input from sunlight incident on the process. STH can be calculated as:

$$STH = \left[\frac{(\text{mmol}H_2 s^{-1}) \times (237000 J\text{mol}^{-1})}{P_{total}(\text{mWcm}^{-2}) \times \text{area (cm}^2)}\right]_{AM1.5G}$$

or $STH=[\int_{\lambda_1}^{\lambda_f} QE]_{AM1.5G}$, where QE is the quantum efficiency $$STH = \left[\frac{|j_{sc}(\text{mAcm}^{-2})| \times (1.23V) \times \eta_F}{P_{total}(\text{mWcm}^{-2})}\right]_{AM1.5G}$$

For purposes of the present disclosure, the term "reactor," "photoreactor" and "photocatalytic reactor" are used interchangeably. These terms refer to a device, in which the photocatalytic reactions occur.

For purposes of the present disclosure, the term "thermostatic block" refers to a device that allows heating and for some also cooling tubes or glass containers. They may employ in the field of PCR (polymerase chain reaction), used more generally for sample preparations and reactions requiring heating, and also used for high temperature chemical reactions or to carry out evaporations.

For purposes of the present disclosure, the term "thermostatic bath" refers to a type of mixer shower which features a thermostatic valve that maintains a constant water temperature. The thermostatic valve is what makes this type of unique, mixing both hot and cold water together to a consistent and predetermined temperature.

For purposes of the present disclosure, the term "long-lived" refers to the existence of charged residuals on ms-s timescale.

For purposes of the present disclosure, the term "uncertainty" refers to the experimenter's best estimate of how far an experimental quantity might be from the "true value." The uncertainty in derived quantities is calculated using experimental uncertainty analysis, which is a technique that analyses a derived quantity, based on the uncertainties in the experimentally measured quantities that are used in some form of mathematical relationship to calculate that derived quantity.

For purposes of the present disclosure, the terms "reversible hydrogen electrode" and "RHE" are used interchangeably. These terms refer to a reference electrode, more specifically a subtype of the standard hydrogen electrodes, for electrochemical processes.

Description

While the invention is susceptible to various modifications and alternative forms, specific embodiment thereof has been shown by way of example in the drawings and will be described in detail below. It should be understood, however that it is not intended to limit the invention to the particular forms disclosed, but on the contrary, the invention is to cover all modifications, equivalents, and alternatives falling within the spirit and the scope of the invention.

Figure 25:
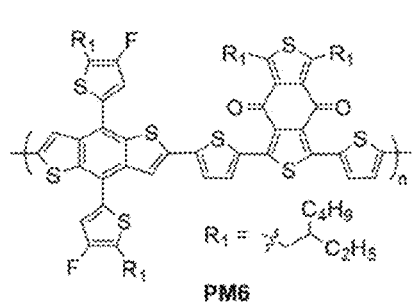
FIG. 25 is a figure illustrating the chemical structures of the organic semiconductors PBDB-T-2F (PM6) according to an exemplary embodiment of the present disclosure.
Figure 26:
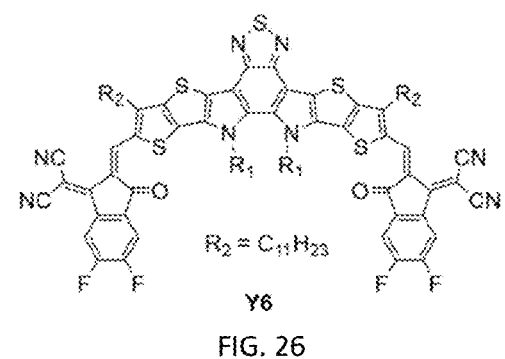
FIG. 26 is a figure illustrating the chemical structures of the organic semiconductors BTP-4F (Y6) according to an exemplary embodiment of the present disclosure.
Figure 27:
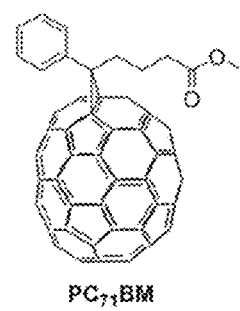
FIG. 27 is a figure illustrating the chemical structures of the organic semiconductors [6,6]-Phenyl C71 butyric acid methyl ester (PCBM) according to an exemplary embodiment of the present disclosure.

In one embodiment, two organic NP HEPs containing a donor/acceptor (D/A) heterojunction were developed. The NPs were formed from blends of the donor polymer PBDB-T-2F (PM6) matched with either the narrow bandgap non-fullerene acceptor BTP-4F (Y6) or the fullerene [6,6]-Phenyl C71 butyric acid methyl ester (PCBM/PC$_{71}$BM). The structure of PM6, Y6 and PC71BM are shown in FIGS. 25-27, respectively.

In one embodiment, both PM6:Y6 and PM6:PCBM NP photocatalysts are among the most efficient organic HEPs reported to date.

FIG. 1 illustrates an exemplary conventional irradiation reactor. Such reactors are known to lack of control over uniformity of light intensity over large illumination area or take into account differences in illumination intensity, because the shape and area of the illumination cross section is different from that of commercially available reference cells. In addition, the employed design of the cooling jacket can impede magnetic stirring. Furthermore, the convention design cannot measure light absorption by sample in situ due to its opaque sample cavity.

Figure 2:
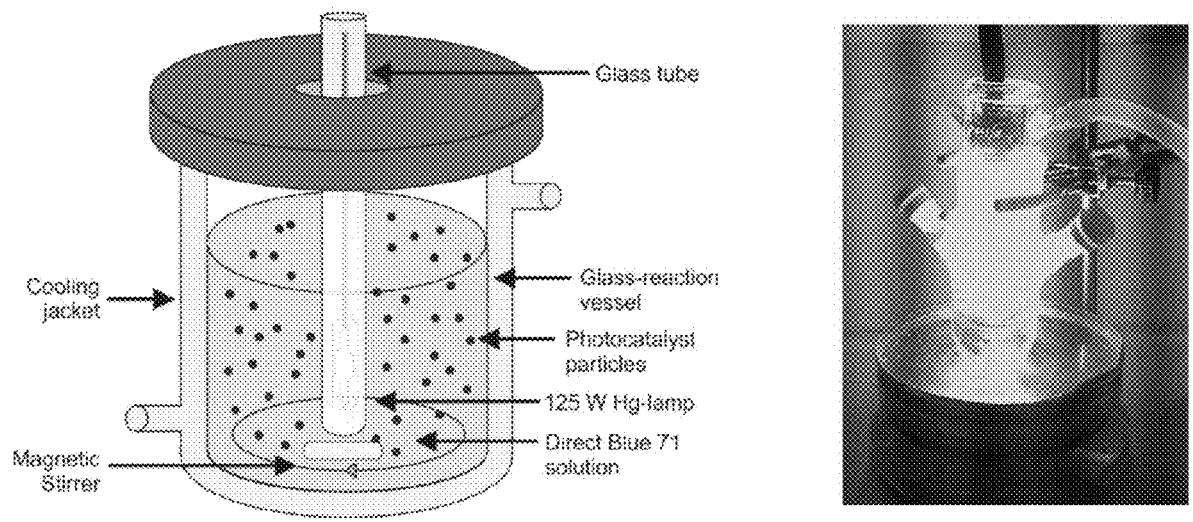
FIG. 2 illustrates an exemplary immersion well reactor type conventionally known in the prior art.

FIG. 2 illustrates an exemplary conventional design for an immersion well reactor. Drawbacks of the immersion well design include difficulties in measuring light intensity inside the vessel accurately. It is also difficult to ensure uniform irradiation throughout the sample volume. The immersion well design may not be compatible with a solar simulator or other external light source. Also, particle suspensions tend to sediment, which leads to a higher photocatalyst concentration near the bottom of the reactor and non-uniform illumination throughout the volume of the suspension. This can lead to inaccurate measurement of the photocatalytic activity. Moreover, the curved reactor sides diffract light, which makes accurate measurements of sample absorption difficult.

Figure 3:
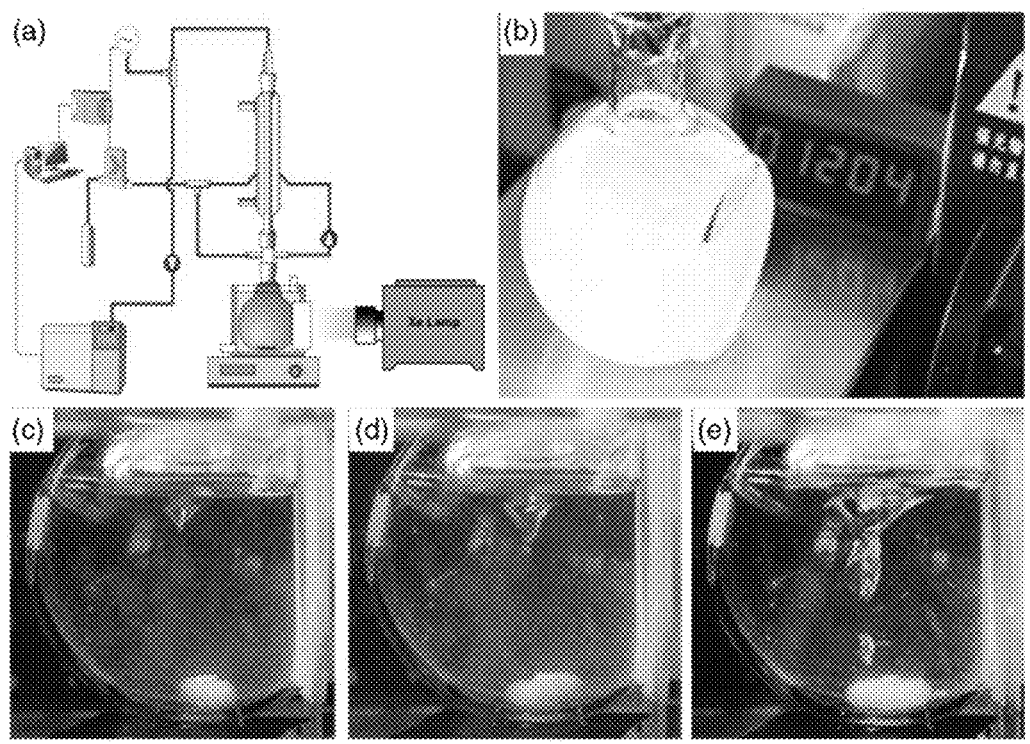
FIG. 3 illustrates an exemplary side irradiation reactor design conventionally known in the prior art.

The side irradiation reactors employed, for example, in FIG. 3 illustrate limitations of the convention design. In FIG. 3, Panel (a) shows a typical system for photocatalytic hydrogen production, of which main components include photocatalytic reactor, magnetic stirrer, light source, gas flowmeter, gas chromatography, computer, etc.; Panel (b) is an image for a typical side-irradiation Pyrex cell containing 0.5 g/L TiO$_2$ slurry, of which the flat optical window is for receiving incident light; Panels (c) to (e) are images for the magnetically stirred photocatalytic reactor (MSPR) stirred at speeds of 900, 1200, and 1500 rpm, respectively, with 0.02 g/L TiO$_2$ loading. Particle suspensions tend to sediment, which leads to a higher photocatalyst concentration near the bottom of the reactor and non-uniform illumination throughout the volume of the suspension. This can lead to an underestimation of photocatalytic activity, because substantially 100% of the sample is not within the illumination area substantially 100% of the time. Again, curved reactor sides tend to diffract light which makes accurate measurements of sample absorption difficult. In addition, the illumination area is difficult to define.

Thus, advantages of the present disclosure are pertinent to quantify important photocatalytic light conversion metrics including, but not limited to, the external quantum efficiency, solar conversion efficiency, and internal quantum efficiency for homogenous and/or heterogenous photocatalysts. The present disclosure addresses widely known problems within the field of photocatalysis which lacks rigorous measurement standards thereby hindering progress, because results, for example, measured by different research groups are not easily comparable and often inaccurate. The device in the present disclosure addresses the aforementioned need(s).

Accordingly, the present disclosure relates to a device for accurately measuring photocatalytic efficiency. Additional embodiments of the present disclosure further relate to a method of utilizing the disclosed device, for example, to obtain accurate measurements of photocatalytic efficiency. Application of the present disclosure may include the quantification of important photocatalytic light conversion metrics such as in a research environment.

According to a first broad aspect, the present disclosure provides a photocatalytic reactor for measuring the light conversion efficiency of a photocatalytic process in which (a) gas(es) is/are evolved from a liquid containing (a) homogenous and/or (a) heterogeneous photocatalyst(s).

In accordance with some disclosed embodiments, the present disclosure may include a photocatalytic reactor for measuring the light conversion efficiency of a photocatalytic process in which (a) gas(es) is/are evolved from a liquid containing (a) homogenous and/or (a) heterogeneous photocatalyst(s). The disclosed reactor is preferably gas-tight and can be operated under pressures ranging, for example, from approximately 1-1000 mmHg. The disclosed reactor temperature can be controlled by partial immersion in a liquid or by fitting it inside a heating or cooling block. The disclosed reactor can accommodate a magnetic stirring bar for stirring the mixture with a magnetic stirrer. The disclosed reactor may include optical glass windows, a precisely defined illumination area and a generally straight vertical light path that enables accurate measurement of photocatalytic light conversion metrics including, but not limited to, the external quantum efficiency (EQE), solar conversion efficiency, the internal quantum efficiency (IQE), and mass-normalized product production rates.

The disclosed reactor is suitable for measuring homogenous and/or heterogeneous photocatalysts. The disclosed reactor may be configured to be illuminated from above and cooled and stirred from below. The working sample of the disclosed reactor is confined inside the reactor within a cavity inside an inert PTFE insert having a predetermined cross-section. In some disclosed embodiments, the cross-section includes a square vertical cross-section with a precisely defined area. The PTFE insert acts as a shadow mask to precisely define the photocatalyst illumination area. It also confines substantially 100% of the photocatalyst within the light path substantially 100% of the time. The PTFE insert may include a window at the bottom which allows the measurement of light transmission. Because the sample is stirred from below, the photocatalyst distribution throughout the cross-section of the light beam is homogenous. Because the sample is cooled from below, the photocatalytic reactor is configured such that no condensation forms on the optical glass window at the top of the reactor, leaving a clear light path to the sample. Therefore, when used with a light source that has homogenous light intensity throughout the illumination area, such as a solar simulator, the disclosed reactor ensures that substantially 100% of the photocatalyst is illuminated substantially 100% of the time with light of a known spectrum and intensity. This is essential for the accurate measurement of the light conversion metrics mentioned above.

In alternate embodiments, other types of inserts may be utilized. For example, in principle any suitable material (e.g., glass, ceramic, stainless steel, etc.) that does not react with any part of the reaction mixture could be used to form the insert. The disclosed PTFE insert is selected in some embodiments, because it lends itself towards the easiest/convenient way to build the disclosed prototype design.

In contrast, convention reactors, such as those where the sample is illuminated from the side, not all of the photocatalyst is illuminated at any one time, and photocatalyst distribution throughout the light path may not be homogenous due to sedimentation. Designs in which the sample is illuminated from below cannot be stirred without the stirrer bar shading the sample. The illumination area of designs in which the light source is immersed within the photocatalyst mixture is not well defined.

During operation of the disclosed embodiment(s), the photocatalyst, reactant(s), and solvent are loaded into the PTFE insert inside the disclosed reactor. The disclosed reactor is then closed and connected to a glass manifold connected to a gas analyzer. The reactor can then be evacuated and filled with a specific gas mixture at a desired pressure. It is then stirred, left at room temperature, cooled and/or heated, and illuminated. The quantities of evolved gases may be analyzed by the gas analyzer.

Figure 4:
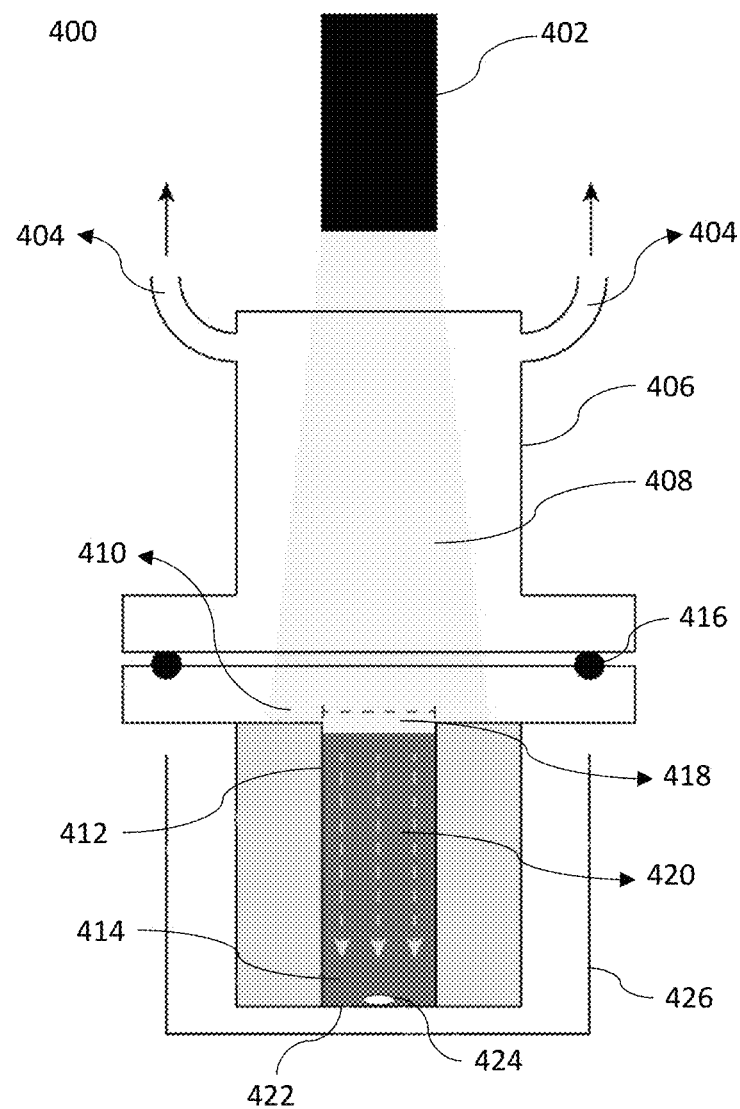
FIG. 4 illustrates the side view of an exemplary reactor according to one embodiment of the present disclosure.

Turning to the figures, FIG. 4 illustrates the side view of an exemplary photocatalytic reactor 400. As shown in FIG. 4, photocatalytic reactor 400 comprises a light source 402 (e.g., solar simulator, xenon lamp fitted with a bandpass filter, and/or light emitting diode), a lid 406, gas tight seal 416, prism shaped sample cavity 412, optical window 422 and photocatalyst solution, gel, powder, film or suspension 414. The optical window 422 may allow the measurement of light absorption by sample. The gas tight seal 416 is configured to operate at high and/or low pressure. A photocatalyst illumination area 418 is precisely defined by photocatalytic reactor 400 wall.

A prism shaped sample cavity 412 is defined in the photocatalytic reactor, which may be cuboid or cylinder. In geometry, the disclosed prism is a polyhedron comprising an n-sided polygonal base, a second base which is a translated copy of the first, and n other faces joining corresponding sides of the two bases. All cross-sections parallel to the bases are translations of the bases. In principle, any 2D shape could be used as the base of the prism (square, circle, octagon, star, triangle, etc.), because the only requirement is that the area of the shape is precisely known. This defines the illumination area. However, the 3D shape of the cavity must be a prism (e.g., see geometric definition above) so that all of the photocatalyst is confined within the illumination area substantially 100% of the time. The disclosed PTFE insert is selected in some embodiments, because it lends itself towards a convenient way to build the disclosed prototype design.

Thus, an important aspect of the disclosed embodiment may include the disclosed cavity with a precisely defined cross-sectional area which defines the illumination area and confines all of the photocatalyst within the light path substantially 100% of the time. If the prism shaped cavity was formed a different way, for example by forming it directly out of the glass walls of the bottom part of the disclosed reactor and placing a shadow mask on top, the disclosed design will work just as well.

Photocatalyst solution, gel, powder, film or suspension 414, may be kept in the prism shaped sample cavity 412. The light pass through photocatalyst illumination area 418 and photocatalyst sample forms a vertical light path 420 (e.g., emanating from light source 402), that ensures even illumination. The optical glass windows 422, a precisely defined illumination area 418 and a generally straight vertical light path 420 enable accurate measurement of photocatalytic light conversion metrics including, but not limited to, the external quantum efficiency (EQE), solar conversion efficiency, the internal quantum efficiency (IQE), and mass-normalized product production rates. The light source 402 is placed above the reactor. FIG. 4 also illustrates the light beam 408 from the light source 402, vertical light path through photocatalyst sample 420 and photocatalyst illumination area 418 precisely defined by reactor walls. Part of the light beam 408 falls outside the illumination area, because it is blocked or reflected away from sample by reactor walls. The light outside the illumination area 410 is also shown in FIG. 4. The light outside the illumination area 410 is configured to be blocked or reflected away from the sample by the disclosed reactor walls. The tubes on both sides of the lid 406, are connected to a gas manifold and detector for gas sampling 404, as shown in FIG. 4.

In one embodiment, the light source 402 may include a xenon lamp (Cermax® Model PE300-BF, or Asahi Model Max-303) or a solar simulator (San-EI® electric). In one embodiment, photocatalytic reactor 400 can accommodate a magnetic stirring bar 424 for stirring the mixture with a magnetic stirrer, as shown in FIG. 4. The magnetic stirring bar 424 is place at the bottom of the reactor. By placing the light source above the reactor and the stirring bar at the bottom, the photocatalyst distribution throughout the cross-section of the light beam (e.g., from a light source) is homogenous.

In one embodiment, the vertical prism shaped sample cavity 412 ensures that substantially 100% of the photocatalyst sample is held within the illumination area substantially 100% of the time, even if particle suspensions are used and sedimentation occurs. The prism shaped sample cavity 412 may comprise additional shapes, such as, for example a rectangular design. As long as the 3D shape of the sample cavity is a prism, and the direction of light is perpendicular to the plane of the base of the prism, the base of the prism can take any shape.

In another embodiment, the reactor further comprises a heating, cooling, and/or thermostatic device 426, such as water bath, heating block, Peltier cooler, etc., as shown in FIG. 4. Disclosed embodiments may include functionality of the device that may be used to control the temperature of the reaction mixture such as a thermostatic block (e.g., thermostatic block from Sysmatec) or a water/oil bath (e.g., thermostatic bath from Thomas Scientific®). Embodiments of the present disclosure provide functionality to only heat the sample, only cool the sample, and/or perform both heating and cooling.

The heating/cooling/thermostatic device 426 is placed at the bottom of the reactor. The reactor temperature can be controlled by partial immersion in a liquid or by fitting it inside the heating/cooling/thermostatic device. Because the sample is heated/cooled from below, no condensation forms on the optical glass window at the top of the reactor, leaving a clear light path to the sample. Therefore, when used with a light source that has homogenous light intensity throughout the illumination area, such as a solar simulator, the reactor ensures that substantially 100% of the photocatalyst is illuminated substantially 100% of the time with light of a known spectrum and intensity. This is essential for the accurate measurement of the light conversion metrics mentioned above.

Figure 5:
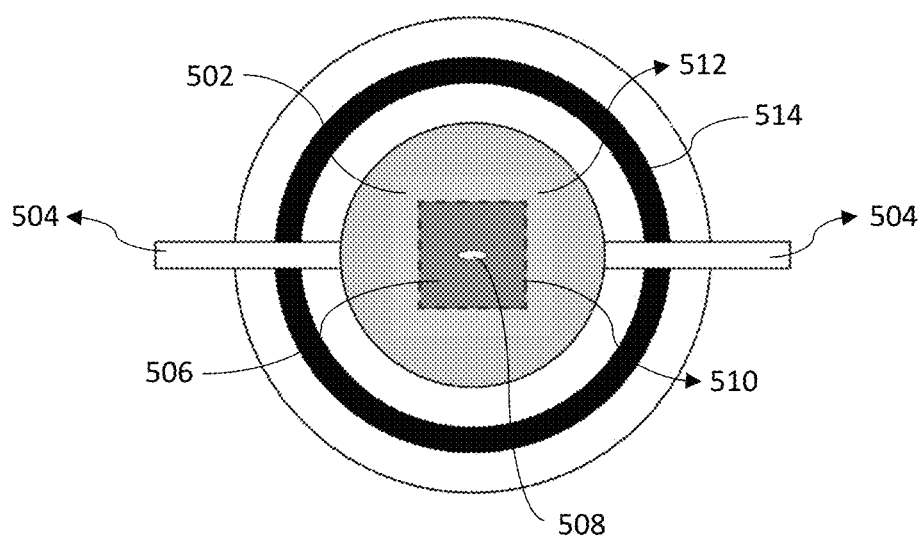
FIG. 5 illustrates a top view of the disclosed reactor according to one embodiment of the present disclosure.

FIG. 5 is the top view of the reactor, showing components of the reactor including photocatalyst solution, powder, film, gel or suspension 506, photocatalyst illumination area 510, light beam 512 and gas tight seal 514. Part of the light beam 512 falls outside the illumination area, because it is blocked or reflected away from sample by reactor walls. The photocatalyst illumination area 510 is precisely defined by photocatalytic reactor walls. The cavity also defined by photocatalytic reactor walls is filled with photocatalyst solution, powder, film, gel or suspension 506, The light outside the illumination area 502 is also shown in FIG. 5. The tubes on both sides of the reactor, are connected to gas manifold and detector for gas sampling 504, as shown in FIG. 5.

Components in FIG. 5 are illustrative and thus the dimensions are approximate. Thus, the elements are not exactly to scale.

In one embodiment, the reactor can accommodate a magnetic stirring bar 508 for stirring the mixture with a magnetic stirrer, as shown in FIG. 5. In another embodiment, the gas tight seal 514 ensures that the reactor is gas-tight and the samples can be measured at above or below atmospheric pressure. In a preferred embodiment, the reactor can be operated to measure the sample, for example, under pressures ranging from approximately 1-1000 mmHg.

In one embodiment, the dimensions of the illumination area may be precisely defined to allow accurate measurement of the irradiance incident and light intensity over the surface of the sample. In application, the illumination area may be in any shape. In some disclosed embodiments, the illumination area may be approximately 2 mm×2 mm to 200 mm×200 mm. In a preferred embodiment, the illumination area may be approximately a 20 mm×20 mm square. This ensures that any local fluctuations in light intensity are accounted for, maximizing the accuracy of the measurement.

In one embodiment, a reference cell is placed in the same location as the sample surface to accurately measure the average light intensity over the sample surface.

Figure 6:
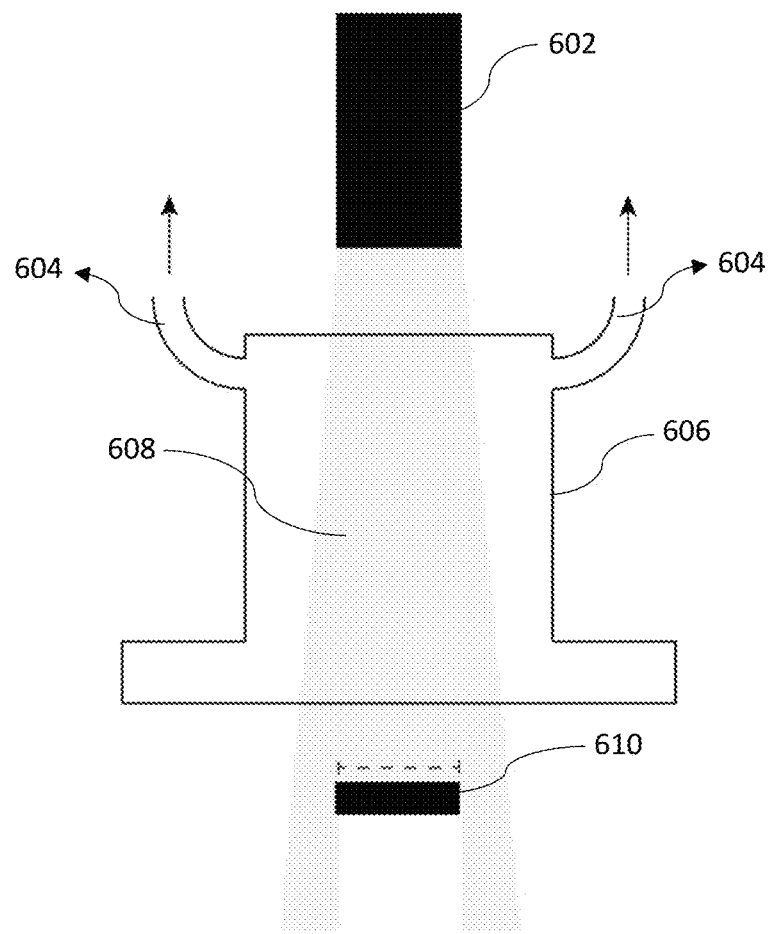
FIG. 6 illustrates a side view of the disclosed reactor with a reference cell according to one embodiment of the present disclosure.

FIG. 6 shows the side view of the reactor with a reference cell. As shown in FIG. 6, components of the reactor including a light source 602 (e.g. solar simulator), a lid 606, and a reference cell 610. The reference cell 610 is used for measuring light intensity with same dimensions as photocatalyst illumination area (e.g., approximately 20 mm×20 mm square). FIG. 6 also illustrates the light beam 608 from the light source 602. The tubes on both sides of the lid 606, are connected to gas manifold and detector for gas sampling 604, as shown in FIG. 6.

In one embodiment, the reference cell has the same dimensions as the sample illumination area. Therefore, average illumination intensity over illumination area can be precisely measured, even if light intensity over the illumination area is not uniform. The illumination area may correspond to an area of the reference cell, prism shaped cavity and/or the cross-section of the cavity of the PTFE insert. In one embodiment, the dimension of the reference cell may be approximately a square of 20 mm×20 mm. In select embodiments, the illumination cross-section of the reference cell has the same dimensions as the shape of the base of the prism and/or the cross-section of the cavity of the PTFE insert. In some disclosed embodiments, the cross-section of the cavity of the PTFE insert may include a square of approximately 2 mm×2 mm to 1000 mm×1000 mm. In a preferred range, the cross-section of the cavity of the PTFE insert may include a square of approximately 10 mm×10 mm to 100 mm×100 mm. Reference cell 610 may be placed within the prism-shaped cavity such as that of the PTFE insert, wherein the top surface of the reference cell is perpendicular with the generally straight vertical light path emanating, for example, from a light source.

Figure 7:
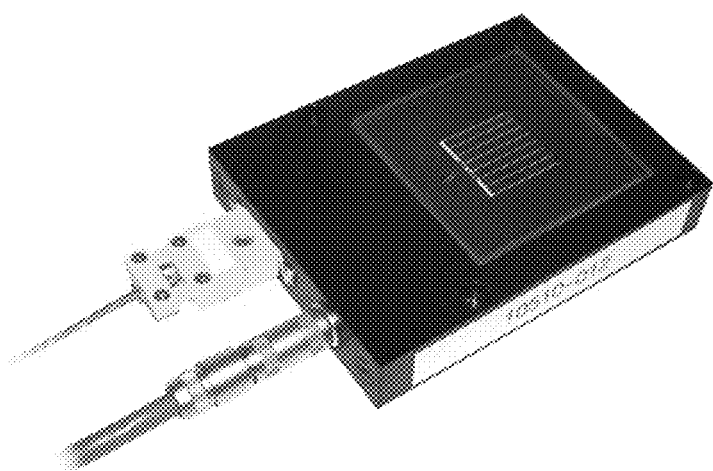
FIG. 7 illustrates a commercially available reference cell according to one embodiment of the present disclosure.

In another embodiment, the reference cell may be commercially available models. FIG. 7 shows a commercially available reference cell that may be used in the reactor. In disclosed embodiments, the reference cell is utilized for measuring the photon flux including measuring the intensity of the light incident on the sample (i.e., the distribution of incident light). It is used to adjust the light intensity of the light source so that it always corresponds to approximately 1 sun to ensure consistency between experiments. Knowing the light intensity is also necessary to quantify photocatalytic efficiency.

Figure 8:
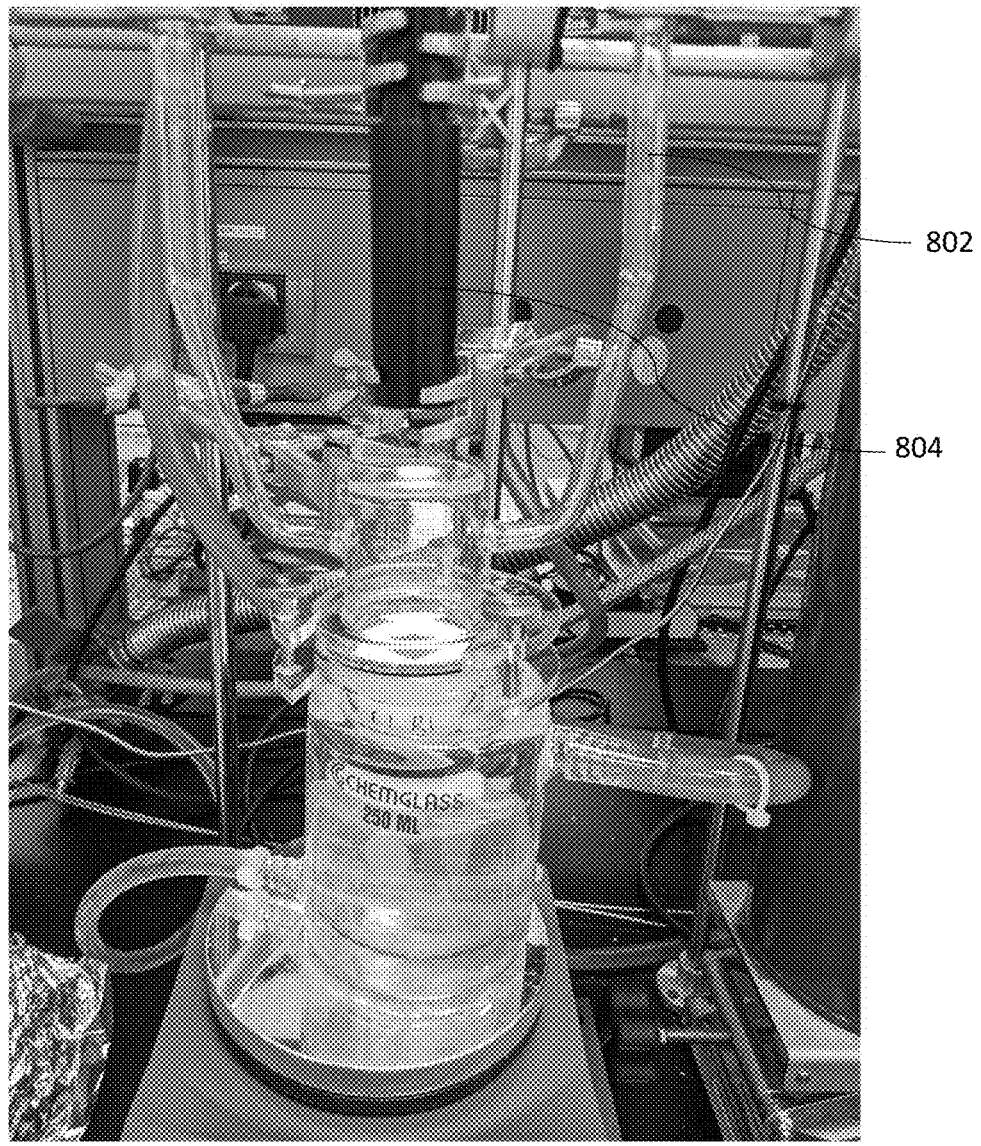
FIG. 8 illustrates a working prototype of an exemplary reactor according to one embodiment of the present disclosure.

FIG. 8 illustrates a working prototype of the disclosed photocatalytic reactor including element components such as a light source 804 and connections to a glass manifold 802.

Figure 9:
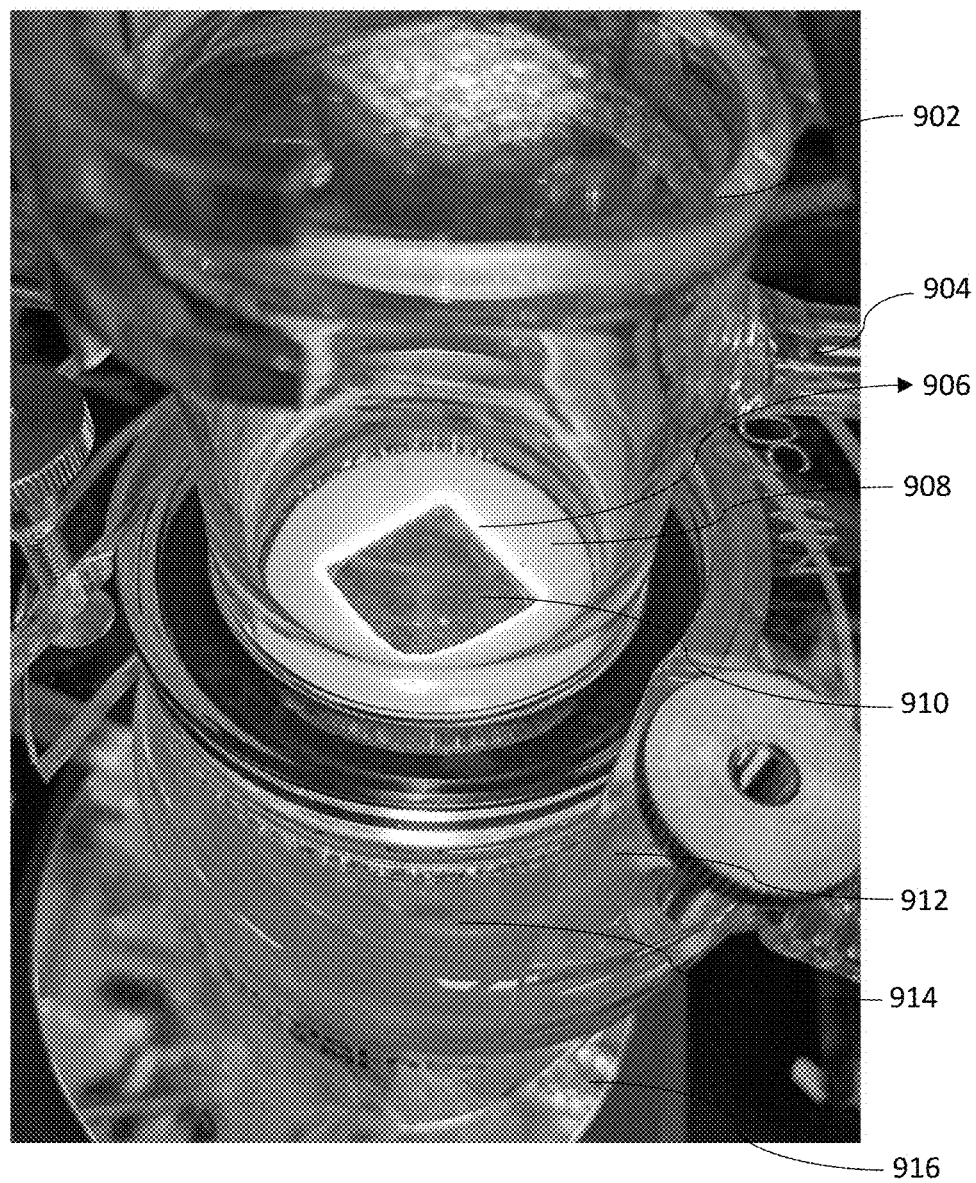
FIG. 9 illustrates an exploded view of the exemplary prototype of the disclosed reactor according to one embodiment of the present disclosure.

FIG. 9 is a closer view of the working prototype of the disclosed photocatalytic reactor. Components of the photocatalytic reactor include optical glass lid 902, connection to glass manifold 904, PTFE insert inside glass enclosure 908, photocatalyst sample inside insert 910, clamp 912, cooling bath 914 and magnetic stirrer 916, as shown in FIG. 9. The shadow-mask effect 906 of PTFE insert can also be seen in FIG. 9.

Figure 10:
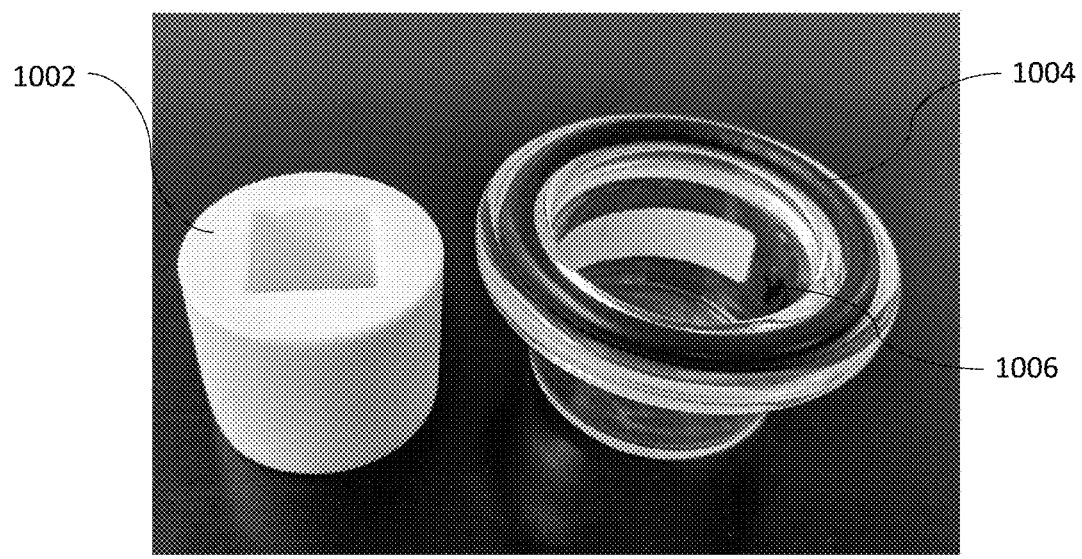
FIG. 10 illustrates an exemplary PTFE insert and a glass enclosure according to one embodiment of the present disclosure.

FIG. 10 illustrates the PTFE insert 1002 and the glass enclosure 1006 with an O-ring seal 1004 (gas tight seal) in the working prototype of the reactor. In one embodiment, the PTFE insert 1002 may include a square cross-section cavity, as shown in FIG. 10. In another embodiment, the PTFE insert may comprise other cross-sectional configurations as explained above. The sample is confined inside the reactor within a cavity inside the PTFE insert. The cavity inside the PTFE insert may include a precisely defined area. The insert may act as a shadow mask to precisely define the photocatalyst illumination area. It also confines substantially 100% of the photocatalyst within the light path substantially 100% of the time. The insert may also be configured with a window at the bottom of which allows the measurement of light transmission.

Figure 11:
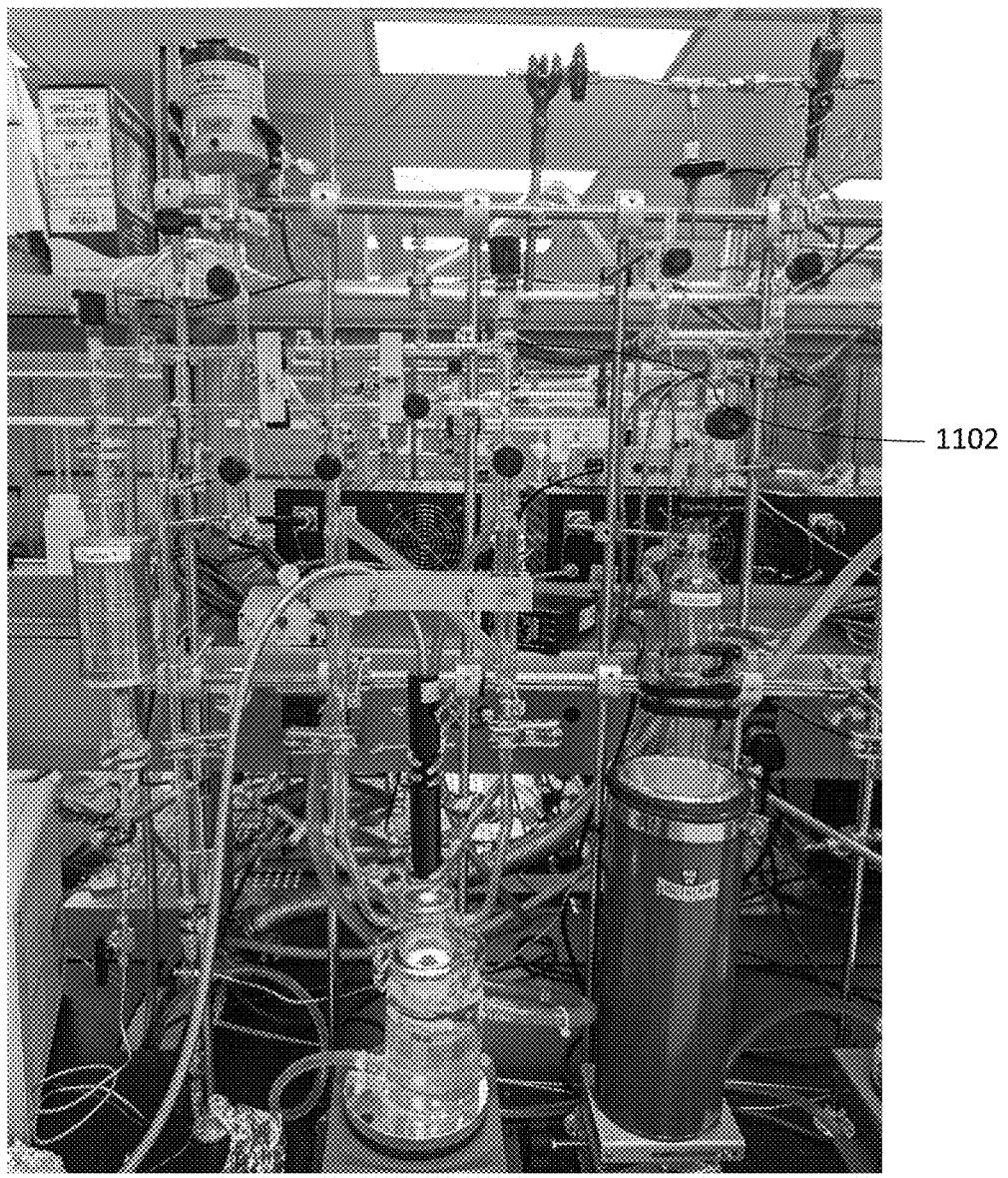
FIG. 11 illustrates an exemplary recirculating batch photoreactor according to one exemplary embodiment of the present disclosure.

In one embodiment, the disclosed photocatalytic reactor is a recirculating batch reactor that has a top-down irradiation system as shown above and is equipped with a vacuum line. FIG. 11 illustrates an exemplary working prototype of the disclosed recirculating batch reactor. In this disclosed embodiment, a glass manifold 1102 is connected to a pressure sensor, vacuum pump, gas supply, and gas analyzer.

Figure 12:
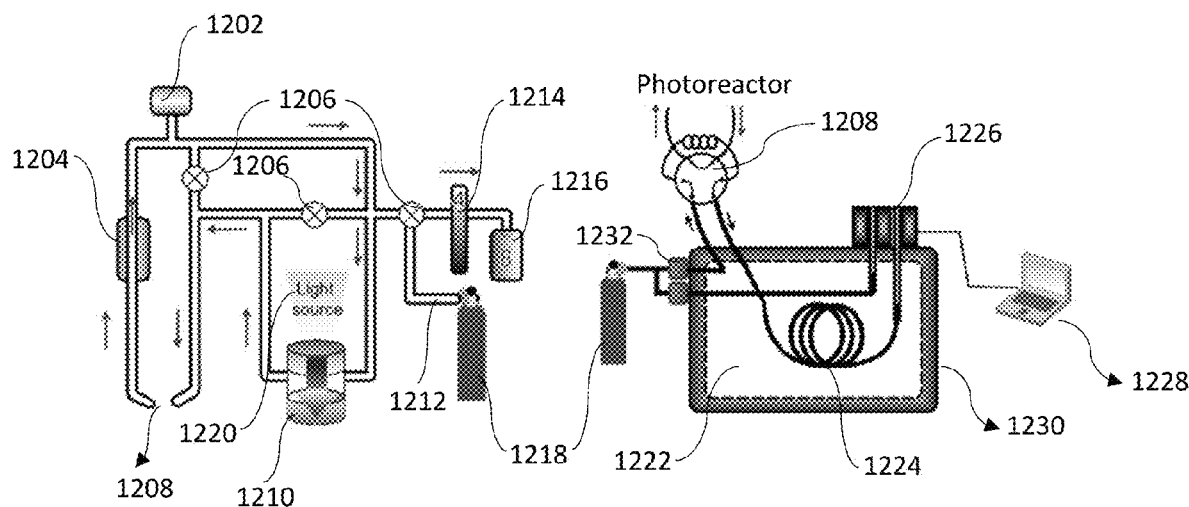
FIG. 12 illustrates a schematic diagram of an exemplary recirculating batch photoreactor according to one exemplary embodiment of the present disclosure.

FIG. 12 illustrates an exemplary structure of recirculating batch reactor and its components, including, for example: capacitance manometer 1202 for pressure measurement, recirculating pump 1204, light source 1220, stop valves 1206, cold trap for liquid $N_2$ 1214, sampling loop 1208, vacuum pump 1216, gas chromatography (GC) 1230, photocatalyst 1210, carrier gas inlet 1212, carrier gas 1218, GC column for gas separation 1224, oven 1222, flow controller 1232, thermal conductivity detector (TCD) 1226 and data acquisition device 1228. Thus, in one disclosed embodiment, flow controller 1232, sampling loop 1208, thermal conductivity detector (TCD) 1226, GC column for gas separation 1224, and oven 1222 are all part of the gas chromatography (GC) 1230. The directional red arrows illustrate the directional flow of the gases. The photocatalyst with water is loaded into the sample cavity and properly agitated with a stir bar (not shown in FIG. 12) to keep the photocatalyst suspended during the reaction.

Two types of light sources can be chosen for different purpose that can be directly situated above the reaction vessel. Several types of light source may be employed in the present disclosure. The type of light source may depend on the type of measurement to be carried out. A solar simulator of a Xe lamp is typically used to measure photocatalytic efficiency. A light source with a narrow spectral range such as an LED or a Xe lamp fitted with a bandpass filter is typically used to measure EQE.

In one embodiment, the reactor may also comprise a chiller pump (not shown in FIG. 12) for controlling the cell temperature. In a preferred embodiment, a water window (not shown in FIG. 12) is located between the light source and the reactor vessel, to cool the system and lamp.

In another preferred embodiment, a water cooler (not shown in FIG. 12) attached to a chiller pump may be placed around the reaction vessel to maintain the same temperature of the solution throughout the entire reaction.

The top-down irradiation photoreactor is illustrated, for example, in FIGS. 4 and 8. The volume is the total internal volume of the system including the reactor and the manifold. A larger top-down irradiation photoreactor will result in a larger overall system volume. The size of the reactor will depend on the illumination area of interest. In principle it can be any size including between approximately 10-5000 $cm^3$. Practically a total reactor volume of 100-5000 $cm^3$ may be preferred. In some disclosed embodiments, the batch reactors may have a refined preferred volume between approximately 300 $cm^3$ and 1000 $cm^3$.

In one embodiment, the recirculating pump is employed to attain a gradientless mixture of gases by using a circulating speed of >3 $cm^3$ $s^{-1}$.[13] Most of this type of pump function only when sufficient carrier gas is present (fill the system with sufficient pressure of gas prior to the reaction).

In one embodiment, the reactor is connected to the sampling loop for a six-way switching valve.

In one embodiment, gas chromatography (GC) may use either a Bruker Model GC-450 system or a Shimadzu® Model GC-8A system) for quantitative gas analysis, which is performed every 5-60 min, using a thermal conductivity detector (TCD).

In one embodiment, the reaction vessel is preferably degassed several times to remove air and any dissolved gases in solution for replacement with argon gas, because air-free conditions are important for the detection of $O_2$. Thus, in one disclosed embodiment, the reaction vessel is degassed 5 times, evacuating to 1 mmHg, and refilled with inert gas to 800 mmHg. A pressure threshold of 10 mmHg may be employed.

Figure 13:
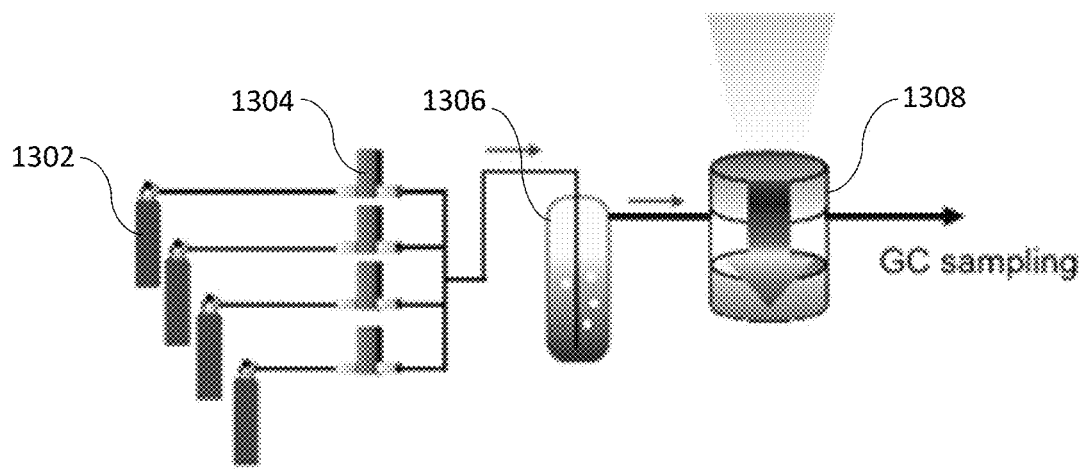
FIG. 13 illustrates a schematic diagram of one exemplary flow photoreactor according to one exemplary embodiment of the present disclosure.

In another embodiment, the reactor detecting evolved gases from the photocatalytic reaction is a flow reactor. FIG. 13 illustrates an exemplary flow reactor setup, including carrier gas 1302, mass flow controller (MFC) 1304, saturator 1306 and photoreactor 1308. The mass flow controller (MFC) 1304 regulates the flow rate for the system, which goes to the saturator 1306 to pick up humidity toward the photoreactor. The gases evolved from the reactor is carried by the constant carrier gas flow toward the GC system for detection (GC not shown). The photoreactor uses the same top-down illumination system as above. The sweep gas, or carrier gas, from the MFCs goes through a saturator, where it picks up moisture and water vapor, and then it flows toward the reactor (the water saturator is effective to maintain the water level constant in the photoreactor). Exemplary carrier gases may include argon, nitrogen, helium, $CO_2$. In one embodiment, the carrier gas is argon or helium gas.

It should be appreciated that reactor is claimed to work with any photocatalyst powder, film, gel, solution or suspension and these elements would be selected based upon what is being measured in the reactor. Examples of photocatalyst powders include, but are not limited to, $TiO_2$, $SrTiO_3$, $BiVO_4$, carbon nitride, conjugated microporous polymers, covalent organic frameworks, metal organic frameworks, hybrid perovskites such as methylammonium lead iodide etc. Examples of photocatalyst films include, but are not limited to, $TiO_2$, $SrTiO_3$, $BiVO_4$, solid solutions such as GaN:ZnO, carbon nitride, conjugated microporous polymers, covalent organic frameworks, metal organic frameworks, hybrid perovskites such as methylammonium lead iodide, conjugated polymer films, Z-scheme photocatalytic sheets etc. Examples of photocatalyst gels include, but are not limited to, conjugated polymer hydrogels, self-assembled supramolecular gels, hydrogels encapsulating a powder photocatalyst such as $TiO_2$, $SrTiO_3$, $BiVO_4$, carbon nitride, conjugated microporous polymers, covalent organic frameworks, metal organic frameworks etc. Examples of solutions include, but are not limited to, solutions of water soluble conjugated polymers or conjugated small molecules, solutions containing photosensitizers such as Tris(bipyridine)ruthenium(II) chloride, 4,7-diphenyl-2,9-di(diphenylphosphinotetramethylene)-1,10-phenanthroline [$Cu_2$(4, 7-diphenyl-2,9-di(diphenylphosphinotetramethylene)-1,10-phenanthroline)]$^{2+}$ etc.

In one embodiment, a specified flow rate should be continuously used for the full reaction time so that accurate determination of the partial pressures can be achieved. The change in partial pressure from the reaction can be accurately corrected using an internal standard, such as a known flow rate of $N_2$.[13] The flow rate of the sweep gas should be adjusted and optimized to the expected evolution rate of $H_2$ and $O_2$, as well as the sensitivity of the detector used. This flow rate also goes toward the outlet and into the GC for quantitative measurement. In some disclosed embodiments, the working flow rate is approximately 0.5-100 cm$^3$ per minute. A preferred flow rate may include approximately 1-10 cm$^3$ per minute.

In another embodiment, a micro-GC system is used to provide sensitive detection of small amounts of gases.

In one embodiment, the reactor may measure homogenous and/or heterogeneous photocatalysts.

In the field of solar energy conversion studies using semi-conductor-based materials, there are notable inconsistencies in the reporting of the efficiencies of the devices. Even though such a long period of time was devoted to improving the efficiency of solar devices, no rigorously scientific consensus on the comparison of reports under different conditions, across laboratories, and for different detectors/reactors has been achieved. Particularly, this is the case for heterogeneous photocatalysis using a powder suspension system.

The terminology for reporting the photo-catalytic efficiency is diverse, essentially because different fields of study use different words to report the same efficiencies. Preferably, absorbed photons should be counted, enabling the description of the efficiency using their rigorous consequence. An International Union of Pure Applied Chemistry (IUPAC) report made by researchers who study photocatalysis for environmental remediation (mainly $TiO_2$-based materials) recommends the use of quantum efficiency using absorbed photons.[10] In a powder suspension system, it is practically impossible to rigorously measure absorbed photons by the photocatalysts due to light scattering, reflection, etc. In practice, measurements of the incident photons are effective because they can be rigorously measured using, e.g., a photodiode by a separate experiment. The photonic efficiency is defined based on incident photons.[10] When monochromatic light is available, the term photonic yield is recommended.[10] Another study on photocatalytic water splitting defines the apparent quantum yield[12] with a definition that corresponds to the photonic efficiency. The photoelectrochemical study community uses internal quantum efficiency (per absorbed photon) and external quantum efficiency (per incident photon).[13] In all of the above, these terminologies only concern the number of photons, regardless of the photon energy (i.e., wavelength), and thus the energy of the incident photons should be additionally specified (e.g., "10% photonic efficiency at 420 nm").

When solar energy conversion is a concern of the study, the standard energy used is typically one sun, using a solar simulator (Air Mass 1.5 Global (AM 1.5G) illumination; 100 mW cm$^{-2}$). For instance, when the water splitting is the primary reaction, the solar-to-hydrogen (STH) efficiency can be calculated, defined as the "chemical energy of the hydrogen produced (1.23 eV or 237 kJ mol-1) divided by solar energy input from sunlight incident on the process."[13] If $CO_2$ reduction is the target, the thermodynamics of the respective product formations should be used. Essentially, the STH efficiency can be calculated from the integration of the quantum efficiency over all wavelengths, but it is crucial to understand that the information provided by the values of the energy efficiency and quantum efficiency is totally different at different incident wavelengths. For example, each ultraviolet (UV) photon (<400 nm) carries a high amount of energy (>3.1 eV), and therefore more than half of the energy is dissipated to obtain hydrogen (1.23 eV).[14] In addition, as the solar spectrum contains fractional numbers of photons in the UV region, the theoretical maximum STH using UV light is only 3.3% (assuming a 100% quantum yield). Therefore, if researchers are attempting to develop a high-STH system (typically >10%),[14] they should consider materials that absorb in the visible region. The STH efficiency cannot be reported with any sacrificial reagent or applied bias (if using a PEC cell), and $O_2$ should always be the oxidation product to correctly calculate the STH efficiency.[13,15] In PEC mode, appropriate correction of energy efficiency calculation is essential when an applied bias is used. In the case of water splitting as an example, subtracting the bias voltage from 1.23 V should be used, namely, the applied bias photon-to-current efficiency (ABPE).[13,16] For example, reporting the photocurrent at applied bias of 1.23 V gives zero ABPE by definition (the system does not convert and store any solar energy as a useful form).

One primary concern in photocatalysis for energy conversion is associated with the consequence of the photons, regardless of the amount of photocatalyst. Because the incident photons are used to evaluate the photocatalytic performance, the reactor/cell performance should be recorded under the conditions where the photon absorption and the resultant performance by the reactor/cell containing the photocatalyst materials are maximized. Under such conditions, the amount of photocatalyst (also corresponding to the number of available active surfaces) should not alter the photocatalytic performance. This factor leads to an important consideration: The photocatalytic rate should not be reported per weight of photocatalyst (or surface area) unless photoreactor engineering is the primary concern.[17] For instance, if the amount of photocatalyst is doubled, the rate of evolution will not always be doubled.

Therefore, rate constants are proposed as an excellent note addressing this issue.[18] Rate constants in conventional thermal heterogeneous catalysis are only dependent on the temperature, reactant, and product activities (concentrations), and identity of the catalyst, where the rate is generally proportional to the number of active sites. On the other hand, the photochemical rate constant is not a constant but rather is dependent on the quantum yield, incident light intensity, light path, extinction/absorption coefficient, and even the reactant and product activities.[18] The photocatalytic rate, therefore, is not proportional to the number of reacting surface sites (surface area) of the photocatalysts, and accordingly, not to the amount (weight) of (photo)catalyst. This is a crucial point because this essentially determines how the photocatalytic measurements should be conducted. In photocatalysis, because photons must be effectively consumed, their number or energy arriving to a given geometric surface area (and not the surface area of the semiconductor powder) will define the denominator of the efficiency calculation.

Figure 14:
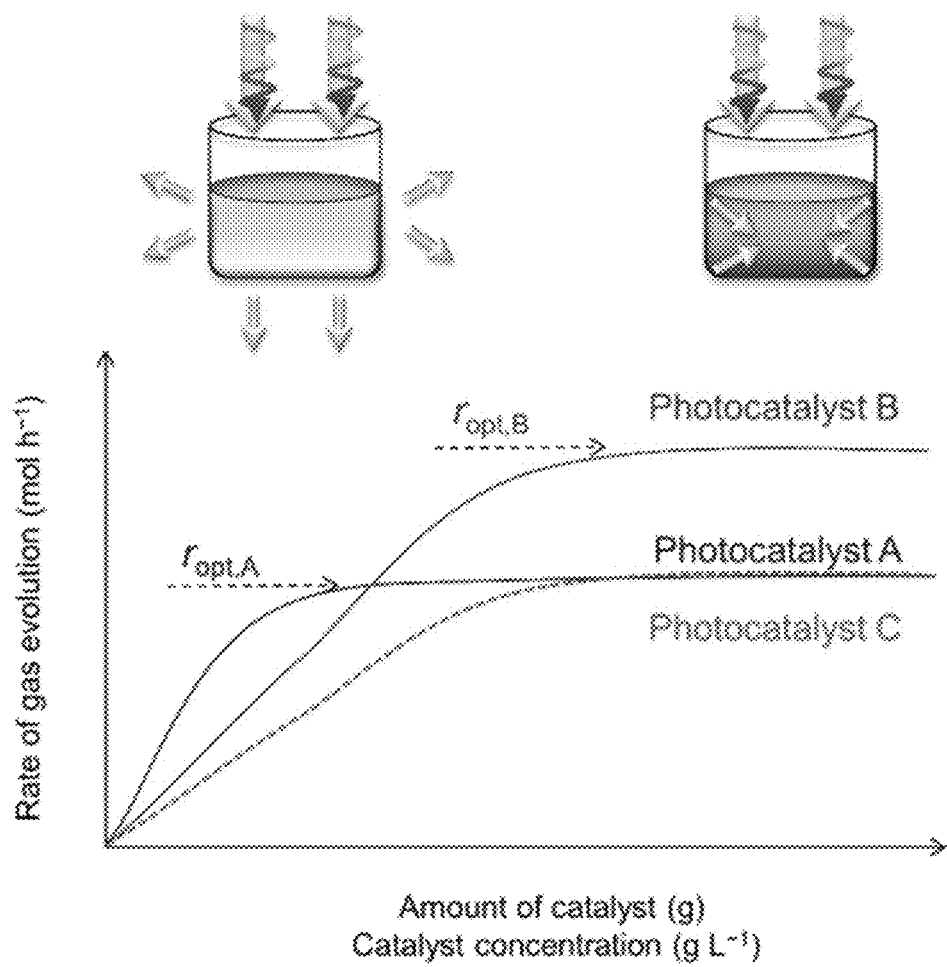
FIG. 14 graphically illustrates the rate of gas evolution as a function of photocatalyst amount in an exemplary photoreactor according to one exemplary embodiment of the present disclosure.

FIG. 14 graphically illustrates the dependence of the reaction rate on the photocatalyst amount (concentration) in a solution. The slopes represent differential conditions and the plateaus represent optimal catalyst loading conditions. Under differential conditions, where there is not sufficient photocatalyst present to attain an optimal rate, the slope is steeper for photocatalyst A than for photocatalysts B and C. This is a consequence of the high absorption coefficient, photon scattering/reflection, and/or degree of suspension of the powders (often related to the photocatalyst aggregate size). Because there is no knowledge of what percentage of the light is absorbed by the photocatalyst, the photocatalytic efficiency cannot be compared correctly. At optimal rates on the plateau regions, it is seen that photocatalyst B becomes superior. When photonic efficiency is the main concern, photocatalyst B should be considered as a superior photocatalyst to provide the highest photonic efficiency.

As for photocatalysts A and C, the photonic efficiencies are identical. Lowering the required amount of photocatalyst can be achieved, e.g., by altering the degree of suspension and light scattering. An example of this aspect is the use of a supported photocatalyst: a uniform suspension of $Ta_3N_5$ supported on inert $SiO_2$ spheres reduces the amount of photocatalyst required to achieve a plateau.[19] In another example, the optimal rate at the plateau (intrinsic photocatalyst efficiency) of $CuGa_2In_3S_8$ was not perturbed with or without the $TiO_2$ support, and the optimal rates were identical.[20] This suggests that the required amount of photocatalyst was reduced when the support was used, but the intrinsic photocatalytic efficiency of those photocatalysts was not altered by the presence of the supports (i.e., the photonic efficiencies are identical for photocatalysts A and C).

The climax of photocatalysis is the surface electrochemical redox reactions. To facilitate the reactions, the photocatalyst semiconductor surface is effectively decorated with electro-catalyst nanoparticles (often called the co-catalyst). Similar confusion is often observed and obsoletely discussed in the literature, in which the photocatalytic rate is reported per surface area or turnover frequency (TOF), defined as the molar rate per mole of available co-catalyst surface. In multiple electron transfer reactions, such as water-splitting reactions, the co-catalysts are nothing but electrocatalysts where their potentials are shifted by successful carrier transfers from the photocatalyst (photon absorber). This is because the time scale of electrocatalysis is much slower than the required time scale for charge separation (electrons and holes are accommodated as charge-up phenomena in the catalyst). Such a potential shift of the electrocatalyst on the semiconductor upon light illumination has been observed experimentally. It is noted that the electrocatalyst nanoparticles on the semiconductor powder become active not because of their existence themselves, but because of the consequence of the charge separation and resultant potential shift. For example, hydrogen will not be catalytically produced from any metal surface unless the electrocatalyst potential is negatively shifted (close to 0 V vs RHE), because of thermodynamic constraints. In electro-catalysis, the TOF is potential-dependent, so that TOF varies even though the electrocatalyst is identical (in terms of identity and surface area). A higher light intensity essentially causes a higher degree of potential shift (up to flat band potential), resulting in an enhancement of the overall rate of reaction. On top of this, the potential shift may not be uniform on the photocatalyst surface, meaning that some electrocatalysts on the semiconductor have a negative potential while other electrocatalysts on the same particle have a positive potential.[21-23] Even if all of the particles are equally charged up, the potential shift is determined as a consequence of the charge separation of the material. In addition, photocatalysis occurs in a dynamic system (especially when the powders are stirred in the solution), meaning that the potential of the electrocatalyst is always changing with each absorbed photon and does not remain constant throughout the entire reaction. Even if accurate measurement of the number of active sites is achieved, how many are actually actively working and at what potential is still questionable.

Figure 15:
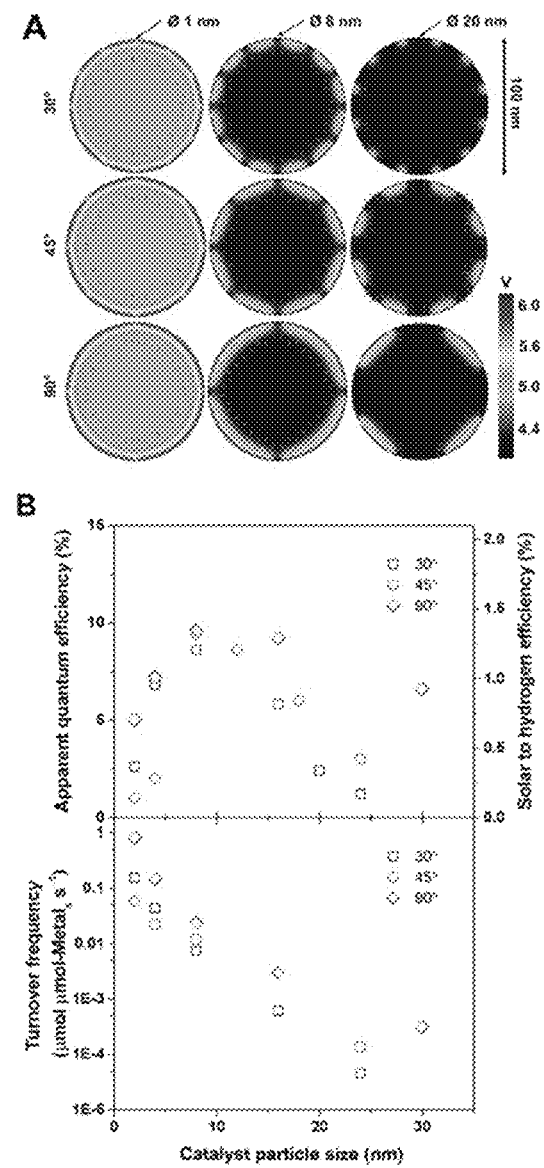
FIG. 15 illustrates the impact of various factors on turnover frequency (TOF), based on a simple simulation according to one exemplary embodiment of the present disclosure.

If the potential shift of the electrocatalyst is not uniform on the surface of the photocatalyst, the TOF per active site is an average value that provides limited or no meaningful information. FIG. 15 shows the impact of various factors on TOF, based on a simple simulation. According to FIG. 15, if the potential shift is identical everywhere, the TOF must vary with different electrocatalyst dispersions. Panel B of FIG. 15 shows the TOF based on the available surface of hydrogen evolution catalyst, apparent quantum efficiency (AQE), and STH efficiency based on the powder photocatalyst modeled in Panel A of FIG. 15 with varying sizes and distances of the electrocatalyst.[24] Panel A of FIG. 15 shows particulate simulation models performed on various sizes of hydrogen-evolving electrocatalyst particles dispersed on the surface of a circular 100-nm n-type semiconductor. The rows show changing interparticle distance between electrocatalyst nanoparticles and the columns show a different electrocatalyst size. Typical properties of defective semiconductor powders were considered for the calculations.[24] Panel B of FIG. 15 shows the apparent quantum efficiency (AQE), the solar-to-hydrogen (STH) efficiency, and turnover frequency (TOF) per hydrogen evolution surface site calculated based on the model shown in panel A. No correlation between photocatalytic performance and TOF (per electrocatalyst surface) is observable, based on FIG. 15.

It is seen that, in this model, the TOF monotonically decreases with the increasing catalyst size, but this trend is not reflected in the overall AQE and STH efficiency. A smaller particle (or greater surface area) does not necessarily result in the best overall STH efficiency, and moreover, a high TOF does not always lead to a high photocatalytic efficiency value of the entire system. It is reinforced that the charge separation efficiency strongly affects the overall efficiency in photocatalysis, the process of which is not involved in conventional thermal catalysis. The example shown in FIG. 15 also implies that the total surface area of the photocatalyst does not affect the photo catalytic performance (the photocatalytic efficiency varies when the photocatalyst particle size is identical). This clearly indicates that the heterojunction, such as the metal—semiconductor and semiconductor-electrolyte interfaces, is the driving force for the charge separation.[24] The high surface area helps to improve the overall efficiency only if effective charge separation is achieved by the increased surface (e.g., by successful electrocatalyst decoration). Instead, the diffusion length of the charge carriers should be taken into account to determine the size and morphology of the photo catalyst. The surface state of the semiconductor is also known to enhance charge recombination, and, in this case, an increase in surface area only causes a reduction in the photocatalytic efficiency.

According to the above, surface area is still an important parameter in some photocatalytic reactions and, therefore, is recommended to be separately reported regardless. In some photocatalytic reactions, the rate may be limited by the adsorption process of the reactant to the surface. Examples include degradation of organic pollutants, especially under diluted conditions in both gas phase and liquid phase. In this case, the larger amount of photocatalyst with higher surface area would show superior performance. Similarly, if adsorption of sacrificial reagent, when used, limits the overall efficiency, the contribution of surface area on the activity cannot be ignored. Under such reaction conditions, where adsorption of reactant is kinetically relevant, a "dark" process is involved in determination of the overall "photocatalytic" performance, and essentially a loss of the photonic efficiency is expected, because the charge recombination should happen when no reactant is apparent on the surface.

Recent and present publications reporting rates per weight cannot be effectively benchmarked for the photocatalytic efficiency. The rate-per-weight data cannot be compared with other photocatalyst materials, even in the same photoreactor, and obviously in cross-laboratories. The rate-per-weight results are specific to the material and the reactor and do not reflect the intrinsic photocatalytic efficiency. Instead, the optimal rate should be reported, as shown in FIG. 14. Alternatively, rates per surface area of the photocatalyst at optimal rate may be able to discuss kinetic relevance and contribution of dark processes (such as adsorption/desorption). Also, rate-per-surface-area data may be associated with the charge separation efficiency induced by the different surface area (interface) and particle size, but surface area itself is not the direct measure of the charge separation and resultant photocatalytic efficiency. With regard to rates per available site of the electrocatalyst on the semiconductor (TOF), as mentioned previously, electro-catalytic rates are potential-dependent. TOF includes the information on the successful charge separation and resultant potential shift of the electrocatalysts, besides electrocatalytic activity (per site). For example, when particle size of the electrocatalyst (such as Pt on $TiO_2$) is a primary concern, not only the size, but the number (concentration) and position (arrangement) of such active sites on the semiconductor will affect the overall performance. This is simply because charge separation/extraction must happen before electro catalysis occurs. Therefore, one should be aware that a high TOF does not necessarily reflect high overall photonic efficiency, as shown in FIG. 15. Overall, thorough consideration should be given to what can be discussed by normalizing the photocatalytic rates per such parameters (weight, surface area, and available site).

It is clear from the above discussion that the optimal rate should be able to be accurately and reproducibly measured, regardless of the photoreactor. Because the optimal rate is a function of the light intensity,[18] the photon flux (the number of photons as a function of the wavelength) should be adequately reported. Some papers report the rate of photocatalysis in the abstract or conclusion of their papers, but these values themselves are meaningless without indicating experimental conditions, including incident photons. Actual measurement of the photon flux is recommended because there are many cold mirrors, mirror modules, and filters that can be integrated for the lamps, so incident light profiles should be measured for the relevant experiments. The light intensity can be measured using a calibrated photodiode, which should be placed in the same location as the photoreactor.

Figure 16:
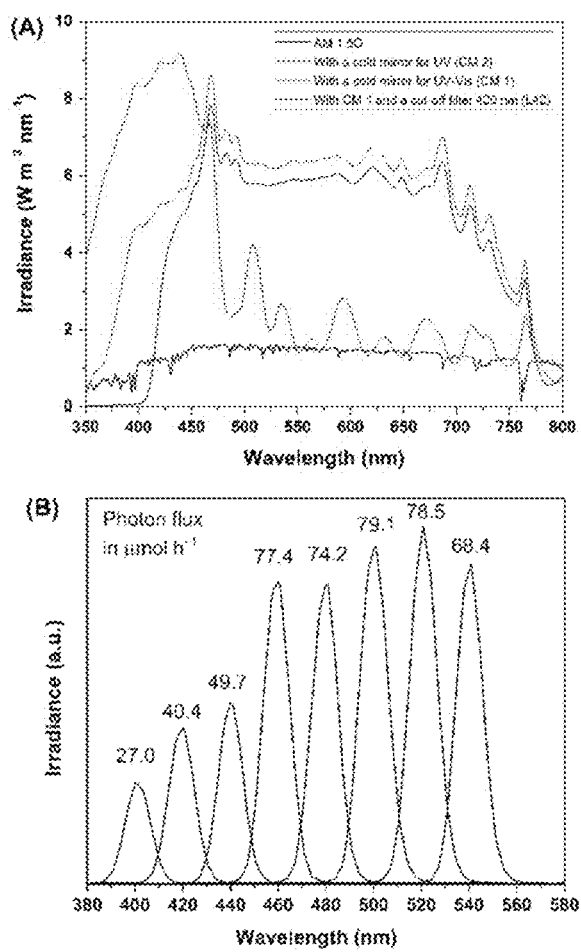
FIG. 16 is a graph illustrating comparative spectra of the power (W) as a function of wavelength according to one exemplary embodiment of the present disclosure.

FIG. 16 shows an exemplary measurement of Xe lamp. Panel A of FIG. 16 shows the comparative spectra of the power (W) as a function of wavelength for AM 1.5G solar simulator with a Xe lamp (Cermax® Model PE300-BF, 300 IAT) using different cold mirrors (UV and UV-vis) and a cutoff filter (>420 nm). Panel B of FIG. 16 shows the photon flux (distribution and the photon numbers) of a MAX-303 Asahi Spectra Co. Ltd. Xe lamp using different band-pass filters. By showing an example of photon distribution using a Xe lamp at a given power input (Cermax® Model PE300-BF, 300 W), Panel A of FIG. 16 shows how the spectra can change by using cold mirrors and cutoff filters. The National Renewable Energy Laboratory (NREL) air-mass (AM) 1.5 G (100 W $m^{-2}$) is also shown for comparison. The use of cold mirrors is effective because they cut off infrared (IR) light, which otherwise unnecessarily heats up the photoreactor. A higher irradiance is observed in the UV region when using a UV cold mirror (CM2), and this peak decreases significantly when using a UV-vis cold mirror (CM1). The shoulder of the UV region peak can be trimmed off even more by using a cutoff filter at 420 nm (1, 42), which is particularly useful when proving that materials are visible-light active. It is obvious that reporting the incident light by the measured photon flux is essential for the rigorous reproduction of the photocatalytic results (e.g., only mentioning a "300-W Xe lamp" is not sufficient). The inventors' laboratory also uses a MAX-303 from Asahi Spectra Co., Ltd. This lamp equipment utilizes a sophisticated mirror module to select the required range of wavelengths (UV (250-385 nm), UV-vis (300-600 nm), and vis (385-740 nm)). This mirror module effectively cuts out the IR lamp with no significant increase in temperature, even for long-term experiments. Switching filters (cutoff, band-pass, etc.) is easy in a preinstalled system. A light guide (optical fiber with an adequate lens) can also be attached to the MAX-303, which produces a flexible orientation of the illuminating light and a uniform intensity and distribution of photons in a given geometric area. The light guide essentially changes the illuminated area in an easy manner. Also note that the lamp has a lifetime, so that the light intensity decreases with continued usage, so that the intensity should be adequately adjusted or reported according to the lifetime.

The same argument is also applied for the quantum efficiency calculation at the given wavelengths. It is important for researchers to fully characterize the photon number and distribution of their light source. The exact number of photons at each wavelength must be determined to calculate the quantum efficiency. Because monochromatic light is not always available, band-pass filters, in conjunction with a hetero-chromatic light source, can be used instead. Ideally, the band-pass filter would only let through a single wavelength, so that the quantum efficiency can more accurately be determined, but this is not the case. Nevertheless, the quantum efficiency can still be estimated with these values at each wavelength corresponding to the band-pass filter, but these results should be taken with a grain of salt, because we know that it permits a small distribution of light around that wavelength to go through. An example of photon flux using various band-pass filters dedicated to the Asahi Spectra MAX 303 is shown in FIG. 16.[25,26] The distribution of the photons as a function of the wavelength, together with the total number of photons per time in each spectrum, is reported. The photonic efficiency then can be calculated from the measured photocatalytic rate divided by the photon flux involved in each bandpass light. These details are essential to be scientifically reproducible. Greater complexity of photocatalysis arises because the photonic efficiency may not be proportional to the light intensity.

According to a second broad aspect, the present disclosure provides a method of accurately measuring the photocatalytic efficiency. The photocatalyst, reactant(s), and solvent are loaded into the PTFE insert inside the reactor, during operation. In accordance with disclosed embodiments, the reference cell is used to measure the intensity of the light incident on the sample. This is used to adjust the light intensity of the light source so that it always corresponds to 1 sun to ensure consistency between experiments. Knowing the light intensity is also necessary to quantify photocatalytic efficiency. The disclosed reactor is then closed and connected to a glass manifold connected to a gas analyzer. As shown in FIG. 11, glass manifold 1102 is connected to pressure sensor, vacuum pump, gas supply, and gas analyzer. The reactor may then be evacuated and filled with a specific gas mixture at a desired pressure. It is then stirred, cooled and/or heated, and illuminated. In some disclosed embodiments, a predetermined temperature or range of temperatures may be maintained including, for example, a constant temperature of 15 C. The quantities of evolved gases are analyzed by the gas analyzer.

In one embodiment, quantitatively describing the amounts of gases produced in the system may be achieved by using gas chromatography (GC) as an analytical tool.

A GC system consists of a gas injection component, then a gas separation component with suitable column(s), followed by detector(s). Columns of the 5 A, 13x, or HayeSep A molecular sieves are effective for $H_2$, $O_2$, and $N_2$ separation.[13] The purpose of the column is to achieve good separation, so the particle size of the adsorbate, as well as the length of the columns, may be optimized. These columns strongly adsorb $H_2O$ and $CO_2$, leading to shorter retention times and inadequate separation. Therefore, regeneration of the column, by baking, to remove the adsorbed species, is necessary, when appropriate.

Figure 17:
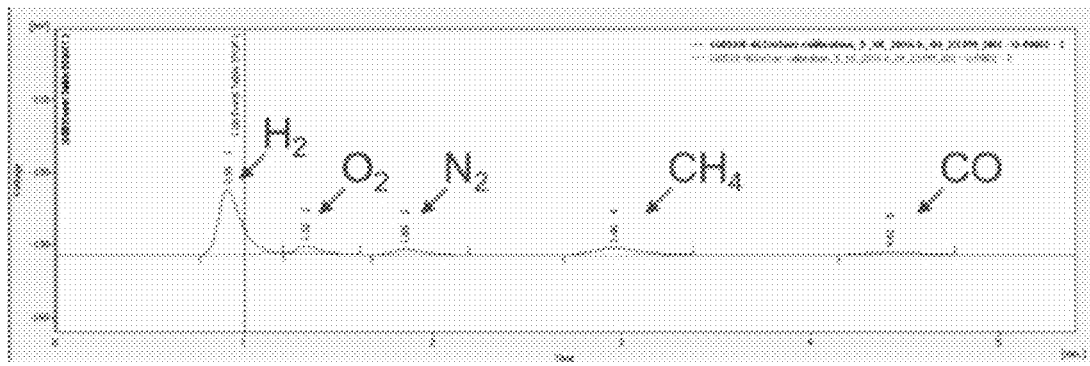
FIG. 17 is a graph illustrating a spectrum obtained using an example gas chromatography (GC) system for a calibration gas mixture according to an exemplary embodiment of the present disclosure.
Figure 18:
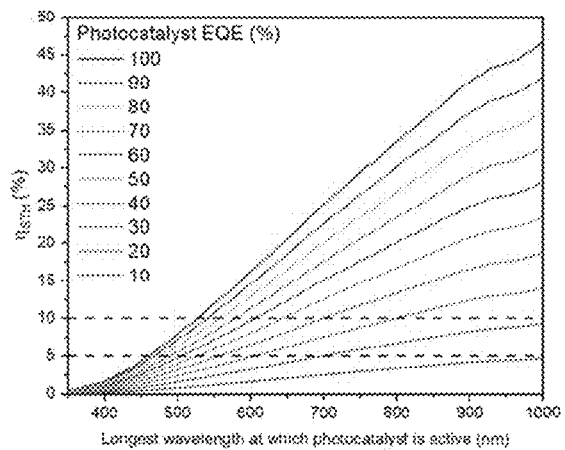
FIG. 18 is a graph illustrating the solar-to-hydrogen conversion efficiency ($\eta$STH) of a photocatalyst for one-step overall water splitting according to an exemplary embodiment of the present disclosure.
Figure 19:
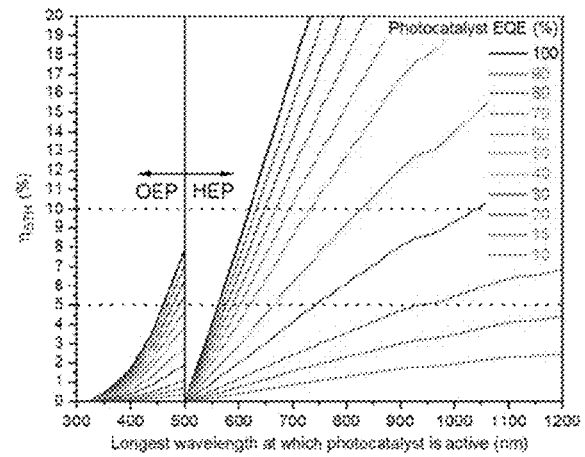
FIG. 19 is a graph illustrating the $\eta$STH for overall water splitting of an $O_2$ evolution photocatalyst (OEP) and a $H_2$ evolution photocatalyst (HEP) operating in parallel in a Z-scheme according to an exemplary embodiment of the present disclosure.

FIG. 17 shows an example of a GC spectrum, using a calibration mixture gas. In this example, a molecular sieve 5 A column in an argon carrier gas was used. From the chromatogram, $H_2$, $O_2$, $N_2$, $CH_4$ and CO are detected in this order, and each peak is clearly separated from the others. Therefore, the spectrum shows adequate separation of $H_2$, $O_2$, $N_2$, $CH_4$ and CO (equimolar quantity for each gas). Using known quantities (concentrations or partial pressures) of the gases, the exact concentration of each gas component is known and can be related to the corresponding areas of the peaks for the actual measurements.

In one embodiment, the gases may be analyzed include $H_2$, $O_2$, $N_2$, $CH_4$ and CO. The gas analysis takes place in the GC. The disclosed GC is capable of analyzing the concentration of many different gases. The present disclosure may be used to measure the efficiency of any photocatalytic process in which a gas is released from a solution, gel, suspension, or film of a photocatalyst. $H_2$, $O_2$, $CH_4$ and CO are the most prominent examples. An advantage of the present disclosure is that it enables the accurate quantification of light energy incident on the photocatalyst mixture, and therefore the accurate determination of various photocatalytic efficiency metrics. If a gas, such as $H_2$ or $O_2$, is a product of the photocatalytic reaction, its concentration will increase over time and can be quantified by the GC. The rate of gas production and the rate of light energy input may then be used to accurately quantify various photocatalytic efficiency metrics. In addition, to accurately measure the photocatalytic efficiency in mmol of gas produced per hour per gram of photocatalyst at a specific light intensity, the distribution of photocatalyst through the light path must be as uniform as possible and substantially 100% of the photocatalyst must be confined within the light path substantially 100% of the time. This is enabled via the disclosed prism shaped cavity which may be stirred from below.

In one embodiment, the photon flux (both the intensity and distribution) of the incident light is controlled and measured. In the case of the xenon lamp, the irradiation wavelength can be controlled with a combination of a cold mirror, a water filter, and a cutoff filter, as above. The light intensity may be measured using a spectroradiometer (EKO, Model LS-100) at different locations, and the total number of photons is then integrated.

High-intensity lights may cause saturation of the photodetector, making the photon measurement is not accurate. To evaluate the detection saturation by the diode, the application of neutral-density (ND) filters that cut the photon intensity at all wavelengths is effective. In addition, some photodetectors only measure the total irradiance (energy), which will not provide the distribution of the photons.

Based on the above, photocatalyst amount or concentration loaded is dependent on the light source and photoreactor. It also is dependent on the aperture of light source, the distribution of light intensity, the shape of the photoreactor, and the amount of solution, etc. Therefore, the design of the reactor is also crucial to understanding the evolution rate observed in the system. Although different photoreactor setups have different optimal loading and conditions, the rate at the optimal rate (photonic efficiency) should be the same with a similar light intensity.

Nanoparticle Fabrication and Optimization

In one embodiment, blends of the PM6 donor polymer matched with either Y6 or PCBM electron acceptors were processed into NPs using the miniemulsion method.[48]

Figure 20:
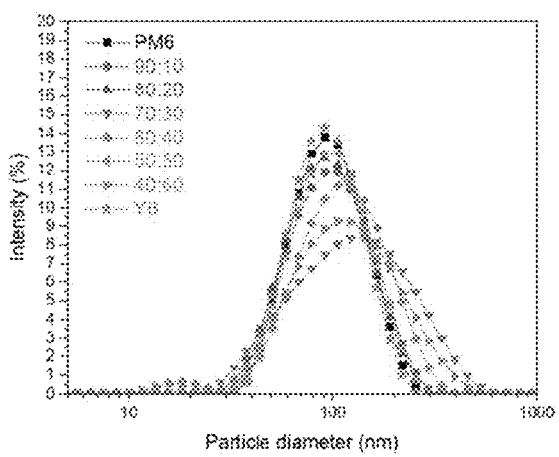
FIG. 20 is a graph illustrating the particle size distributions measured by dynamic light scattering (DLS) of PM6:Y6 NPs formed from a range of PM6:Y6 blend ratios according to an exemplary embodiment of the present disclosure.
Figure 21:
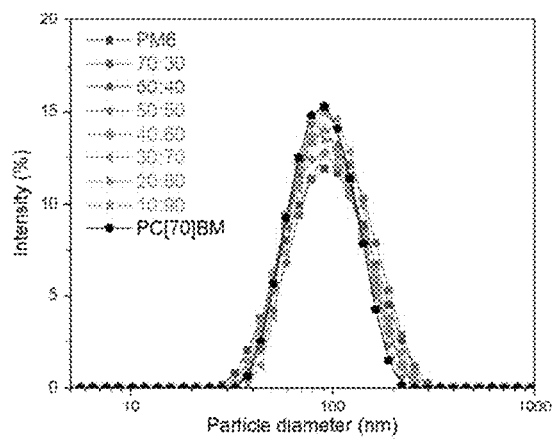
FIG. 21 is a graph illustrating the particle size distributions measured by dynamic light scattering (DLS) of PM6:PCBM NPs formed from a range of PM6:PCBM blend ratios according to an exemplary embodiment of the present disclosure.

The NP size distributions were measured by dynamic light scattering. In one embodiment, the NP size of PM6:Y6 NPs and PM6:PCBM NPs distributed in the range of 10 nm to 1000 nm. In a preferred embodiment, the average NP size of PM6:Y6 NPs and PM6:PCBM NPs are about 100 nm. Particle size distributions measured by dynamic light scattering (DLS) of PM6:Y6 NPs and PM6:PCBM NPs are shown in FIGS. 20 and 21. FIG. 20 shows particle size distributions measured by dynamic light scattering (DLS) of PM6:Y6 NPs formed from a range of PM6:Y6 blend ratios. FIG. 21 shows particle size distributions measured by dynamic light scattering (DLS) of PM6:PCBM NPs formed from a range of PM6:PCBM blend ratios. In FIGS. 20 and 21, histograms have been plotted as frequency polygons for greater clarity.

Figure 22:
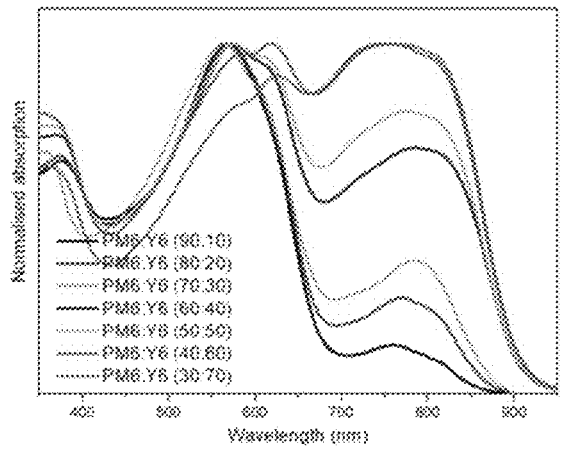
FIG. 22 is a graph illustrating the normalized absorption spectra of NP suspensions of PM6:Y6 NPs according to an exemplary embodiment of the present disclosure.
Figure 23:
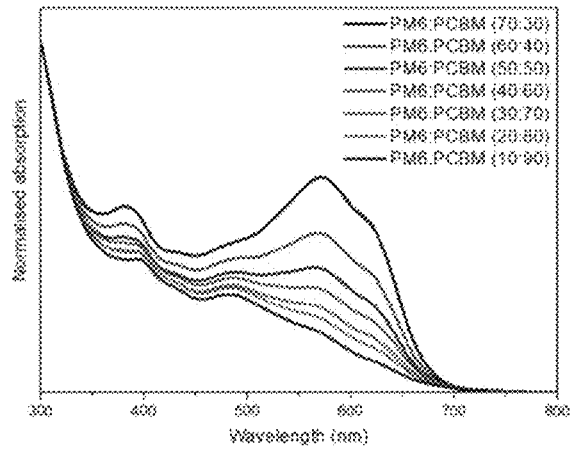
FIG. 23 is a graph illustrating the normalized absorption spectra of NP suspensions of PM6:Y6 NPs and PM6:PCBM NPs according to an exemplary embodiment of the present disclosure.
Figure 24:
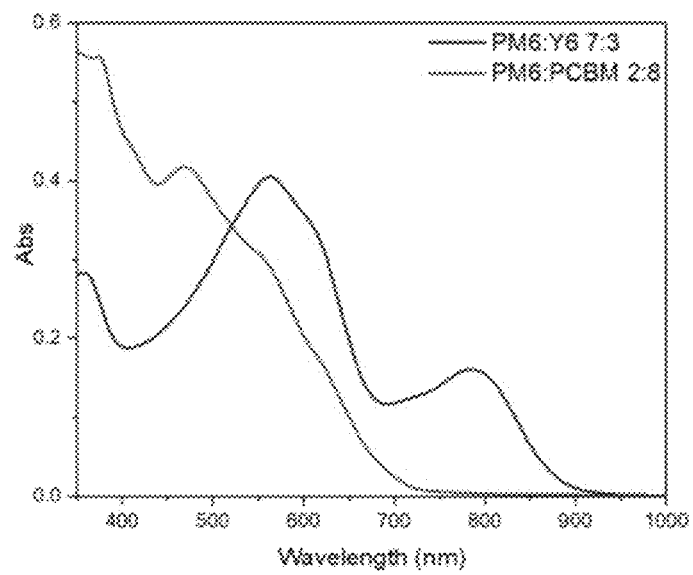
FIG. 24 is a graph illustrating the absorption spectra (not normalized) of PM6:Y6 7:3 and PM6:PCBM 2:8 NP dispersions according to an exemplary embodiment of the present disclosure.

In one embodiment, the organic semiconductor combinations were chosen based on their strong visible light absorption, type II energy level offsets, and their ability to efficiently convert absorbed photons to photogenerated charges when blended in a bulk heterojunction organic solar cell.[49-51] The normalized absorption spectra of NP suspensions of PM6:Y6 NPs and PM6:PCBM NPs are shown in FIGS. 22 and 23. FIG. 24 shows the absorption spectra (not normalized) of PM6:Y6 7:3 and PM6:PCBM 2:8 NP dispersions (17±1 µg/mL).

In one embodiment, the energy levels of PM6:Y6 NPs and PM6:PCBM NPs are suitably aligned with respect to the proton reduction and ascorbic acid (AA) oxidation potentials so that photogenerated electrons in the Y6 or PCBM LUMO have a suitable potential to reduce protons, and photogenerated holes in the PM6 HOMO have a suitable potential to oxidise AA. AA is used as a sacrificial electron donor. It is required for the PM6/Y6 and PM6/PCBM photocatalysts to produce hydrogen.

In one embodiment, other sacrificial electron donors include methanol, ethanol, triethylamine, triethanolamine and diethylamine.

In another embodiment, the photocatalysts is $SrTiO_3$, which do not require sacrificial electron donors because they can drive overall water splitting.

Figure 28:
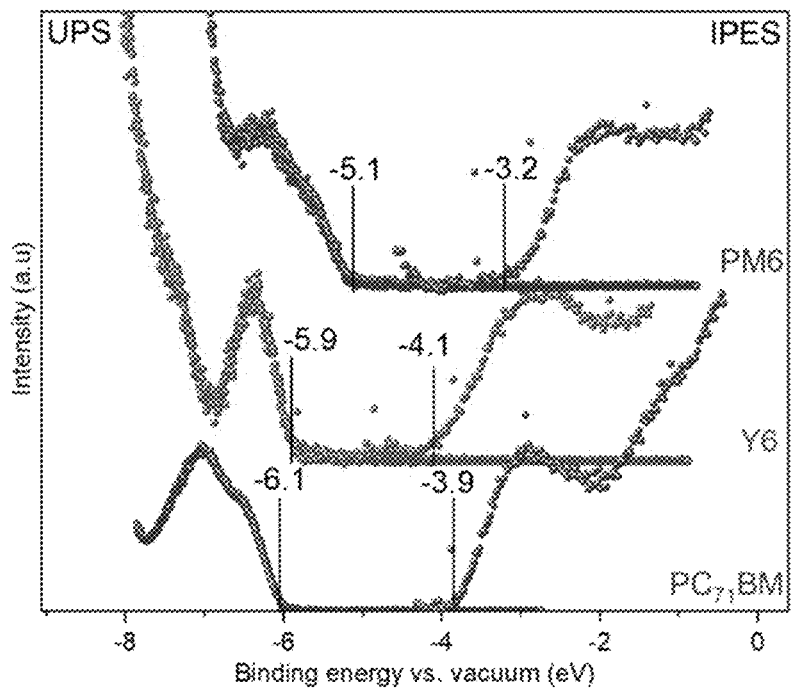
FIG. 28 is a graph illustrating the combined UPS and IPES spectra of PM6, Y6 and PCBM measured on thin films under vacuum according to an exemplary embodiment of the present disclosure.
Figure 29:
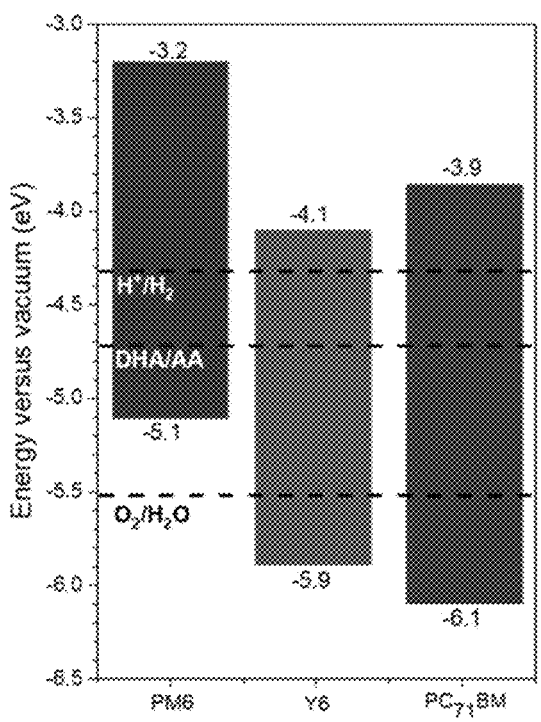
FIG. 29 is a graph illustrating the energy level diagram of PM6, Y6 and PCBM as measured by UPS and IPES according to an exemplary embodiment of the present disclosure.
Figure 30:
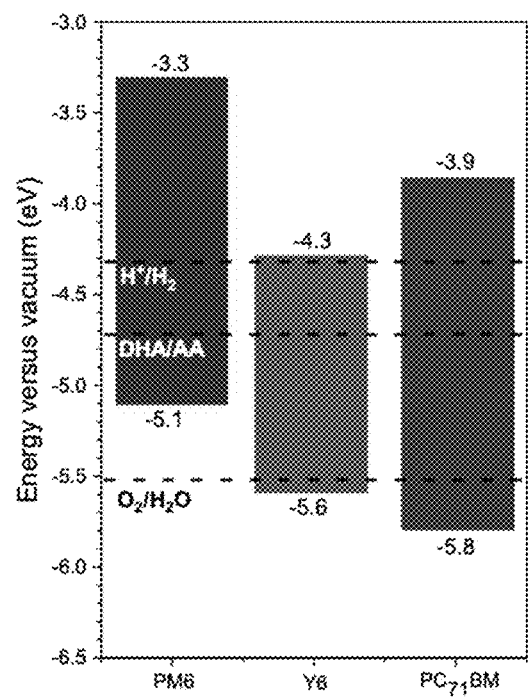
FIG. 30 is a graph illustrating the energy levels measured by photoemission spectroscopy in air (PESA) and UV- Visible absorption spectroscopy according to an exemplary embodiment of the present disclosure.
Figure 31:
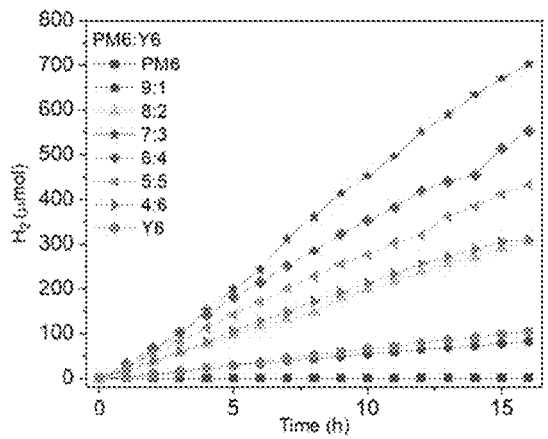
FIG. 31 is a graph illustrating the $H_2$ evolution vs. time for PM6:Y6 nanoparticles formed from a range of PM6:Y6 ratios according to an exemplary embodiment of the present disclosure.
Figure 32:
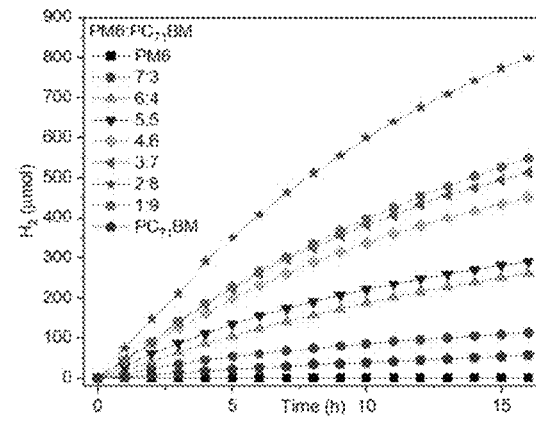
FIG. 32 is a graph illustrating the $H_2$ evolution vs. time for PM6:PCBM nanoparticles formed from a range of PM6:PCBM ratios according to an exemplary embodiment of the present disclosure.
Figure 33:
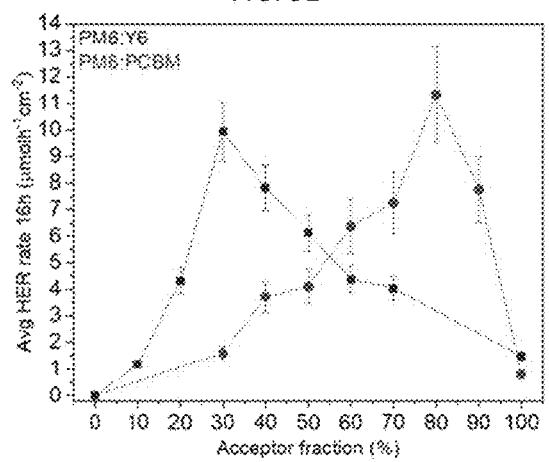
FIG. 33 is a graph illustrating the average $H_2$ evolution rates of PM6:Y6 and PM6:PCBM nanoparticles over 16 h as a function of the Donor (PM6) to Acceptor (Y6 or PCBM) blend ratio according to an exemplary embodiment of the present disclosure.
Figure 34:
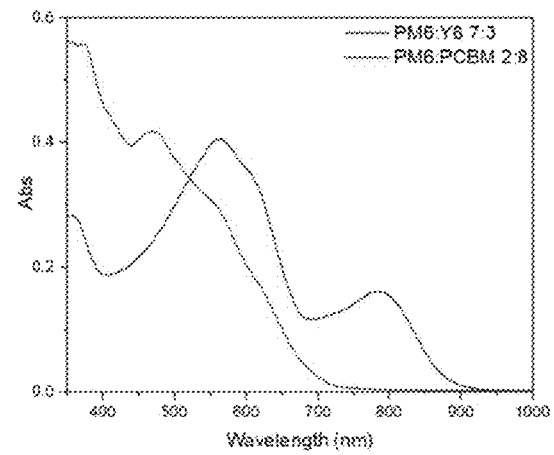
FIG. 34 is a graph illustrating the UV-Vis absorbance spectra of the PM6:Y6 and PM6:PCBM nanoparticle dispersions at their optimized blend ratios (concentration: 17±1 μg/mL) according to an exemplary embodiment of the present disclosure.

FIG. 28 shows the combined UPS and IPES spectra of PM6, Y6 and PCBM measured on thin films under vacuum. The solid vertical lines in FIG. 28 indicate the HOMO and LUMO energy level onsets of each semiconductor. FIG. 29 shows energy level diagram of PM6, Y6 and PCBM as measured by UPS and IPES. The dashed lines correspond to the proton reduction potential ($H^+/H_2$), water oxidation potential ($O_2/H_2O$) and the calculated potential of the two-hole oxidation of ascorbic acid to dehydroascorbic acid in solution (DHA/AA) at pH 2 (the experimentally measured pH of 0.2 mol $l^{-1}$ ascorbic acid).[52] All energy levels and electrochemical potentials are expressed on relative to vacuum (using −4.44 V versus vacuum=0 V versus SHE).[53] Energy levels measured by photoelectron emission spectroscopy in air (PESA) in conjunction with UV-Visible absorption spectroscopy, as shown in FIG. 30, indicate slightly different energy levels, as do cyclic voltammetry data.[54] However, in all cases the energy levels are suitable for proton reduction and AA oxidation.

In a preferred embodiment, the PM6:Y6 ratio is 7:3 and PM6:PCBM ratio is 2:8. Increasing the Y6 fraction in the PM6:Y6 blend increased the HER rate to a maximum at PM6:Y6 7:3 (9.9 µmolh$^{-1}$ cm$^{-2}$) after which further increasing the Y6 fraction decreased the HER rate. In contrast, the maximum HER rate for the PM6:PCBM NPs was obtained at PM6:PCBM 2:8 (11.3 µmolh$^{-1}$ cm$^{-2}$) and decreased rapidly when the PCBM fraction was increased further.

NPs formed from a range of PM6:Y6 and PM6:PCBM blend compositions were tested for photocatalytic $H_2$ evolution to determine the optimum D:A ratio in each blend, with the results shown in FIGS. 31-34. Error bars in FIG. 33 were calculated as a percentage uncertainty based on five repeat measurements. $H_2$ evolution conditions in FIGS. 31-34: 1 mg PM6:Y6 or PM6:PCBM nanoparticles, 0.2 mol $l^{-1}$ ascorbic acid (12 ml), pH 2.4, 10 µg (10 wt. %) Pt, AM1.5 g solar simulator at 100 mWcm$^{-2}$ (1 sun), 4.4±0.1 cm$^2$ illumination area. $H_2$ evolution was measured in the presence of AA and Pt that was photodeposited in situ on the organic NP surface.[55] The Pt catalyzes $H_2$ evolution driven by the transfer of photogenerated electrons from the organic NPs, providing sites for proton adsorption and electron accumulation.[56,57] The AA extracts photogenerated holes from the organic NP, and becomes oxidized to dehydroascorbic acid.

In one embodiment, all NPs composed of a D/A blend achieved higher HER rates than those formed of the pristine semiconductors. This was attributed to improved charge generation in the blend NPs compared to NPs comprised of the individual semiconductors due to the presence of a D/A heterojunction in the NP.

In one embodiment, optimizing the Pt loading further increased the average HER rate over 16 h of the PM6:PCBM 2:8 NPs to a maximum of 16.7 µmolh$^{-1}$ cm$^{-2}$ (73.7 mmolh$^{-1}$ g$^{-1}$) at 5% Pt.

In one embodiment, the PM6:PCBM 2:8 NPs exhibited higher HER rates than the PM6:Y6 7:3 NPs even though the absorption cutoff of the PM6:Y6 7:3 NPs extends approximately 200 nm further into the visible-NIR spectrum.

In a preferred embodiment, the optimized Pt loading for PM6:Y6 at ratio of 7:3 is about 10% and PM6:PCBM at ratio of 2:8 is about 5%.

Figure 35:
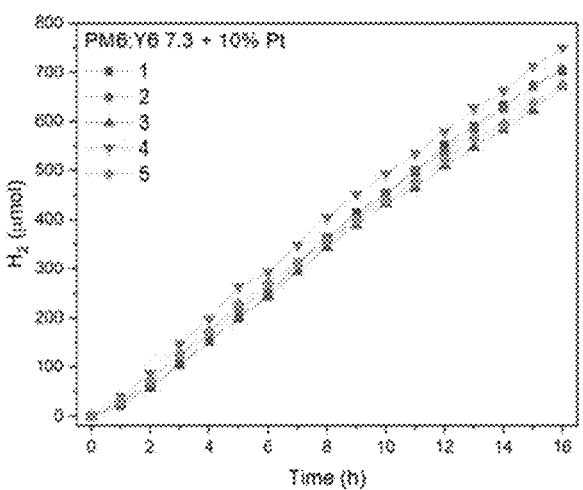
FIG. 35 is a graph illustrating the individual data plots of the 5 repeat $H_2$ evolution measurements of the PM6:Y6 7:3+10% Pt nanoparticles according to an exemplary embodiment of the present disclosure.
Figure 36:
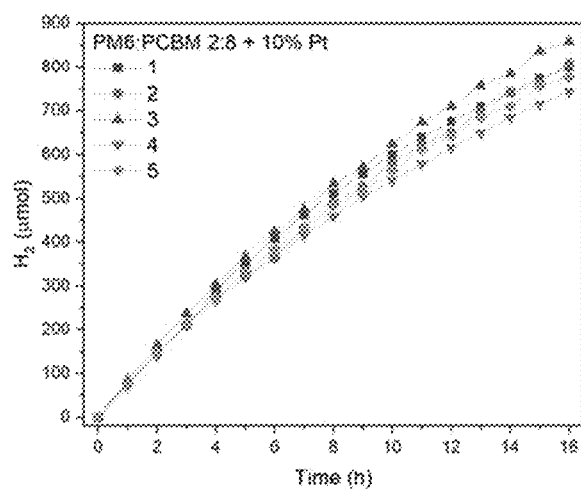
FIG. 36 is a graph illustrating the individual data plots of the 5 repeat $H_2$ evolution measurements of the PM6:PCBM 2:8+10% Pt nanoparticles according to an exemplary embodiment of the present disclosure.

FIGS. 35 and 36 show individual data plots of the 5 repeat $H_2$ evolution measurements of the PM6:Y6 7:3+10% Pt and PM6:PCBM 2:8+10% Pt nanoparticles. FIGS. 37-40 show extended stability data and Pt optimization regarding the nonlinearity of the HER rates.

Figure 37:
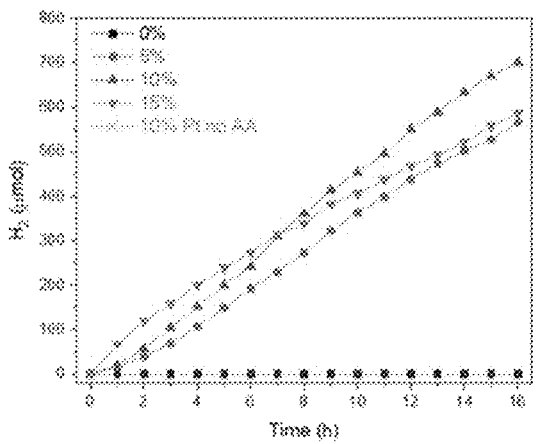
FIG. 37 is a graph illustrating the $H_2$ evolution vs. time of PM6:Y6 7:3 NPs at a range of Pt loadings according to an exemplary embodiment of the present disclosure.
Figure 38:
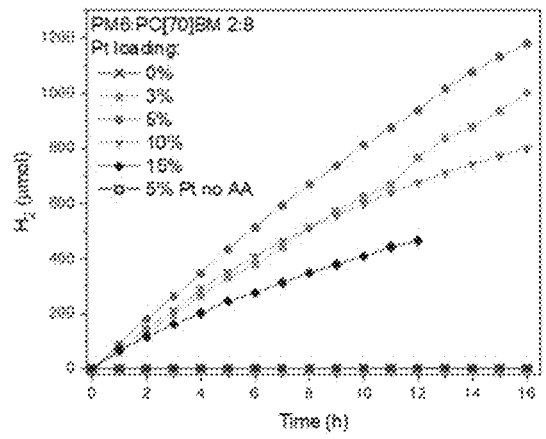
FIG. 38 is a graph illustrating the $H_2$ evolution vs. time of PM6:PCBM 2:8 NPs at a range of Pt loadings according to an exemplary embodiment of the present disclosure.
Figure 39:
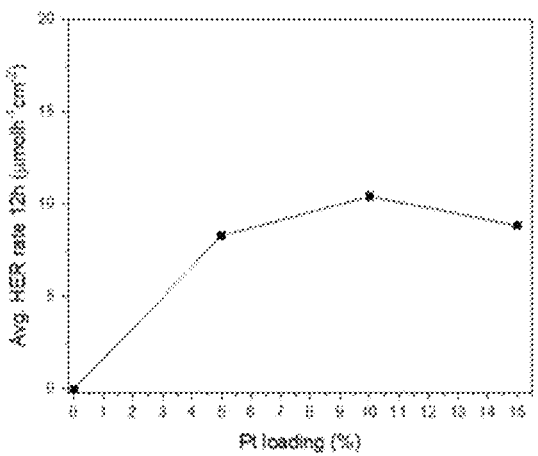
FIG. 39 is a graph illustrating the average HER rates over 12 h of PM6:Y6 7:3 NPs at a range of Pt loadings according to an exemplary embodiment of the present disclosure.
Figure 40:
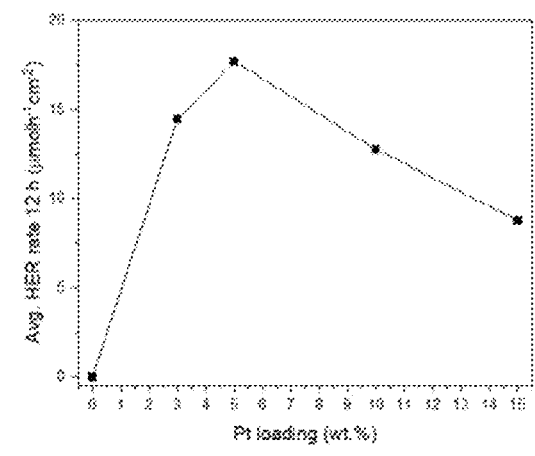
FIG. 40 is a graph illustrating the average HER rates over 12 h of PM6:PCBM 2:8 NPs at a range of Pt loadings according to an exemplary embodiment of the present disclosure.

In one embodiment, no $H_2$ evolution was observed in the absence of Pt or AA, as shown in FIGS. 37-38.

Figure 41:
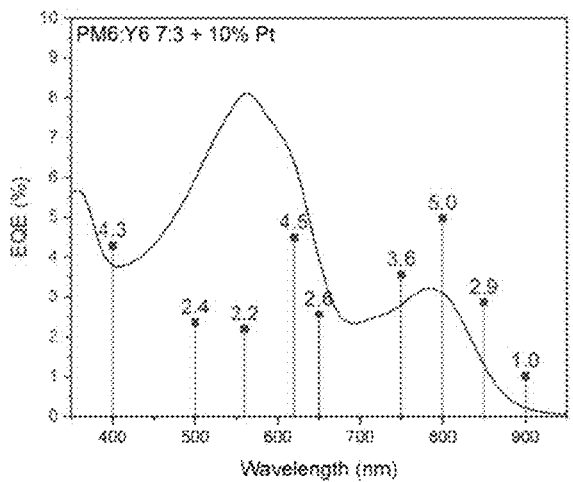
FIG. 41 is a graph illustrating the External Quantum Efficiencies (EQEs) at 400, 500, 560, 620, 650, 750, 800, 850 and 900±10 nm and the absorption spectrum of PM6:Y6 7:3 NPs with 10% Pt according to an exemplary embodiment of the present disclosure.

In one embodiment, PM6:Y6 7:3 NPs are active throughout the entire visible wavelength range and continue to be active at near infrared (NIR) wavelengths, which have thus far been under-utilized in most HEPs, as shown in the EQE spectrum of the PM6:Y6 7:3 NPs in FIG. 41. Quantitative comparison of EQE vs HER rates is complicated by the potential for a non-linear dependence of efficiency upon light intensity. Nevertheless these EQE data are both the broadest wavelength range (from 400 nm to 900 nm) and the longest single wavelength (900 nm), at which $H_2$ evolution has been reported for an organic photocatalyst to date.[43,58,59]

In one embodiment, the EQEs of PM6:Y6 7:3 NPs at 750-900 nm are comparable to those of some of the most efficient noble metal based plasmonic HEPs, a class of inorganic photocatalysts that are active at NIR wavelengths.[60,61]

In one embodiment, D/A NP photocatalysts that employ narrow bandgap organic semiconductors efficiently harvest solar photons over a broad spectrum of visible to NIR light. In a preferred embodiment, the narrow bandgap organic semiconductors is Y6.

Figure 42:
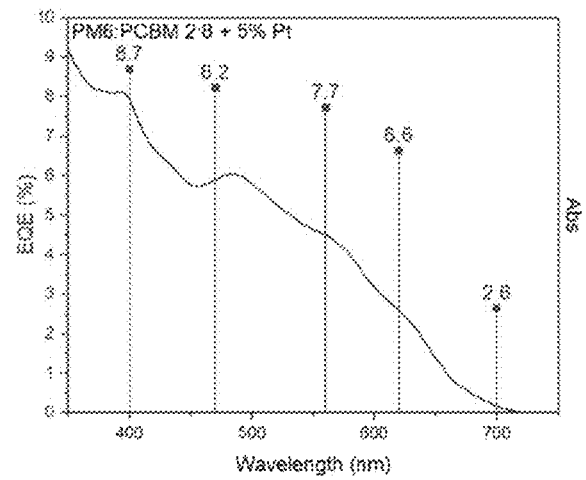
FIG. 42 is a graph illustrating the External Quantum Efficiencies (EQEs) at 400, 470, 560, 620 and 700±10 nm and the absorption spectrum of PM6:PCBM 2:8 NPs with 5% Pt according to an exemplary embodiment of the present disclosure.

In one embodiment, PM6:PCBM 2:8 NPs are active throughout the entire visible wavelength range, as shown in FIG. 42.

In one embodiment, the optimized PM6:PCBM 2:8 NPs with 5% Pt achieve a higher HER rate than the optimized PM6:Y6 NPs with 10% Pt due to their approximately 2.5 times higher EQEs throughout the visible spectrum.

In one embodiment, PM6:Y6 and PM6:PCBM NPs are operationally stable for at least 72 h.[36-39] Organic semiconductor based $H_2$ evolution photocatalyst performance comparison is shown in the Table below:

| Photocatalyst | Co-catalyst (wt %) | Holo Scavenger | Photocatalyst mass | Light source | Light intensity | Rhumination area (cm$^3$) | HER rate (µmolh$^{-1}$) | HER rate (mmolh$^{-1}$ g$^{-1}$) | Her rate (µmolh cm$^{-3}$) | Her rate per mol Pt (h$^{-1}$) | EQE (%) (A (nm)) | Stability (h) |
|---|---|---|---|---|---|---|---|---|---|---|---|---|
| PTB7-Th: EHIDTBR 3:7 NPs | Pt (10) | AA | 2 | Xe temp 860-900 nm | / | 16 | 128.9 | 64.4 | 8.1 | 125.7 | 2.0 (400) 2.3 (600) 4.3 (620) 5.0 (680) 6.2 (700) | 36 |

| Photo-catalyst | Co-catalyst (wt %) | Holo Scavenger | Photo catalyst mass | Light source | Light intensity | Rhumination area (cm³) | HER rate (μumolh⁻¹) | HER rate (mmolh⁻¹ g⁻¹) | Her rate (umolh cm⁻³) | Her rate per mol Pt (h⁻¹) | EQE (%) (A (nm)) | Stability (h) |
|---|---|---|---|---|---|---|---|---|---|---|---|---|
| P1D² | Pd (0.4) | TEA/ MoOH | 25 | Xe temp | / | / | 61.5 | 3.3 | / | / | 11.6 (420) 8.5 (340) 0 (800) | 48 |
| PFBT:PF ODTBT TICNPs | Pt (6) | AA | 0.062 | LED PAR38 temp > 420 nm | 1 min between 450-750 nm | / | 2.8 | 60.8 | / | 148.8 | 2.2 (450) 4.8 (500) 5.0 (560) 7.1 (600) 5.1 (650) 4.1 (700) 9.2 (765) | 129 |
| FS-COF + WS5P⁵ | Pt (6) | AA | 5 | Xs temp > 420 nm | / | / | 81.5 | 16.3 | / | 39.7 | 7.2 (420) 2.2 (600) 0.7 (700) | 5 |
| TiO₃^∞ | Pt (0.2) | EtOM | 50 | UV temp | 220 Wm⁻² | 20 | 310 | 6.2 | 15.5 | 604 | 9.5 (385) | 3 |
| CN nano-sheets | Pt (3) | TEQA | 13 | Xe temp > 420 nm | / | / | 85 | 5.5 | / | 65.0 | 5.1 (420) | 30 |
| PM6:Y6 NPs (This work) | Pt (10) | AA | 1 | AM1.5 8 solar simulator | 100 mW cm³ (1 sum) | 4.45D.1 | 43.9 | 43.9 | 5.5 | 85.6 | 4.3 (400) 2.4 (500) 2.2 (560) 4.8 (620) 2.8 (650) 3.8 (750) 5.0 (800) 2.9 (850) 1.0 (900) | 72 |
| PM8:PC7 TBM NPs (This work) | | AA | 1 | | | 73.7 | 73.7 | 16.7 | | 287.6 | 8.7 (400) 8.2 (470) 7.7 (580) 5.5 (620) 2.5 (700) | 72 |

In the Table above, the longest time over which continuous H₂ evolution reported does not necessarily reflect the maximum stability of the photocatalyst. CN=carbon nitride AA=ascorbic acid, TEA=triethylamine TEOA=triethanolamine, MeOH=methanol, EtOH=ethanol.

To explore the stability and recyclability of the optimized PM6:Y6 and PM6:PCBM NPs, the photocatalysts were subjected to a 72 h extended stability test. After each 24 h cycle the reactor was evacuated, the NPs were removed from the reaction medium with the aid of a centrifugal filter and the AA solution was replaced (see experimental section for details).

In one embodiment, both M6:Y6 and PM6:PCBM NPs photocatalysts remained active throughout the 72 h period.

In one embodiment, the PM6:Y6 NPs retained 99% and 92% of their original 24 h HER rate during the second and third 24 h cycles, respectively.

In one embodiment, the PM6:PCBM NPs retained 99% and 71% of their original 24 h HER rate during the second and third 24 h cycles, respectively.

The results of the stability tests are shown in FIGS. 70-73. In FIGS. 70-73, the H₂ evolution conditions are: 1 mg PM6:Y6 or PM6:PCBM nanoparticles, 0.2 mol l⁻¹ ascorbic acid (12 ml), pH 2.4, AM1.5 g solar simulator at 100 mWcm⁻² (1 sun), 4.4±0.1 cm² illumination area. Between cycles, as indicated by dashed vertical lines, the reactor was evacuated, the NPs were removed from the reaction medium with the aid of a centrifugal filter and fresh AA was added. After the second recycling step, approximately 20% of the PM6:PCBM NPs remained adsorbed to the filter, leading to a reduction in the photocatalyst loading in the final run.

The PM6:Y6 and PM6:PCBM NPs are thus among the most stable visible light active organic H₂ evolution photocatalysts currently reported, as shown in the comparison table above.[37,38,40,41] Thus, the non-linearity observable on the 16 h timescale was not caused by photocatalyst degradation, co-catalyst degradation or photocatalyst aggregation. It must, therefore, be caused by changing conditions within the reactor during each run. The most likely cause of this nonlinearity is the depletion of AA and/or the accumulation of AA degradation products impeding the HER as has been reported previously for organic NP photocatalysts.[37] Nevertheless, the total amount of H₂ generated in each sequential 24 h run decreased slightly after each run and the NP UV-Vis absorption spectra became slightly altered after 72 h of continuous H₂ evolution. This suggests that semiconductor degradation in the NPs is responsible for this slower reduction in the HER rate. The absorption spectrum of the PM6:PCBM NPs displays an increase in absorbance at wavelengths <400 nm after 72 h of H₂ evolution, which could be indicative of PCBM photodimerization.[42]

Nanoparticle Imaging

Figures 43, 44:
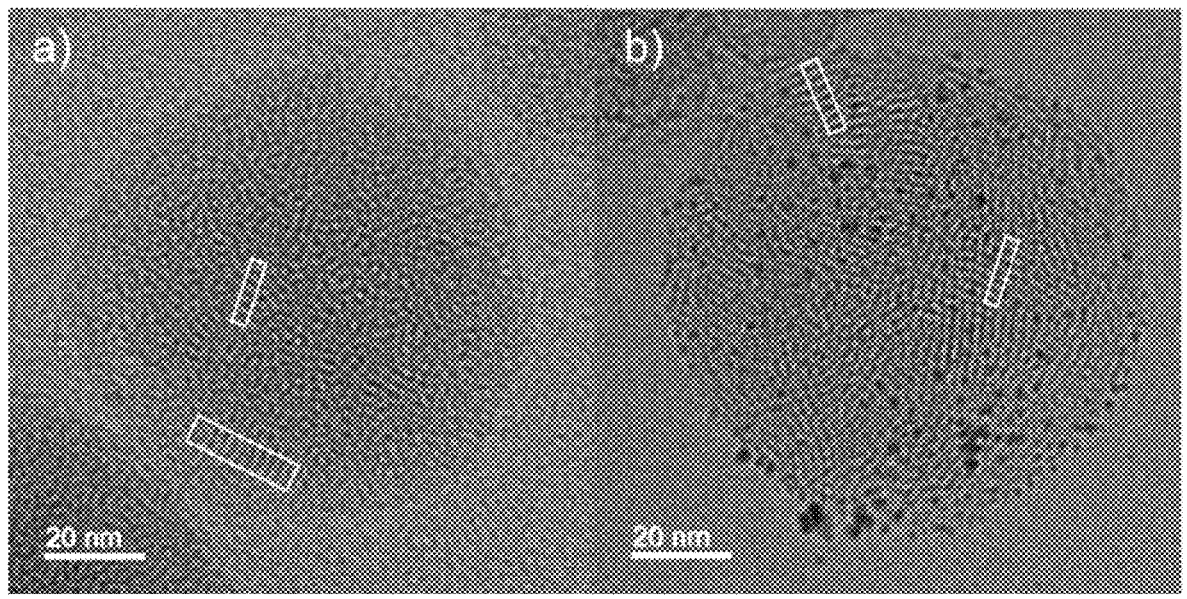
FIG. 43 is a bright field cryo-TEM image showing the PM6:Y6 7:3 NPs before photodeposition of 10 wt. % Pt and 20 h $H_2$ evolution according to an exemplary embodiment of the present disclosure.
FIG. 44 is a bright field cryo-TEM image showing the PM6:Y6 7:3 NPs after photodeposition of 10 wt. % Pt and 20 h $H_2$ evolution according to an exemplary embodiment of the present disclosure.
Figure 45:
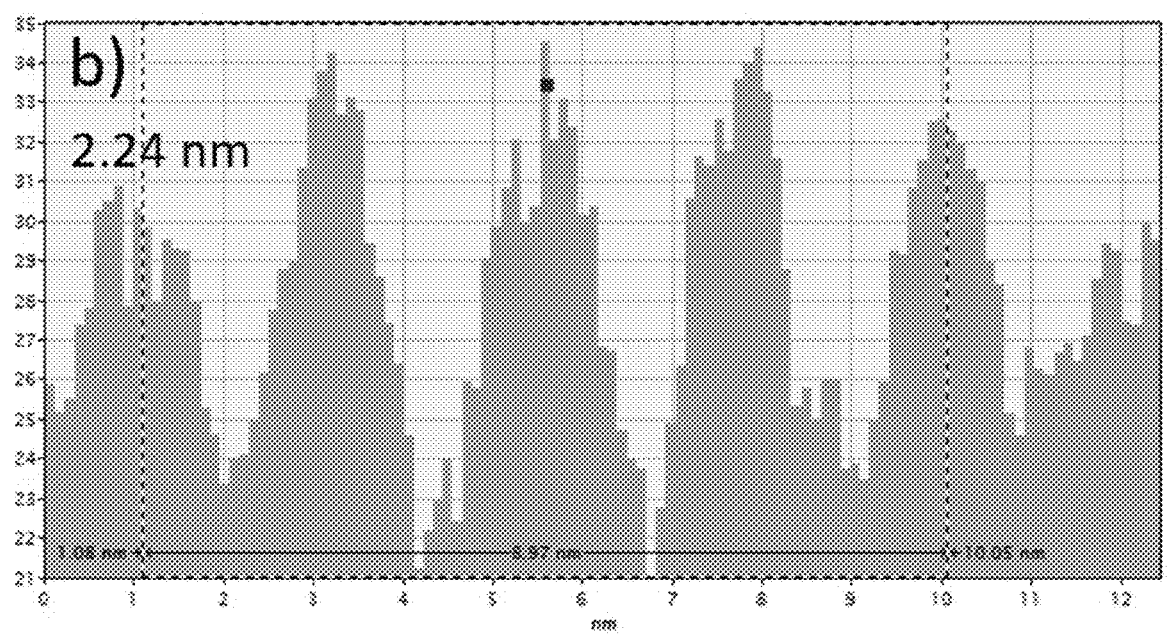
FIG. 45 is a graph showing the profiles of the periodic spacings in the upper rectangle in FIG. 43 according to an exemplary embodiment of the present disclosure.
Figure 46:
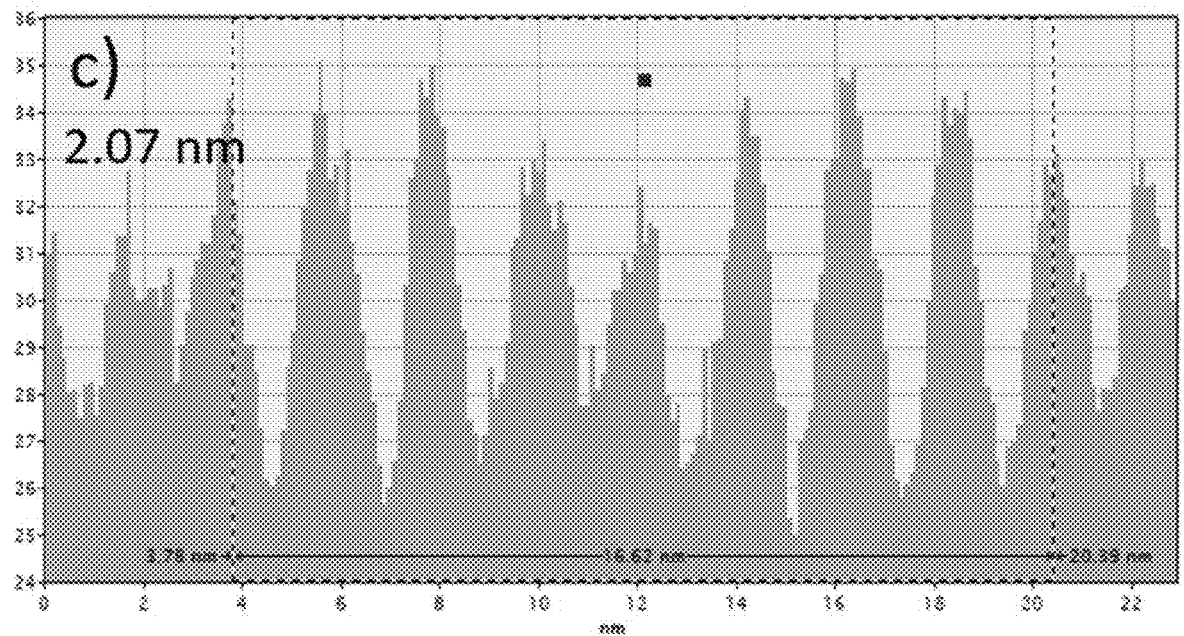
FIG. 46 is a graph showing the profiles of the periodic spacings in the lower rectangle in FIG. 43 according to an exemplary embodiment of the present disclosure.
Figure 47:
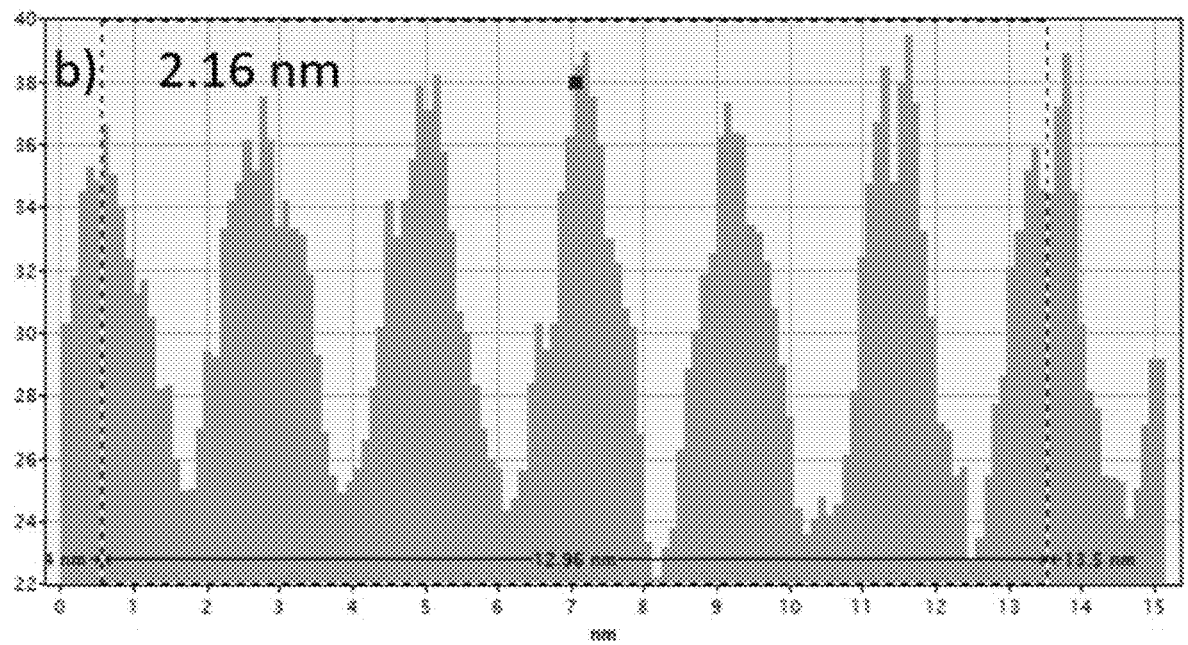
FIG. 47 is a graph showing the profiles of the periodic spacings in the upper rectangle in FIG. 44 according to an exemplary embodiment of the present disclosure.
Figure 74:
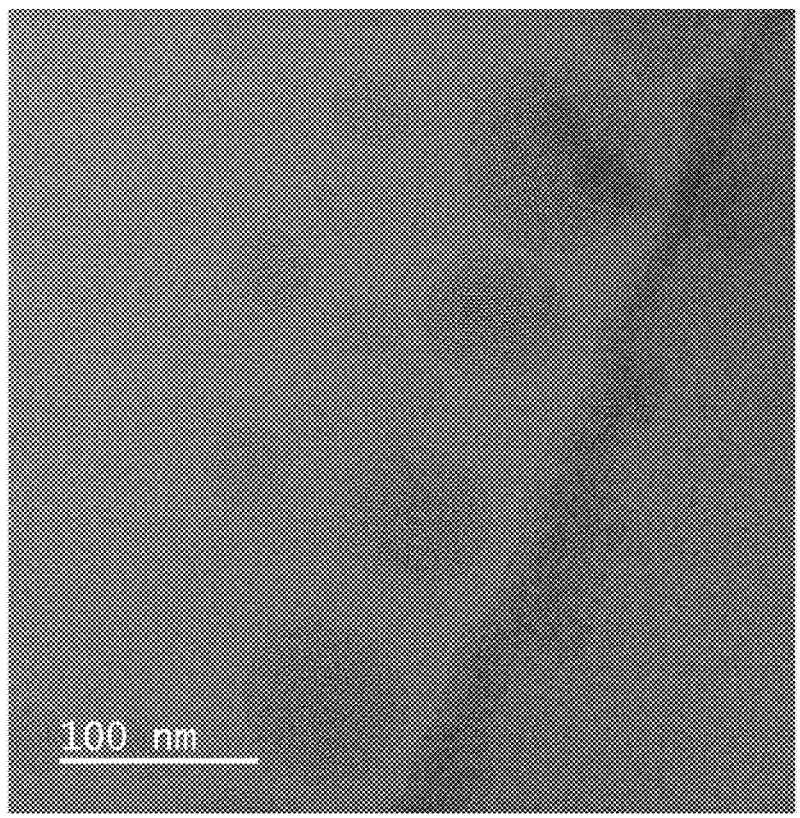
FIG. 74 is a photo showing the bright field Cryo-TEM image displaying several PM6:Y6 7:3 NPs according to an exemplary embodiment of the present disclosure.
Figure 75:
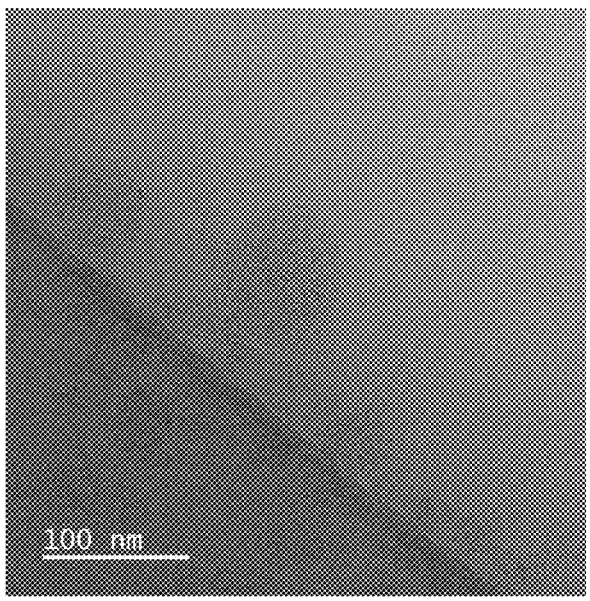
FIG. 75 is a photo showing one bright field Cryo-TEM image displaying several PM6:Y6 7:3 NPs following 10 wt. Pt deposition according to an exemplary embodiment of the present disclosure.
Figure 76:
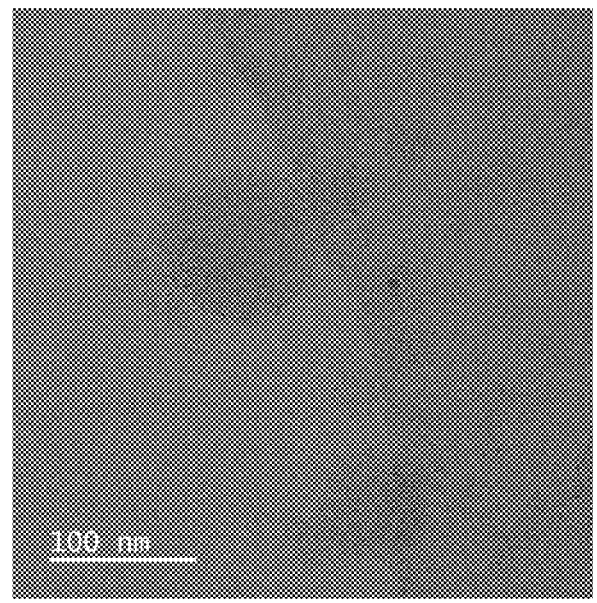
FIG. 76 is a photo showing a second bright field Cryo-TEM image displaying several PM6:Y6 7:3 NPs following 10 wt. Pt deposition according to an exemplary embodiment of the present disclosure.

In one embodiment, imaging the NPs by cryogenic Transmission Electron Microscopy (cryo-TEM) revealed that the PM6:Y6 NPs contain numerous crystalline domains with lattice spacings of 2.1 to 2.2 nm clearly visible as lines of alternating high and low electron density. These spacings correspond to diffraction peaks at q=0.285 Å−1 (d=21.9 Å) and q=0.300 Å−1 (d=20.9 Å) observed in thin films of PM6 and Y6 respectively by grazing incidence wide angle x-ray scattering measurements.[49] The lattice spacings of PM6:Y6 NPs in cryo-TEM photos are shown in FIGS. 43 and 44. The diameter of the lattice spacings is shown in FIGS. 45-48. FIG. 74 shows several PM6:Y6 7:3 NPs before Pt deposition, while FIGS. 75-76 show several PM6:Y6 7:3 NPs after Pt deposition.

Similar spacings are also visible in pure PM6 and pure Y6 NPs. The periodic spacings in pure PM6 and pure Y6 NPs are shown in FIGS. 80-84. Because the lattice spacings of PM6 and Y6 are similar, the images do not reveal which domains correspond to Y6 and which domains correspond to PM6. However, it can be clearly seen that neither component forms a shell, and that the NP contains many randomly arranged semicrystalline domains. Therefore, in one embodiment, the PM6:Y6 NPs have an intermixed morphology formed of randomly distributed PM6 and Y6 domains.

Figure 51:
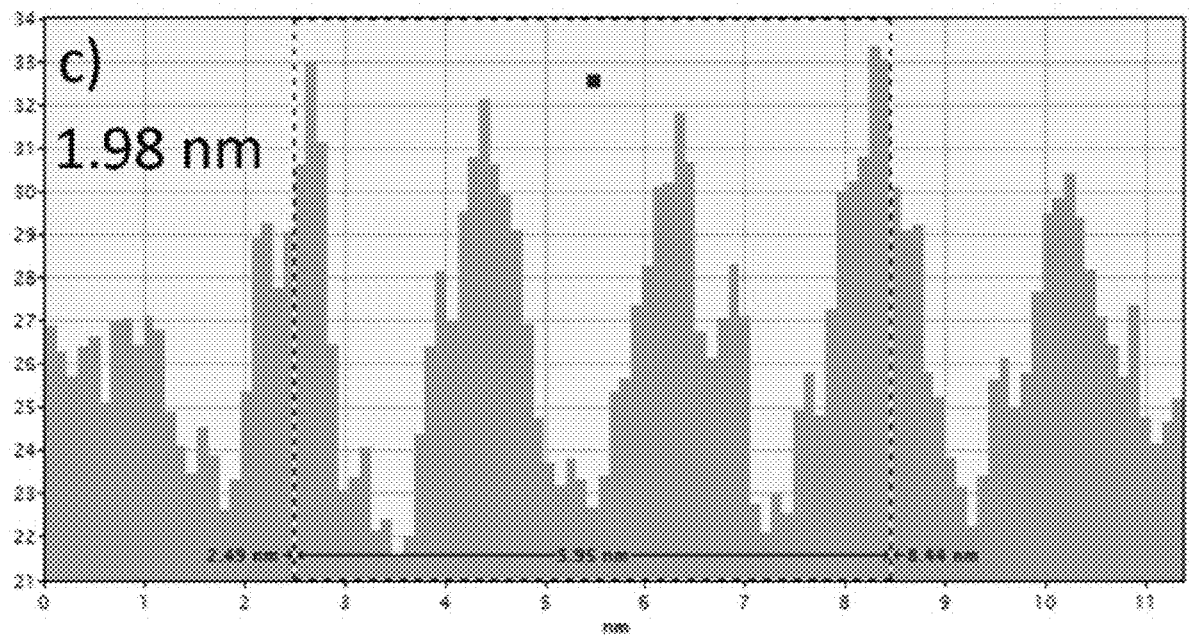
FIG. 51 is a graph showing the profiles of the periodic spacings in the rectangle in FIG. 49 according to an exemplary embodiment of the present disclosure.
Figure 52:
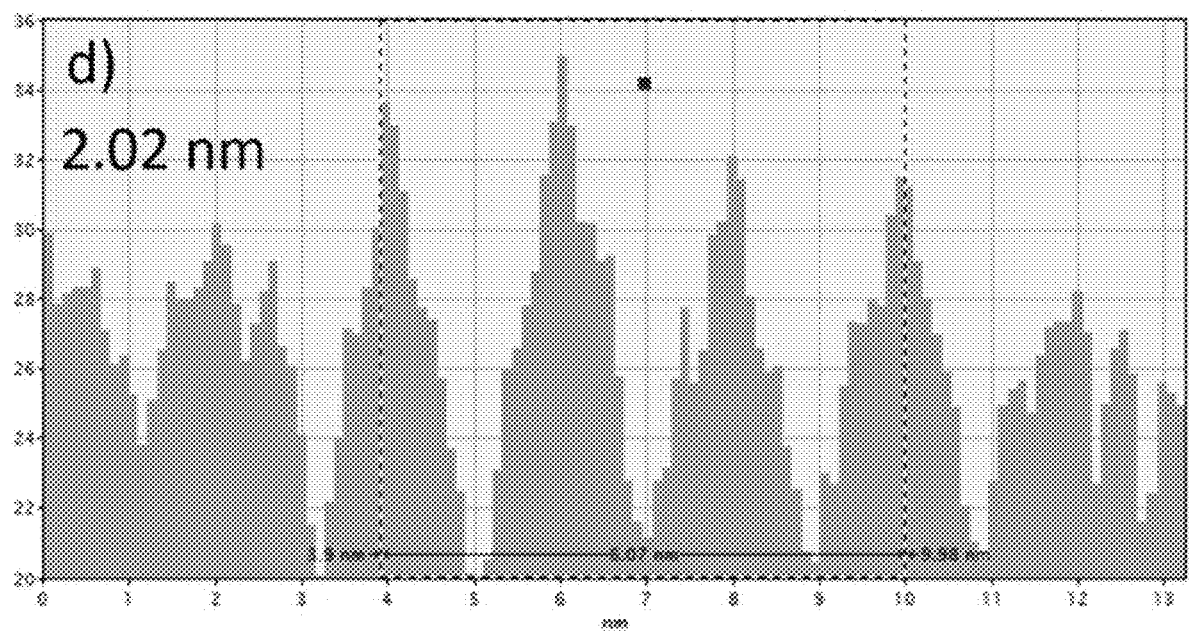
FIG. 52 is a graph showing the profiles of the periodic spacings in the rectangle in FIG. 50 according to an exemplary embodiment of the present disclosure.
Figure 77:
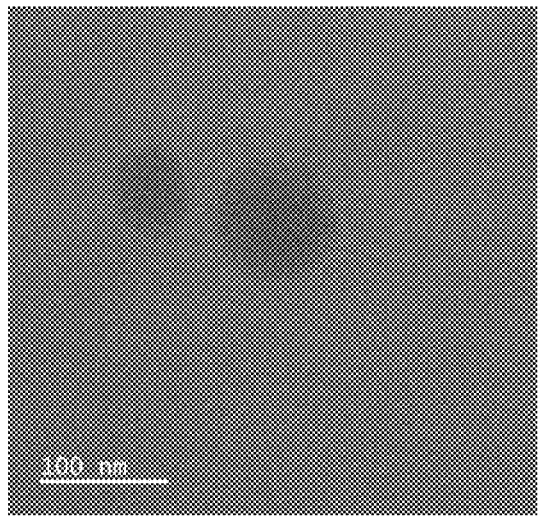
FIG. 77 is a photo showing one bright field Cryo-TEM image displaying several PM6:PCBM 2:8 NPs according to an exemplary embodiment of the present disclosure.
Figure 78:
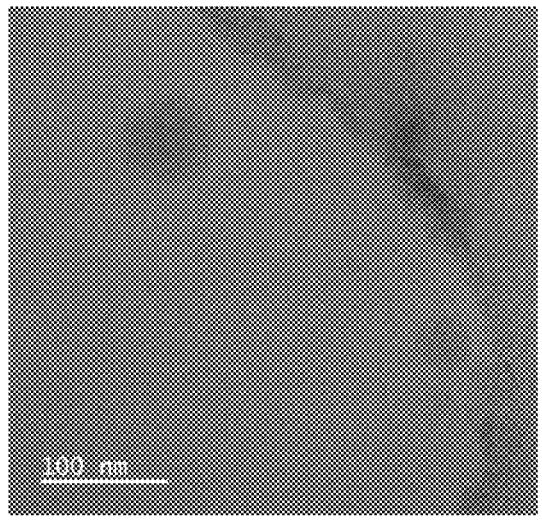
FIG. 78 is a photo showing a second bright field Cryo-TEM image displaying several PM6:PCBM 2:8 NPs according to an exemplary embodiment of the present disclosure.
Figure 79:
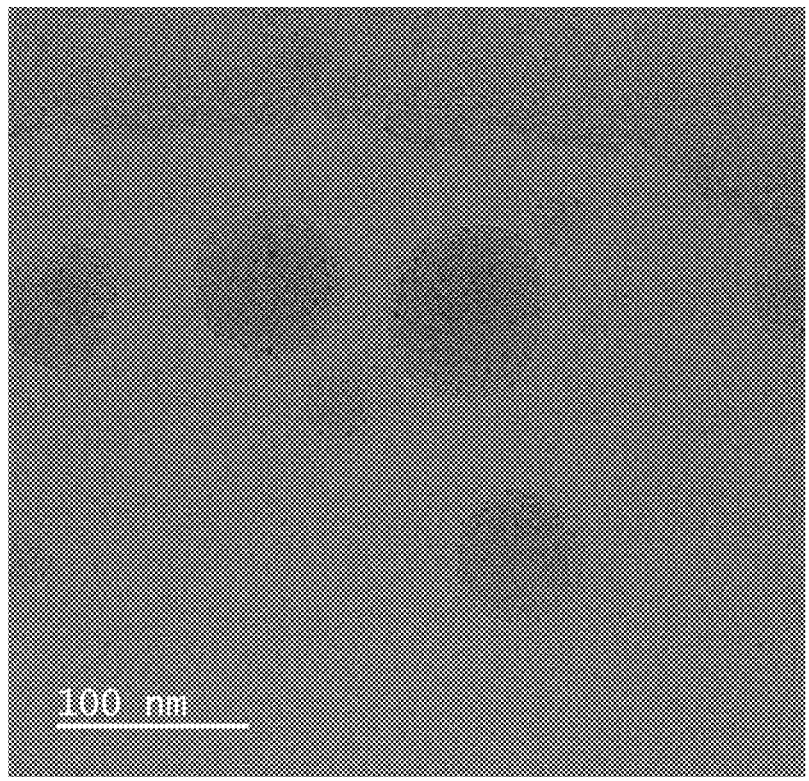
FIG. 79 is a photo showing the bright field Cryo-TEM image displaying several PM6:PCBM 2:8 NPs following 10 wt. Pt deposition according to an exemplary embodiment of the present disclosure.
Figure 80:
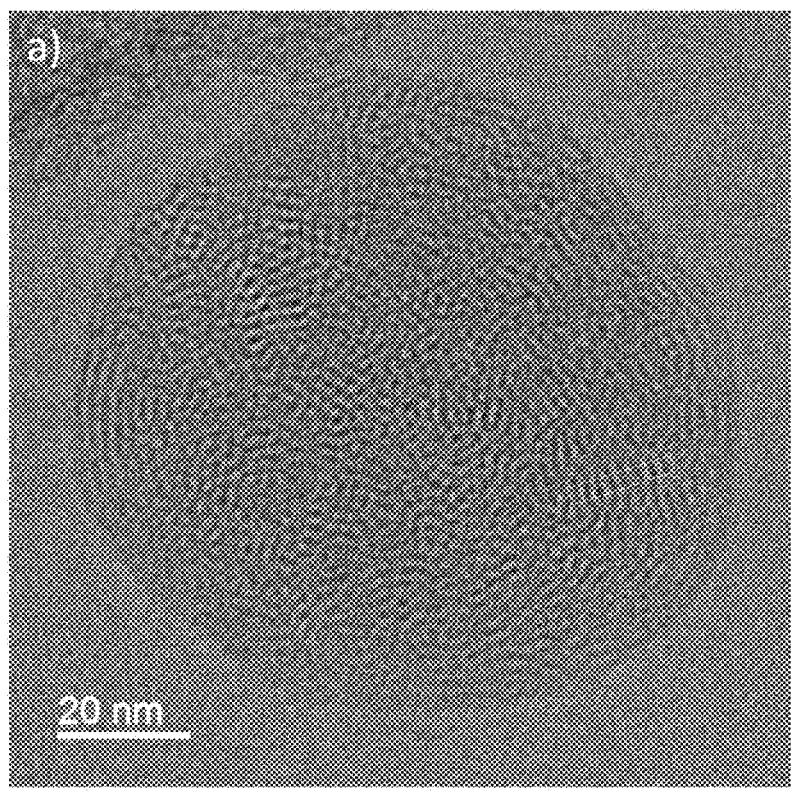
FIG. 80 is a bright field Cryo-TEM image showing PM6 NPs according to an exemplary embodiment of the present disclosure.
Figure 81:
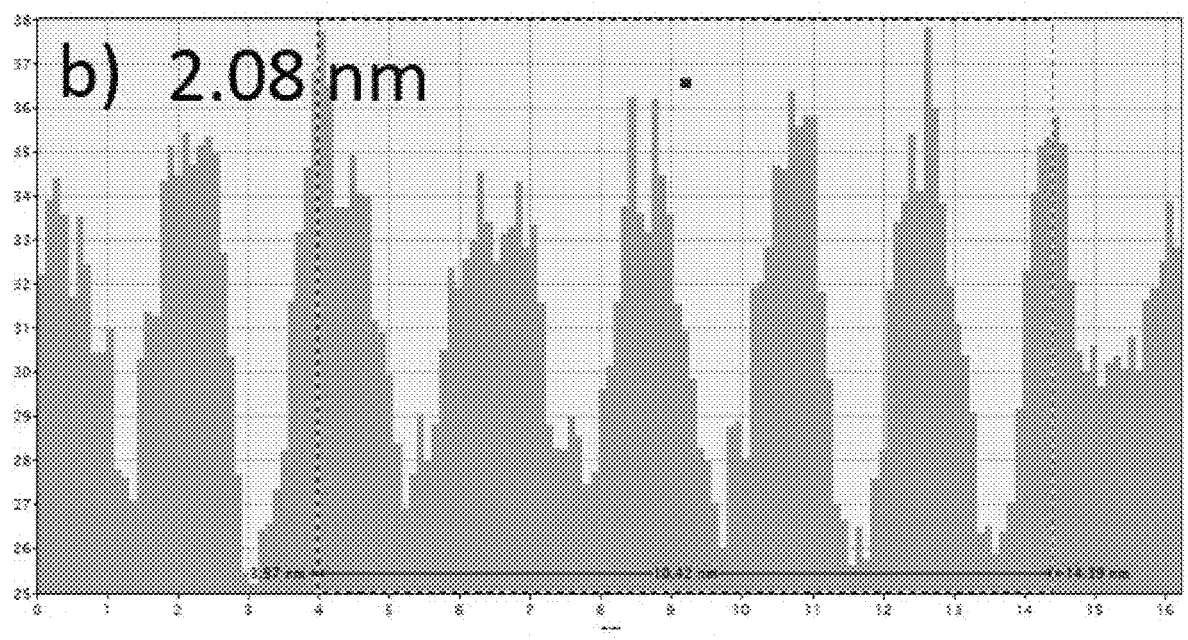
FIG. 81 is a graph showing the profiles of the periodic spacings in the upper rectangle in FIG. 80 according to an exemplary embodiment of the present disclosure.
Figure 82:
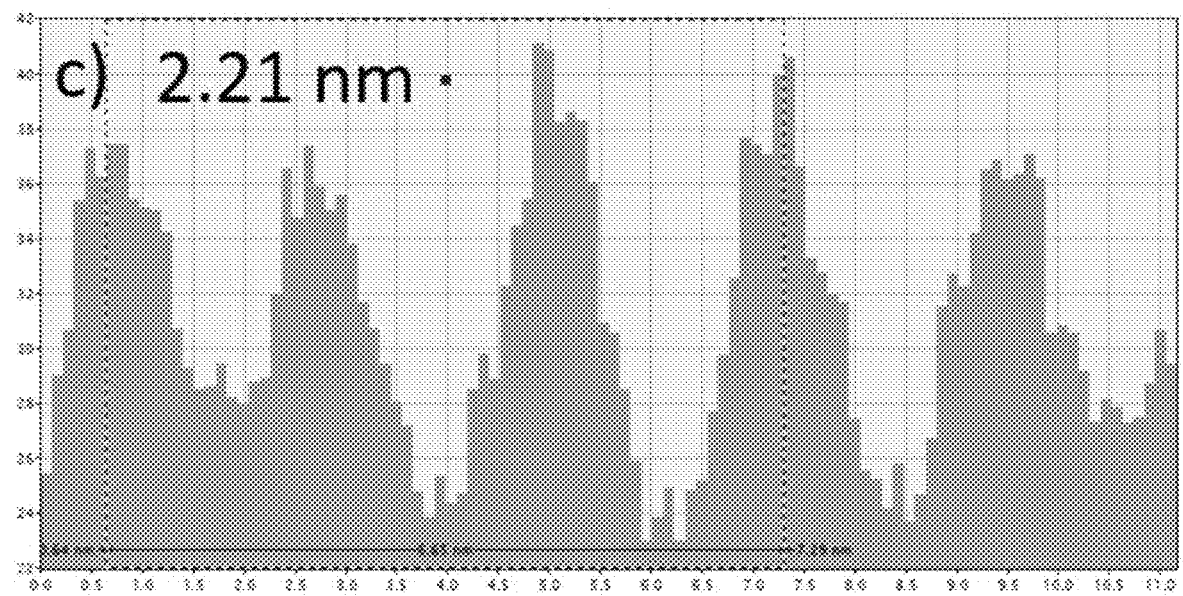
FIG. 82 is a graph showing the profiles of the periodic spacings in the lower rectangle in FIG. 80 according to an exemplary embodiment of the present disclosure.
Figure 83:
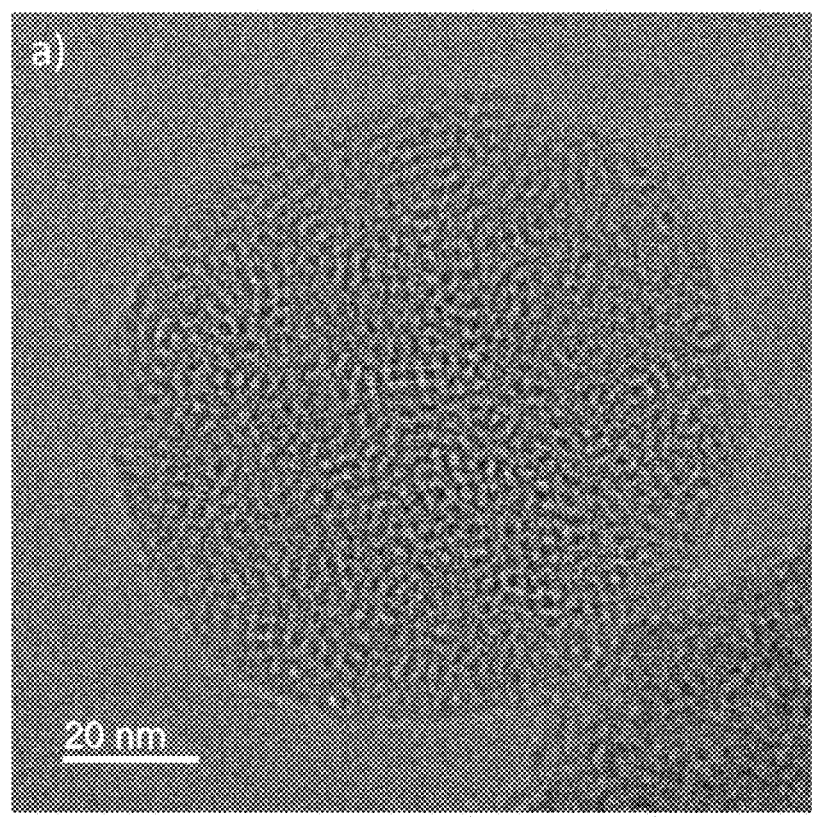
FIG. 83 is a bright field Cryo-TEM image showing Y6 NPs according to an exemplary embodiment of the present disclosure.
Figure 84:
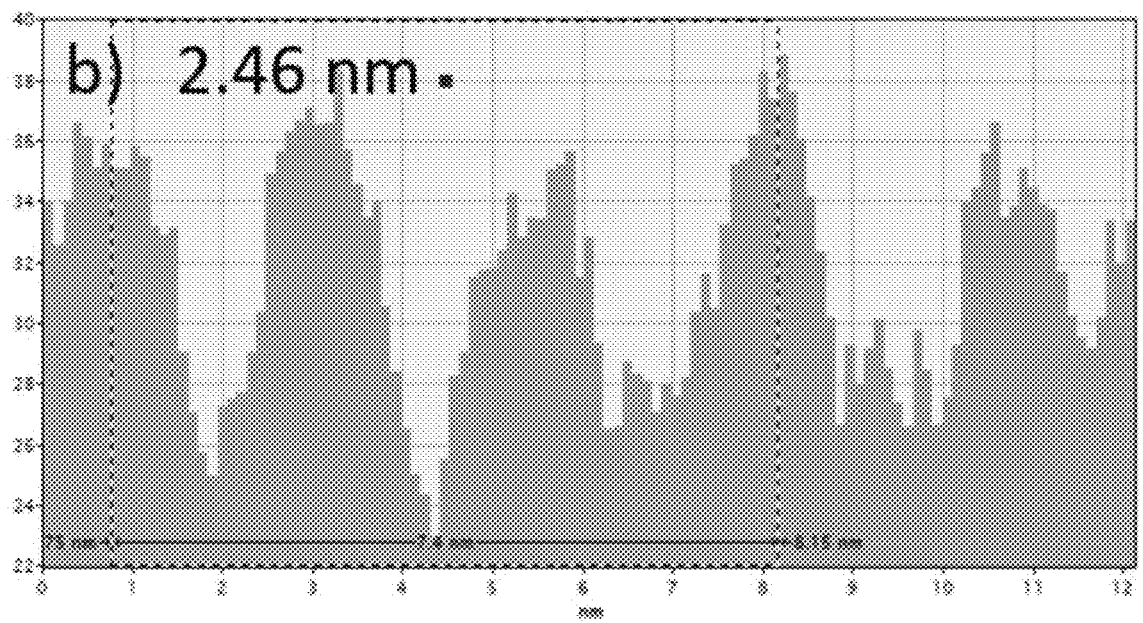
FIG. 84 is a graph showing the profiles of the periodic spacings in the rectangle in FIG. 83 according to an exemplary embodiment of the present disclosure.
Figure 85:
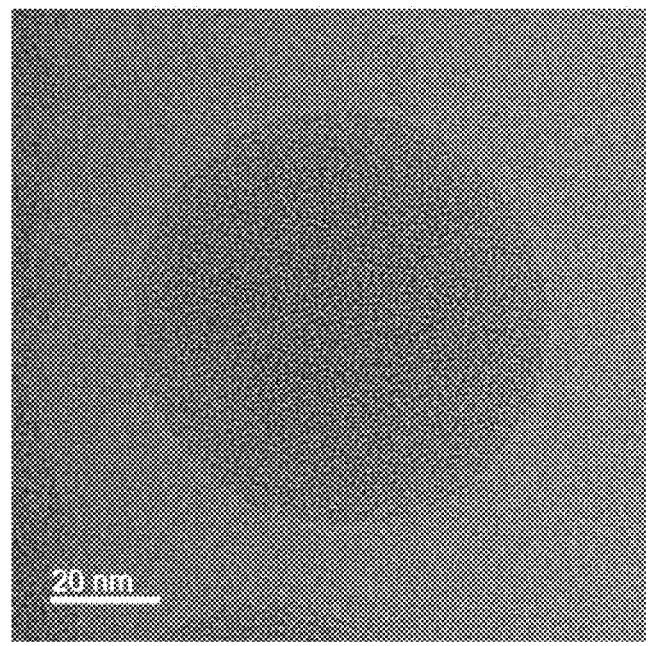
FIG. 85 is a bright field Cryo-TEM image showing PCBM NPs according to an exemplary embodiment of the present disclosure.

In one embodiment, the PM6:PCBM NPs display a core/shell structure, with a 5-10 nm PM6 shell partially surrounding a single large PCBM core domain. The 2.0 nm lattice spacing in the shell corresponds to the PM6 lamellar stacking distance,[49] while the structure of the core domain resembles that of pure PCBM NPs. The lattice spacings of PM6:PCBM NPs in cryo-TEM photos are shown in FIGS. 49 and 50. FIGS. 77-78 show several PM6:PCBM 2:8 NPs before Pt deposition, while FIG. 79 shows several PM6:PCBM 2:8 NPs after Pt deposition. The diameter of the lattice spacings is shown in FIGS. 51-52. The periodic spacings in pure PCBM NPs are shown in FIG. 85.

The different morphologies of the PM6:Y6 and PM6:PCBM NPs are most likely due to the different miscibilities of the semiconductor blends. PM6 and Y6 are highly miscible,[62] which favors an intermixed NP morphology, whereas PM6 and PCBM have low miscibility,[60] which leads to their phase separated core/shell morphology.

In one embodiment, the presence of photodeposited Pt on the NPs makes them more resistant to the electron beam during visualization using cryo-TEM, which enables more detailed images to be acquired.

In one embodiment, both the PM6:Y6 NPs and the PM6:PCBM NPs allow deposition of approximately 1-2 nm diameter Pt particles on their surface, by examining the NP photocatalysts after Pt photodeposition, shown in FIGS. 44 and 50, respectively.

In one embodiment, the Pt is distributed fairly uniformly over the PM6:Y6 NP surface.

In one embodiment, on the PM6:PCBM NPs, the Pt is preferentially localized on exposed sections of the PCBM core. A considerable body of work has been dedicated to selectively photodepositing various co-catalysts on specific crystal facets of inorganic semiconductor crystals in order to enhance their photocatalytic activity.[43-45] However, the location of co-catalyst particles photodeposited on organic semiconductor photocatalysts has not previously been correlated with any feature of the underlying organic semiconductor(s).[40,46] By considering that the Pt particles are formed on the organic NP surface via reductive photodeposition,[45] the different Pt distributions on the PM6:Y6 and PM6:PCBM NPs can be rationalized. During reductive photodeposition, aqueous $Pt^{4+}$ (from $K_2PtCl_6$) is reduced by photogenerated electrons from the semiconductor to form metallic $Pt^{4+}$, which remains adsorbed on the semiconductor surface.[45] Consequently, photodeposition tends to localize Pt on sections of the semiconductor surface that can provide the highest concentration of photogenerated electrons.[43,44] This can greatly enhance the efficiency of a photocatalyst because it improves the ability of the Pt co-catalyst to extract photogenerated electrons from the semiconductor.[45] In an organic D/A heterojunction, Pt should be preferentially deposited on sections of the NP surface where the electron acceptor (Y6 or PCBM) is exposed. The intermixed bulk heterojunction morphology of the PM6:Y6 NPs is likely to contain many randomly distributed Y6 domains, which leads to the random distribution of Pt NPs observed on its surface. However, in the PM6:PCBM NPs the PCBM core is only exposed in certain sections of the NP, which leads to the observed localization of Pt on sections of the NP surface where the PCBM core is exposed.

In one embodiment, the PM6:Y6 NPs require a higher Pt loading for optimum performance, consistent with the more efficient localization of Pt on exposed acceptor domains in the PM6:PCBM NPs.

Photophysical Characterization

In one embodiment, the PM6:PCBM NPs and PM6:PCBM NPs demonstrate high efficiency and high EQEs.

Figures 53, 54, 55:
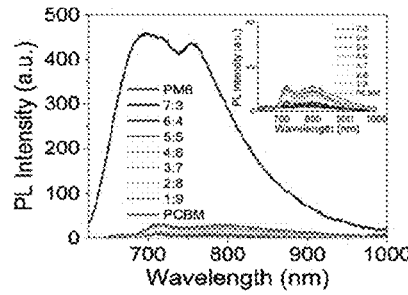
FIG. 53 is a graph showing the steady state photoluminescence (PL) spectra of PM6:PCBM NPs at different PM6:PCBM composition ratios exciting at 532 nm to selectively excite PM6, with the insert showing spectra for 450 nm excitation to preferentially excite PCBM according to an exemplary embodiment of the present disclosure.
FIG. 54 is a graph showing the steady state photoluminescence (PL) spectra of PM6:Y6 NPs at different PM6:Y6 ratios excited at 532 nm to preferentially excite PM6 according to an exemplary embodiment of the present disclosure.
FIG. 55 is a graph showing the steady state photoluminescence (PL) spectra of PM6:Y6 NPs at different PM6:Y6 ratios excited at 780 nm for selective excitation of Y6 according to an exemplary embodiment of the present disclosure.

Photoluminescence (PL) spectra were collected to explore the exciton dissociation following either donor or acceptor photoexcitation in the NPs. Following excitation of PM6 at 630 nm, the PM6:PCBM NPs exhibit strong PL quenching (PLQ) of PM6 excitons (at 700 nm) relative to neat PM6 NPs at all compositions (PLQ>96%), indicative of efficient electron transfer from PM6 excitons to the PCBM acceptor, as shown in FIG. 53. In contrast, partially selective excitation of PCBM at 450 nm showed inefficient PLQ of PCBM excitons at all compositions (PLQ<60%), as shown in the insert of FIG. 53. The suspensions in FIG. 53 were prepared with an absorbance of 0.05 at the excitation wavelength to ensure equal numbers of absorbed photons. These PLQ efficiencies are consistent with the core/shell morphology of these NPs determined from our cryo-TEM data. The thin PM6 shell facilitates PM6 exciton diffusion to heterojunction interfaces, whilst the lower separation efficiencies observed for PCBM excitons is attributed to the presence of a PCBM core with dimensions larger than the exciton diffusion lengths reported previously for PCBM excitons (~5 nm).[64,65] However, PCBM absorption in these NPs is only significant at ultraviolet wavelengths, as shown in FIGS. 23-24. The low efficiency of PCBM exciton separation is therefore unlikely to impact significantly on their solar to hydrogen conversion efficiency.

Figure 56:
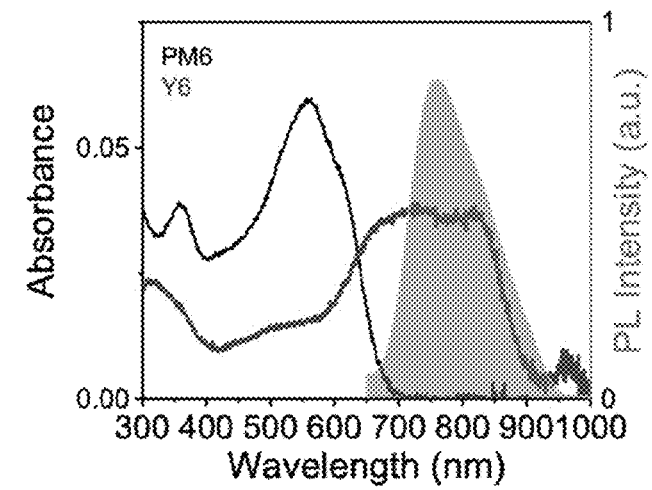
FIG. 56 is a graph showing the comparison of absorption and steady state PL spectra of PM6 NPs (black line and grey area) with Y6 NPs absorption spectrum (red line) according to an exemplary embodiment of the present disclosure.

In one embodiment, the PM6:Y6 NPs exhibited complex PL data. Following selective excitation of PM6 at 532 nm, all heterojunction NPs exhibited strong PLQ of PM6 exciton at 700 nm. Additionally, an increase of the Y6 PL intensity was observed with increasing PM6 content, as shown in FIG. 54, indicative of energy transfer from PM6 to Y6. This observation is consistent with previous reports of ultrafast energy transfer from PM6 to Y6 in bulk heterojunction films, resulting from spectral overlap of PM6 emission and Y6 absorption, as shown in FIG. 56.[66] This energy transfer is likely to operate in parallel with electron transfer from PM6 to Y6. It is also notable that Y6 PL blue shifts with increasing PM6 content, which would be consistent with a reduction in Y6 crystallinity (this blue shift was observed in the Y6 optical absorption onset). Previous reports on PM6:Y6 film showed Förster resonance energy transfer (FRET) competes with donor—acceptor electron transfer at short distances.[30-32] This process has been assigned to FRET rather than PL emission-reabsorption due to the high efficiency and ultrafast kinetics of this process. Following selective excitation of Y6 at 780 nm as shown in FIG. 55, Y6 emission quenching was observed to be relatively modest, being maximal (PLQ~50%) for a PM6:Y6 composition ratio of 60:40. This composition for maximal Y6 PLQ is similar to the composition observed for maximal $H_2$ generation. This modest Y6 PLQ is indicative of relatively inefficient hole transfer from Y6 excitons to PM6, which may result from the presence of Y6 domains in the intermixed morphology of the PM6:Y6 NPs with a similar length scale to the Y6 exciton diffusion length (measured as 4.8 nm in films),[54] or from an insufficient interfacial energy offset. In any case, it is likely that a relatively low Y6 exciton separation efficiency is a key factor behind the lower $H_2$ evolution EQEs observed for PM6:Y6 NPs compared to PM6:PCBM, and also explains the reduction in EQE observed for higher Y6 content in these NPs.

Figure 57:
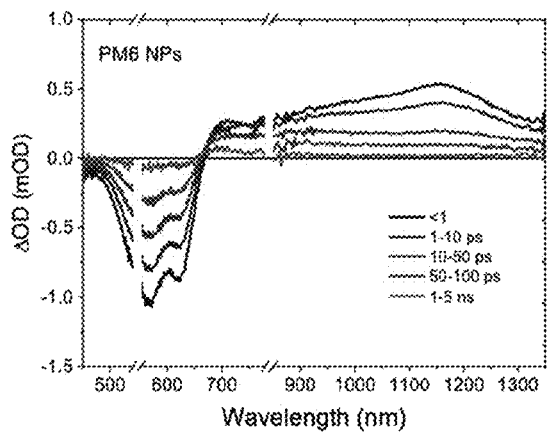
FIG. 57 is a graph showing the transient absorption spectra of PM6 NPs at different time delays following excitation at 550 nm (fluence: 7.5 μJ cm$^{-2}$) according to an exemplary embodiment of the present disclosure.
Figure 58:
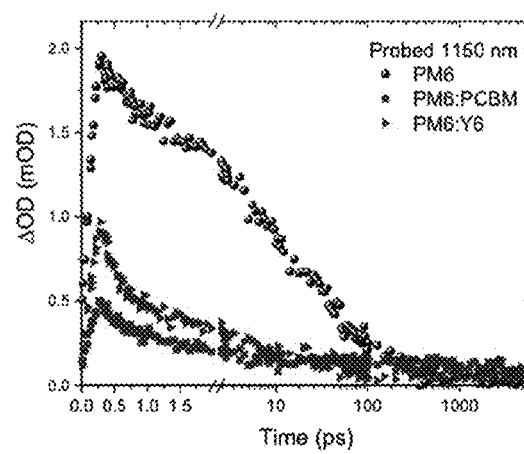
FIG. 58 is a graph showing the comparison of transient absorption decay dynamics for neat PM6, PM6:PCBM 2:8 and PM6:Y6 7:3 NPs excited at 550 nm and probed at 1150 nm, assigned to PM6 exciton decay, with the long-lived residual signal assigned to PM6 polaron decay in the heterojunction NPs according to an exemplary embodiment of the present disclosure.
Figure 88:
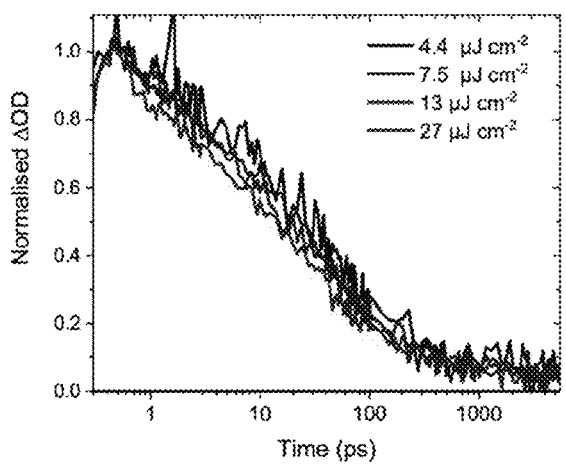
FIG. 88 is a graph showing transient absorption kinetics of PM6 NPs excited 550 nm probed at 625 nm as a function of excitation density according to an exemplary embodiment of the present disclosure.
Figure 89:
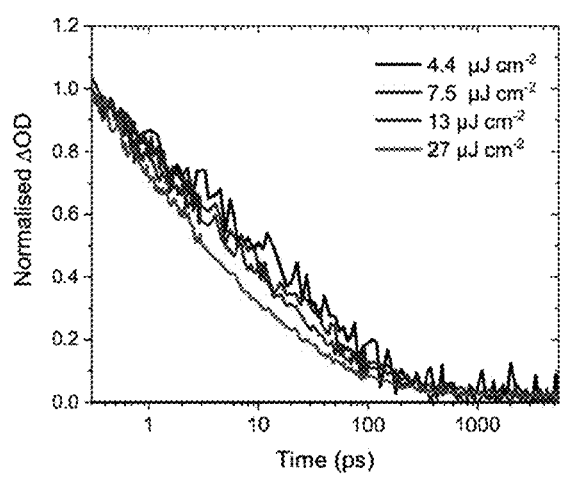
FIG. 89 is a graph showing transient absorption kinetics of PM6 NPs excited 550 nm probed at 700 nm as a function of excitation density according to an exemplary embodiment of the present disclosure.

The dynamics of charge photogeneration in selected NPs on the picosecond time scale was studied using ultrafast transient absorption spectroscopy (uf-TAS). FIGS. 57-61 show the uf-TAS spectra of PM6, PM6:PCBM 2:8 and PM6:Y6 7:3 NPs in the visible and NIR spectral regions after excitation of PM6 at 550 nm. As shown in FIG. 57, the uf-TAS spectra of PM6 NPs exhibit a broad ground state bleaching (GSB) between 450 nm and 650 nm together with a photoinduced absorption (PIA) with maximum in the NIR region at 1150 nm, attributed to PM6 singlet exciton absorption. These spectral features decay with a half-time of circa 10 ps, as shown in FIG. 58, assigned to exciton decay to ground, with the excitation density dependence shown in FIGS. 86-89.[54,67,68] These PM6 NP suspension data are similar to those reported previously for PM6 neat films.[33,34] Whilst the decay kinetics are essentially independent of excitation density as shown in FIG. 88, some contribution from exciton-exciton annihilation (EEA) cannot be ruled out, as indicated by the observation of longer (0.4 ns) decay kinetics in TCSPC transient emission measurements.

Figure 59:
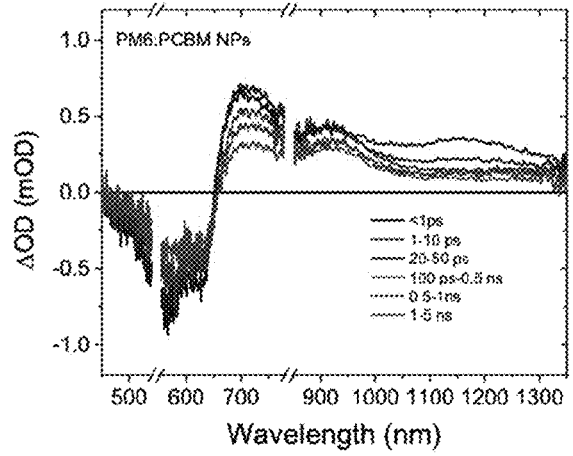
FIG. 59 is a graph showing the transient absorption spectra of PM6:PCBM 2:8 NPs at different time delays, also excited at 550 nm (fluence: 7.5 μJ cm$^{-2}$) according to an exemplary embodiment of the present disclosure.
Figure 90:
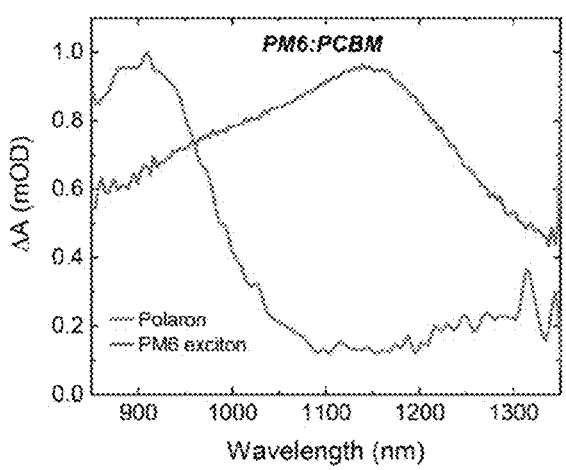
FIG. 90 is a graph showing the deconvoluted spectra of PM6:PCBM 2:8 heterojunction NPs using global analysis (GA) according to an exemplary embodiment of the present disclosure.
Figure 91:
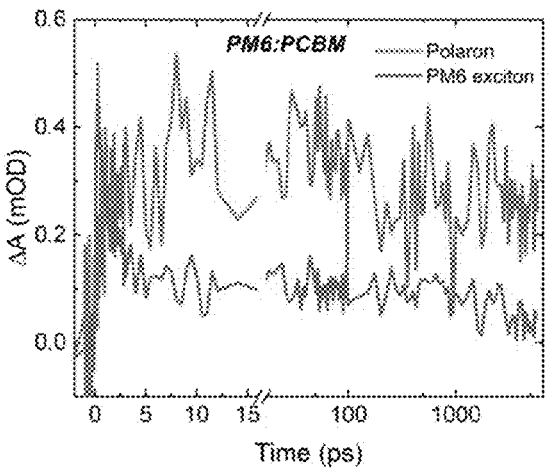
FIG. 91 is a graph showing the kinetics of PM6:PCBM 2:8 heterojunction NPs using global analysis (GA) according to an exemplary embodiment of the present disclosure.
Figure 92:
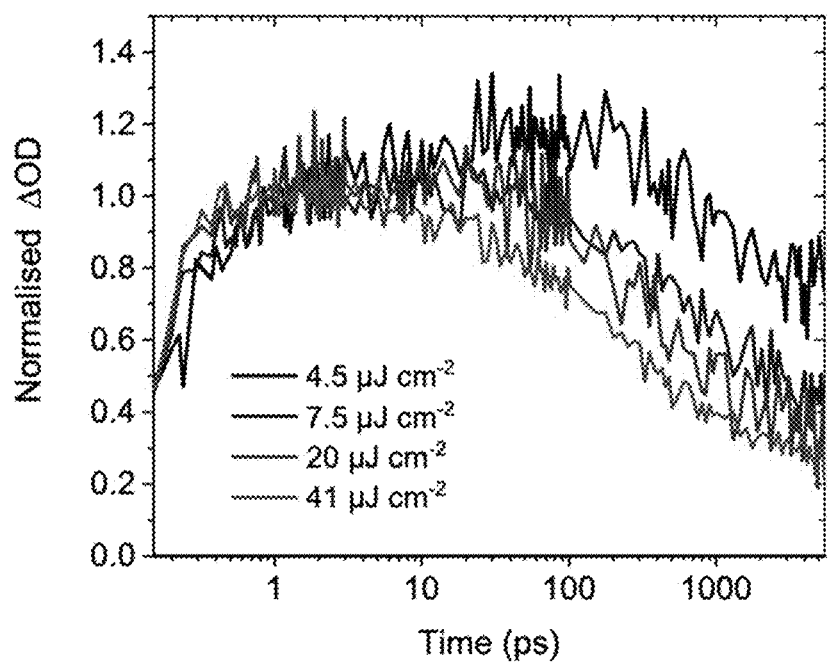
FIG. 92 is a graph showing the transient absorption decay dynamics as a function of excitation density of PM6:PCBM 2:8 excited at 550 nm and probed at 750 nm, assigned to $PM6^+$ polaron absorption according to an exemplary embodiment of the present disclosure.
Figure 93:
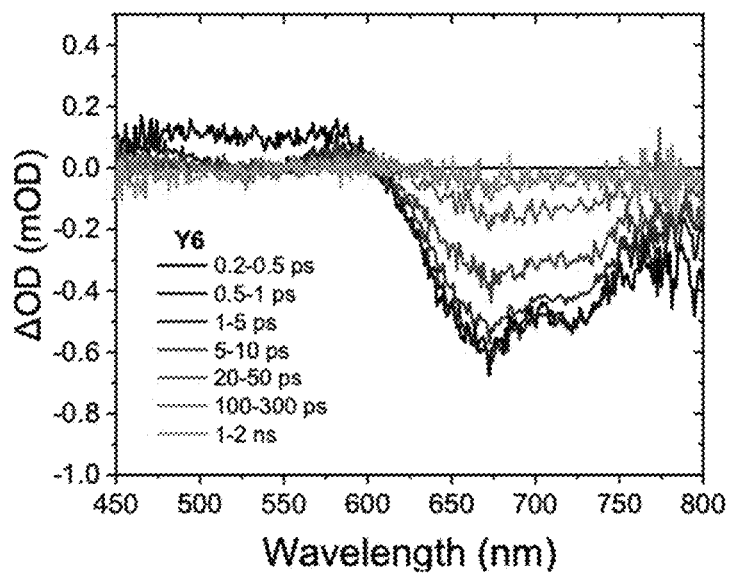
FIG. 93 is a graph showing the transient absorption spectra of neat Y6 NPs excited at 800 nm (4.4 µJ $cm^{-2}$) and probed at visible region according to an exemplary embodiment of the present disclosure.
Figure 94:
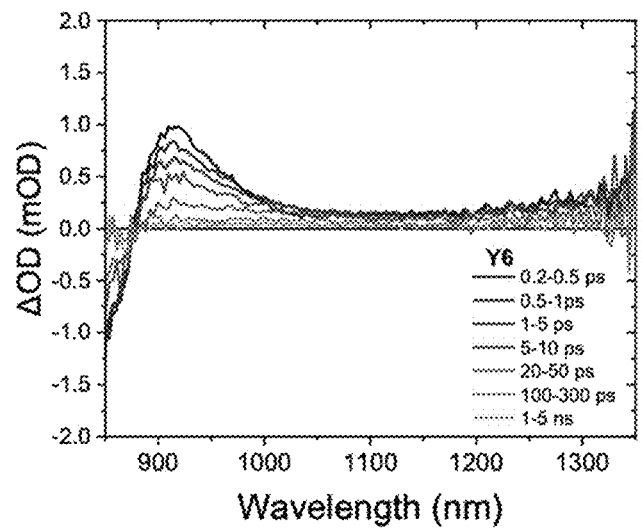
FIG. 94 is a graph showing the transient absorption spectra of neat Y6 NPs excited at 800 nm (4.4 µJ $cm^{-2}$) and probed at near IR region according to an exemplary embodiment of the present disclosure.
Figure 95:
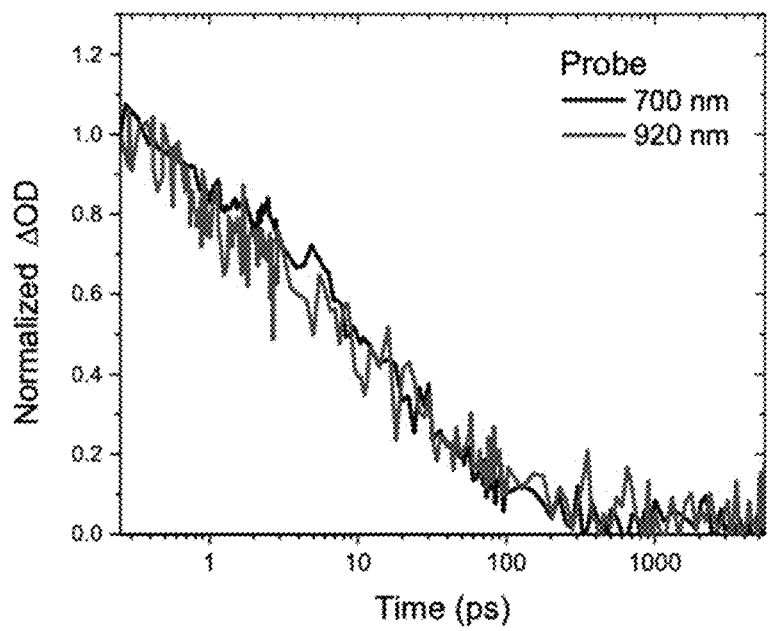
FIG. 95 is a graph showing the transient absorption kinetics of Y6 excited 800 nm probed at 700 nm and 920 nm according to an exemplary embodiment of the present disclosure.
Figure 96:
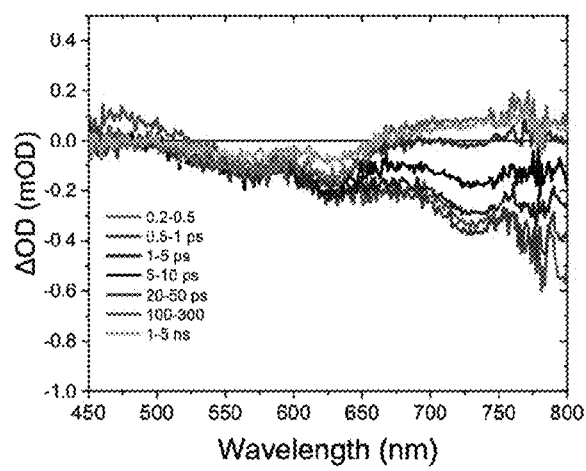
FIG. 96 is a graph showing the transient absorption spectra of PM6:Y6 7:3 NPs excited at 800 nm (4.4 µJ $cm^{-2}$) and probed at visible according to an exemplary embodiment of the present disclosure.
Figure 97:
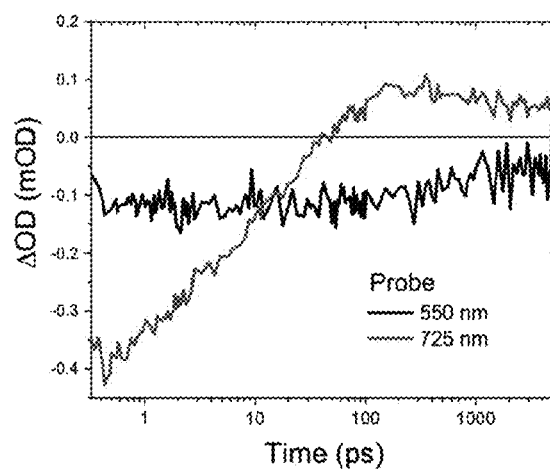
FIG. 97 is a graph showing the transient absorption kinetics of PM6:Y6 excited 800 nm probed at 550 nm and 725 nm according to an exemplary embodiment of the present disclosure.
Figure 98:
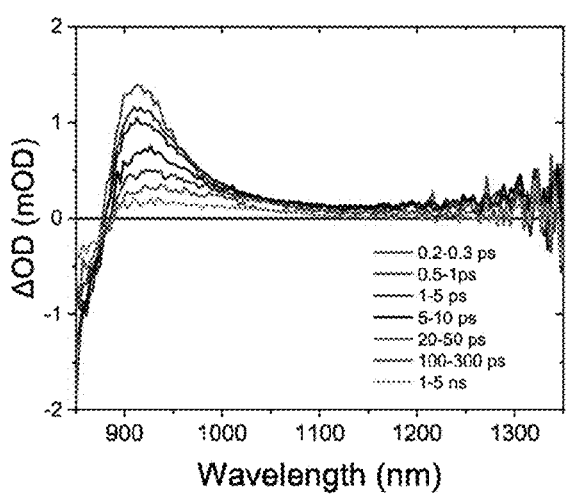
FIG. 98 is a graph showing the transient absorption spectra of PM6:Y6 NPs excited at 800 nm (4.4 µJ cm$^{-2}$) and probed at near IR region according to an exemplary embodiment of the present disclosure.
Figure 99:
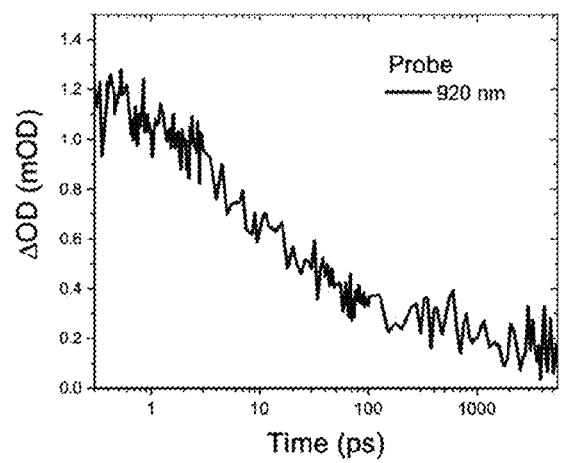
FIG. 99 is a graph showing the transient absorption kinetics of PM6:Y6 excited 800 nm probed 920 nm according to an exemplary embodiment of the present disclosure.

In PM6:PCBM NPs, shown in FIG. 59, the 1150 nm PM6 exciton absorption feature is strongly reduced in amplitude compared to neat PM6 NPs, and decays completely within 1 ps, assigned to ultrafast, sub-ps electron transfer from PM6 to PCBM, with the residual long lived absorption at this wavelength assigned to PM6[+] absorption. FIGS. 90-91 show the deconvoluted spectra and kinetics of PM6:PCBM 2:8 heterojunction NPs using global analysis (GA), respectively. In GA, PM6 exciton spectrum was fixed as the reference (taken from the TAS data of neat PM6 film probed in the NIR region) while allowing the deconvolution of the polaron species. The corresponding kinetics in FIG. 91 exhibits a fast decay of PM6 excitons and long-lived polarons. Excitation wavelength in FIGS. 90-91 are 550 nm with a fluence of 7.5 Jcm$^{-2}$. This electron transfer is >40 times faster than PM6 exciton decay to ground, indicative of a near unity exciton separation efficiency, which is in agreement with the efficient PM6 PLQ described above and shown in FIG. 53. For time delays ≥1 ps, a long-lived PIA is observed between 700 and 900 nm, assigned to PM6[+] polaron absorption, concomitant with a PM6 GSB signal. These features exhibit relatively slow, excitation density dependent kinetics, indicative of their assignment to the bimolecular recombination of separated PM6[+] and PCBM[-] species. The transient absorption kinetics of PM6:PCBM in FIG. 92 shows strong fluency dependence indicative of a bimolecular recombination processes, in agreement with efficient charge dissociation. FIG. 92 also shows that the half-times of PM6:PCBM 2:8 NPs range from 200 ps to >6 ns, as the excitation density was decreased in this range.

Figure 60:
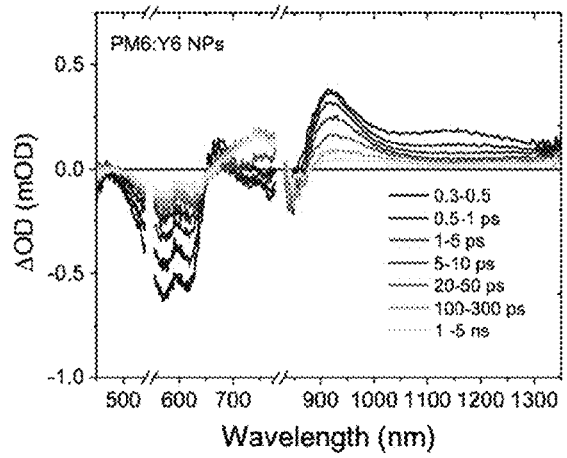
FIG. 60 is a graph showing the transient absorption spectra of PM6:Y6 7:3 NPs at different time delays, also excited at 550 nm (fluence: 7.5 μJ cm$^{-2}$) according to an exemplary embodiment of the present disclosure.

For PM6:Y6 NPs, additional features assigned to Y6 GSB at 700-850 nm and Y6 exciton absorption at 925 nm are observed, respectively, as shown in FIG. 60. FIGS. 93-99 show data employing selective Y6 excitation. The selective excitation of the Y6 at 800 nm in PM6:Y6 NP in FIGS. 96-99 showed Y6 exciton decay feature at 920 nm with decay half-time of 10 ps, similar to those observed for neat Y6 NPs in FIGS. 93-95, indicative of limited hole transfer from Y6 excitons to PM6.

Figure 100:
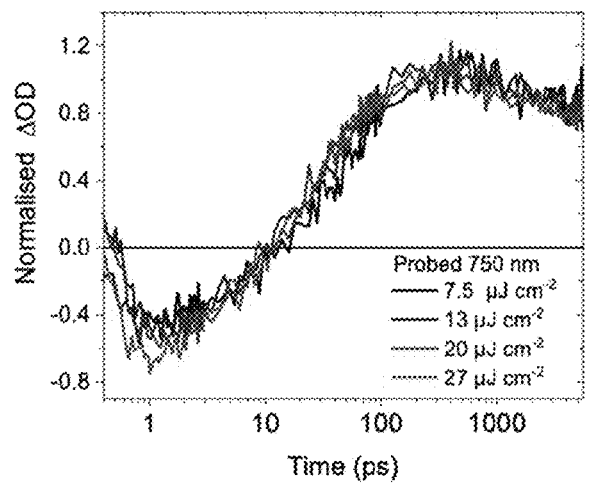
FIG. 100 is a graph showing the transient absorption decay dynamics PM6:Y6 7:3 excited at 550 nm and probed at 750 nm as a function of excitation density according to an exemplary embodiment of the present disclosure.
Figure 101:
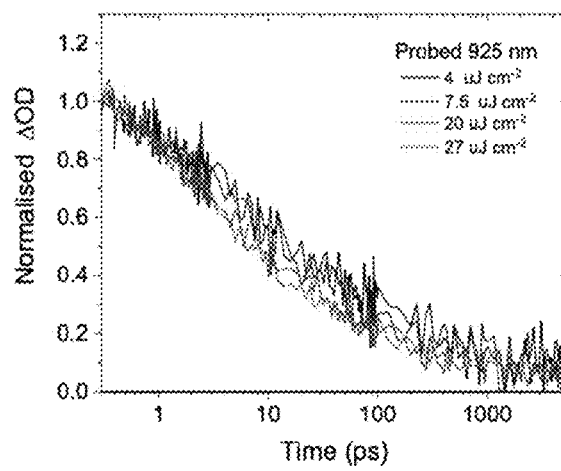
FIG. 101 is a graph showing the transient absorption decay dynamics PM6:Y6 7:3 excited at 550 nm and probed at 925 nm as a function of excitation density according to an exemplary embodiment of the present disclosure.
Figure 102:
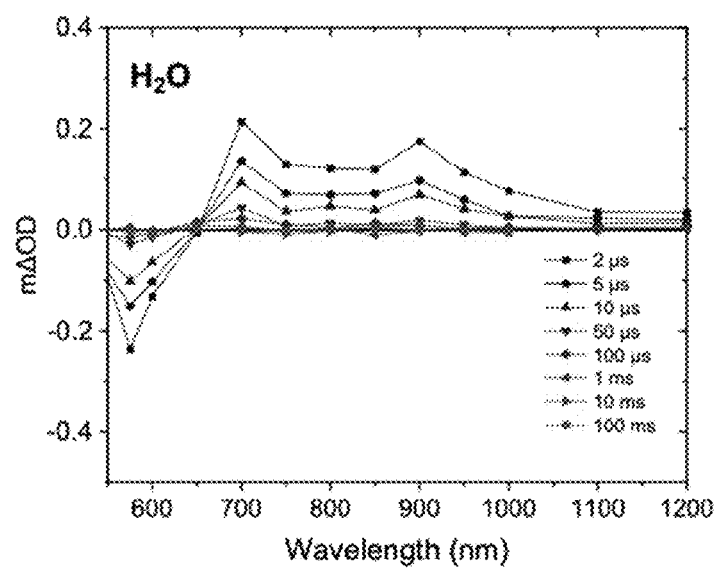
FIG. 102 is a graph showing the transient absorption spectra of PM6:PCBM 2:8 at different delays time after excitation (excited 550 nm, 250 µJ cm$^{-2}$) according to an exemplary embodiment of the present disclosure.
Figure 103:
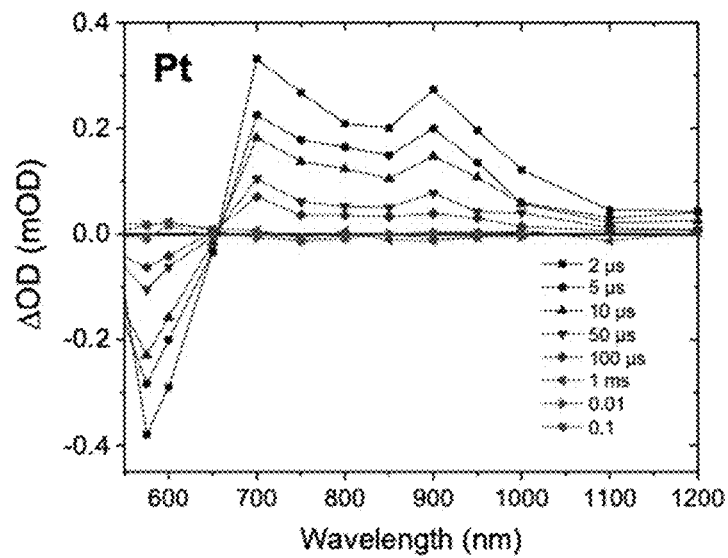
FIG. 103 is a graph showing the transient absorption spectra of PM6:PCBM 2:8 with Pt (10%) at different delays time after excitation (excited 550 nm, 250 µJ cm$^{-2}$) according to an exemplary embodiment of the present disclosure.
Figure 104:
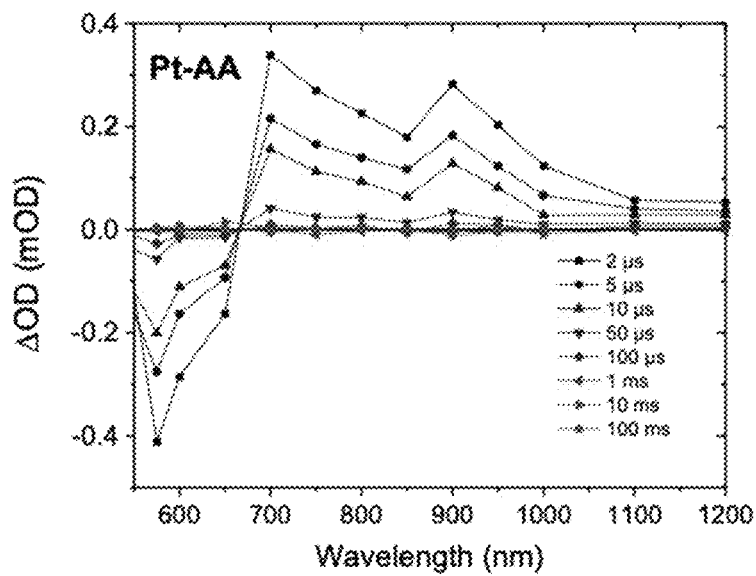
FIG. 104 is a graph showing the transient absorption spectra of PM6:PCBM 2:8 with Pt and AA (0.2 M) at different delays time after excitation (excited 550 nm, 250 µJ cm$^{-2}$) according to an exemplary embodiment of the present disclosure.
Figure 105:
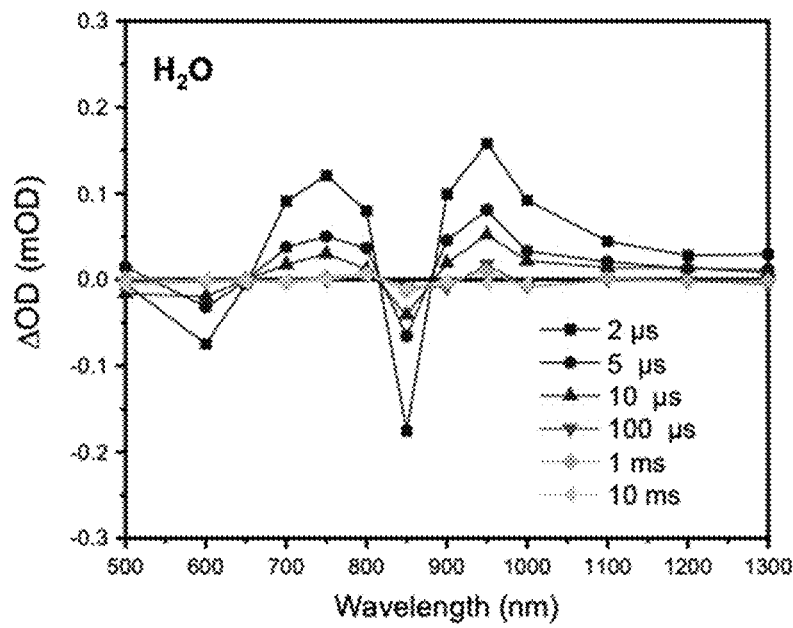
FIG. 105 is a graph showing the transient absorption spectra of PM6:Y6 7:3 at different delays time after excitation (excited 550 nm, 250 µJ cm$^{-2}$) according to an exemplary embodiment of the present disclosure.
Figure 106:
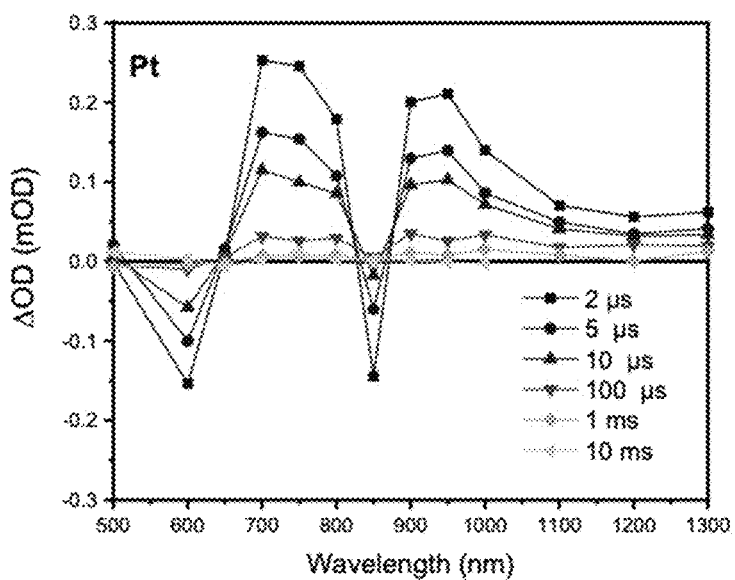
FIG. 106 is a graph showing the transient absorption spectra of PM6:Y6 7:3 with Pt (10%) at different delays time after excitation (excited 550 nm, 250 µJ cm$^{-2}$) according to an exemplary embodiment of the present disclosure.
Figure 107:
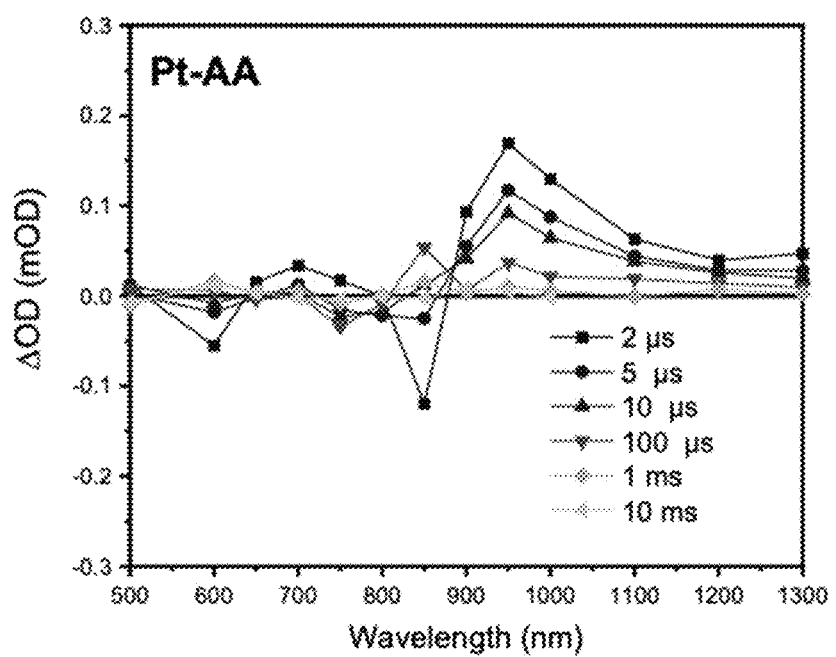
FIG. 107 is a graph showing the transient absorption spectra of PM6:Y6 7:3 with Pt and AA (0.2 M) at different delays time after excitation (excited 550 nm, 250 µJ cm$^{-2}$) according to an exemplary embodiment of the present disclosure.

PM6 exciton absorption at 1150 nm is observed to be quenched relative to neat PM6 NPs, although this quenching is less strong than for PM6:PCBM NPs, with a residual decay extending for several ps, as shown in FIGS. 59-60. This quenching is assigned to ultrafast electron and energy transfer from PM6 excitons to Y6, as indicated by the PL data discussed above. FIGS. 100-101 show transient absorption decay dynamics PM6:Y6 7:3 excited at 550 nm and probed at 750 nm and 925 nm as a function of excitation density, respectively. The transient dynamics of Y6 exciton at 925 nm exhibits a decay half-time of 10 ps at the lowest excitation density studied (4 μJ cm$^{-2}$), similar to those observed for neat Y6 NPs, assigned primarily to Y6 exciton/exciton annihilation, and indicating that hole transfer from Y6 excitons to PM6 must be slower than 10 ps, consistent with the observation of significant Y6 PL in these blends.

Figure 61:
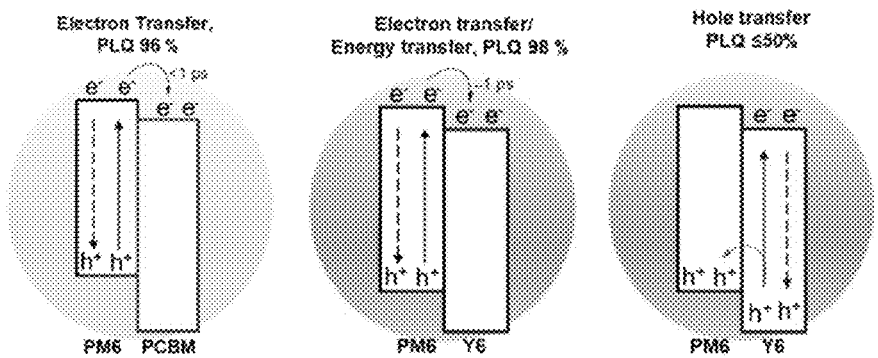
FIG. 61 is an illustration showing the schematic representation of exciton decay and electron/energy transfer processes in these NPs according to an exemplary embodiment of the present disclosure.

In one embodiment, PM6 exciton separation in PM6:PCBM NPs occurs with a near unity efficiency in less than 1 ps, as illustrated in FIG. 61. In another embodiment, PM6:Y6 NPs exhibit more complex charge generation photophysics, including energy transfer from PM6 to Y6 as well as electron and hole transfer, as also illustrated in FIG. 61, and a lower overall charge generation efficiency.

Figure 62:
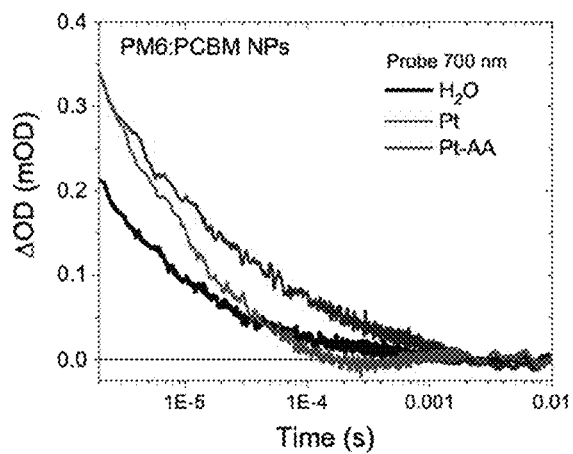
FIG. 62 is a graph showing the transient absorption decay dynamics of PM6:PCBM 2:8 NPs in water in the absence of Pt and AA (black), with Pt (blue) and in the presence of both Pt and AA (red) according to an exemplary embodiment of the present disclosure.
Figure 63:
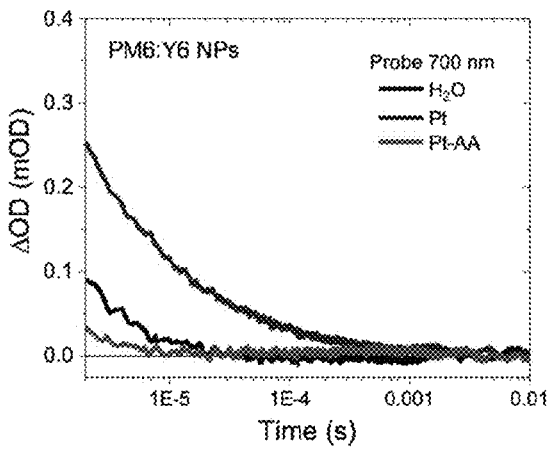
FIG. 63 is a graph showing the transient absorption decay dynamics of PM6:Y6 7:3 NPs in water in the absence of Pt and AA (black), with Pt (blue) and in the presence of both Pt and AA (red) according to an exemplary embodiment of the present disclosure.
Figure 66:
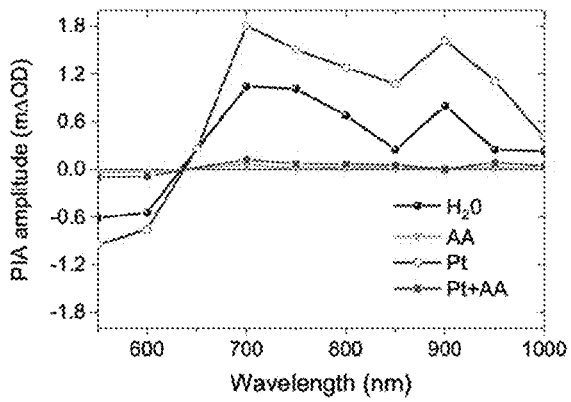
FIG. 66 is a graph showing the Photoinduced Absorption Spectroscopy (PIAS) of PM6:PCBM 2:8 measured at 4 s without and with the addition of Pt and/or AA according to an exemplary embodiment of the present disclosure.
Figure 67:
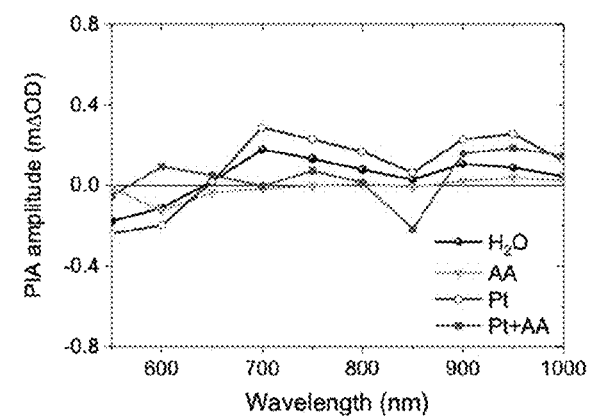
FIG. 67 is a graph showing the Photoinduced Absorption Spectroscopy (PIAS) of PM6:Y6 7:3 NPs measured at 4 s without and with the addition of Pt and/or AA according to an exemplary embodiment of the present disclosure.

In one embodiment, ultrafast transient absorption kinetics for PM6:PCBM NPs is essentially independent of the presence of Pt or AA, indicating that the kinetics of electron/hole transfer to these species occurred on longer (>6 ns) timescales. To elucidate these kinetics on longer timescales, TAS data on the ns-ms timescales were collected in the presence/absence of Pt and AA for both PM6:PCBM 2:8 and PM6:Y6 7:3 NPs. The TAS spectra are shown in FIGS. 102-107, exhibiting PM6[+] GSB at 550-650 nm and polaron absorption from 650-1050 nm, as well as, for PM6:Y6 NPs, a Y6 GSB signal at 850 nm. The corresponding kinetics at 700 nm, assigned to PM6[+], are plotted in FIGS. 62-67. In FIGS. 62-63, the NPS were excited at 550 nm (250 μJ cm$^{-2}$) and probed at 700 nm. In FIGS. 66-67, PIAS measurements were carried out under continuous LED illumination at 630 nm (20 mW cm$^{-2}$) during 4 seconds, with 0.2 mol l$^{-1}$ ascorbic acid (12 ml), and 10 μg (10 wt. %) Pt.

In one embodiment, in the absence of AA and Pt, PM6:PCBM NPs exhibit a larger amplitude and longer lived decay transient than PM6:Y6 NPs assigned to slower bimolecular recombination kinetics in the PM6:PCBM NPs, consistent with their more phase segregated core/shell structure.

In one embodiment, in the presence of Pt, both PM6:Y6 and PM6:PCBM NP systems exhibited larger amplitude, longer lived PM6[+] absorption, consistent with suppressed bimolecular recombination due to electron transfer to Pt.

In one embodiment, the further addition of AA resulted in an accelerated decay of this PM6[+] absorption, consistent with hole transfer to AA. This acceleration was most significant for PM6:Y6 NPs indicating that the lower EQE observed for these NPs does not result from slower hole scavenging by AA. For PM6:PCBM NPs, hole scavenging by AA proceeds on the 10 μs timescale, which is much slower than the kinetics of hole scavenging by triethyl amine (10 ps-1 ns) reported for other polymer photocatalysts.[58] It is striking that even with these relatively slow hole scavenging kinetics, PM6:PCBM NPs still achieve efficient solar to hydrogen conversion.

Figure 64:
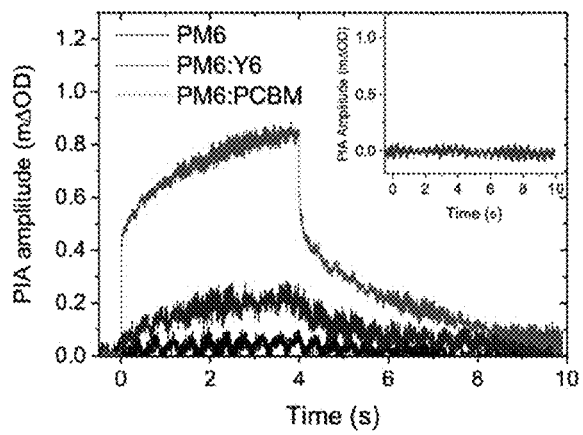
FIG. 64 is a graph showing the comparison of the PIAS kinetics of PM6, PM6:PCBM 2:8 and PM6:Y6 7:3 NPs suspensions probed at 700 nm in the absence of Pt and AA, with the insert showing equivalent data for a 2:8 spin coated PM6:PCBM film, exhibiting a negligible PIAS signal according to an exemplary embodiment of the present disclosure.
Figure 65:
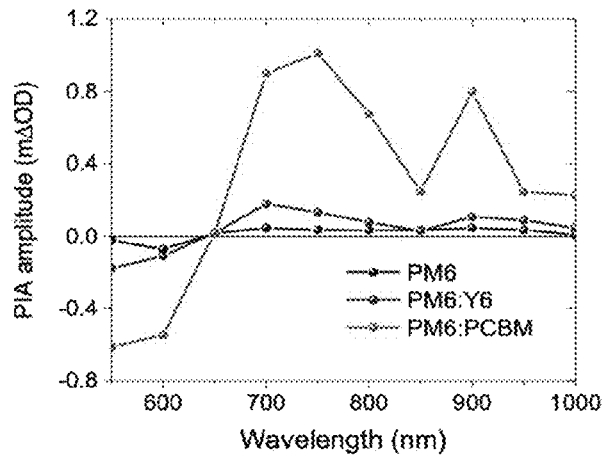
FIG. 65 is a graph showing the comparison of PIAS spectra of the same NP suspensions measured at 4 s time delay according to an exemplary embodiment of the present disclosure.

In one embodiment, the photophysics of PM6:Y6 and PM6:PCBM NPs was measured on the seconds time scale under operando conditions by using Photoinduced Absorption Spectroscopy (PIAS).[69,70] Dispersions of neat PM6, PM6:PCBM 2:8 and PM6:Y6 7:3 heterojunction NPs were irradiated with quasi-continuous LED pulses (4 s duration, 20 mW cm$^{-2}$ at 630 nm) and the change in the absorbance was recorded at different probe wavelengths, as shown in FIGS. 62-67. Remarkably, when measured under these operando conditions, both heterojunction NPs showed long lived (seconds timescale) PIAS signals even in the absence of Pt or sacrificial hole scavenger, as shown in FIG. 64. These signals shown in FIG. 65 exhibit similar spectral features to the transient absorption data shown in FIGS. 57-60 and are therefore assigned to long lived PM6$^+$ species. Negligible signals were obtained for neat PM6 NPs shown in FIGS. 64-65, confirming that these remarkably long-lived charges result from charge separation due to the heterojunctions present in the PM6:PCBM and PM6:Y6 NPs.

In one embodiment, the PM6:PCBM NPs exhibited a higher PIA amplitude than the PM6:Y6 NPs, indicative of a higher accumulation of long lived photogenerated charges in the PM6:PCBM NPs. In the presence of Pt, the PM6$^+$ PIAS signals increased in amplitude for both heterojunction nanoparticles, indicative of electron transfer to Pt increasing the accumulation of long-lived PM6$^+$ species. The addition of AA resulted in almost complete quenching of PM6$^+$ signals, indicative of efficient hole extraction in both heterojunction NPs. These observations are consistent with the TAS studies above. Moreover, the changes of PIAS signals indicate that the long-lived PIAS signals observed in the absence of AA indeed result from reactive PM6$^+$ species. We note that in PM6:Y6 nanoparticles in the presence of Pt and AA, a small residual PIAS signal was observed, as shown in FIG. 67 with a spectral shape indicative of long-lived Y6 anions unable to transfer to Pt, possibly originating from isolated Y6 domains in the NP bulk. Overall these operando PIAS data indicate that photoexcitation of both PM6:PCBM and PM6:Y6 NPs result in the accumulation of remarkably long-lived charges observable on the seconds timescale. The observation of higher charge accumulation for PM6:PCBM compared to PM6:Y6 NPs is most likely associated with their more phase segregated morphology as indicated from the TEM data, and correlates with their higher hydrogen generation EQEs measured under continuous irradiation.

In one embodiment, photoexcitation of both PM6:PCBM and PM6:Y6 heterojunction NPs results in the accumulation of remarkably long lived charges even in the absence of added electron or hole scavengers is particularly striking. These long-lived charges were not observed for PM6 NPs alone.

In one embodiment, the quasi-steady state irradiation results in the accumulation of circa 600 PM6$^{-1}$ species per PM6:PCBM NP, with an approximately three fold lower accumulation density for the PM6:Y6 NPs, from the amplitude of these signals.

In one embodiment, the H$_2$ evolution rate per NP for the PM6:PCBM NPs compared to the PM6:Y6 NPs displays a similar, 2.3 fold difference, to the accumulation of circa 600 PM6$^{-1}$ species, which is consistent with these long-lived charges being responsible for the high photocatalytic activity of the NPs.

In other single component conjugated polymer NPs, such long lived charges (in this case polymer anions) were only observed in the presence of high concentrations (typically 30% v/v) of triethylamine.[71] Similarly, long lived PIAS signals for carbon nitride photocatalysts have only been reported upon the addition of hole scavengers.[72] For metal oxides, such long lived PIAS or TAS signals are typically only observed under strong electrical bias to extract either electrons or holes, or in the presence of electron/hole scavengers or co-catalysts.[73,74] The generation of such remarkably long-lived charge carriers in both PM6:Y6 and PM6:PCBM NPs without added electron/hole scavengers can be attributed primarily to their D/A heterojunction structure which enables the spatial separation of photogenerated charges. In organic solar cells employing analogous bulk heterojunctions such as PM6:Y6, charge recombination measured operando using small perturbation techniques occurs primarily on the microsecond timescale,[54] making the observation herein of such long lived charge accumulation in our NPs even more remarkable. This conclusion is supported by no measurable long-lived charge accumulation being observed in PIAS studies of spin coated PM6:PCBM 2:8 films, as shown in the insert of FIG. 64. In any case, the ability of these heterojunction NPs to generate long lived charges is likely to be critical to their high performance in the presence of the relatively slow hole scavenger ascorbic acid.

In one embodiment, PM6:Y6 and PM6:PCBM NPs NPs have applications in driving alternative, kinetically slow and technologically more desirable oxidations, or in water splitting Z-schemes where they could be interfaced with a range of O$_2$ evolution photocatalysts using a suitable redox mediator.[39]

Performance Comparison

Figure 68:
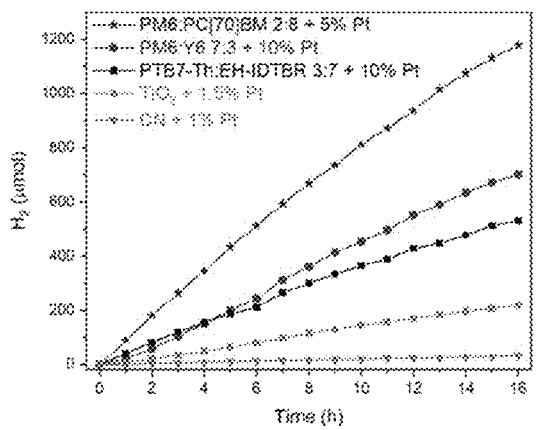
FIG. 68 is a graph showing the performance comparison reflected by $H_2$ evolution vs. time over 16 h of the optimized PM6:Y6 7:3 and PM6:PCBM 2:8 NPs compared to a range of benchmark photocatalysts according to an exemplary embodiment of the present disclosure.
Figure 69:
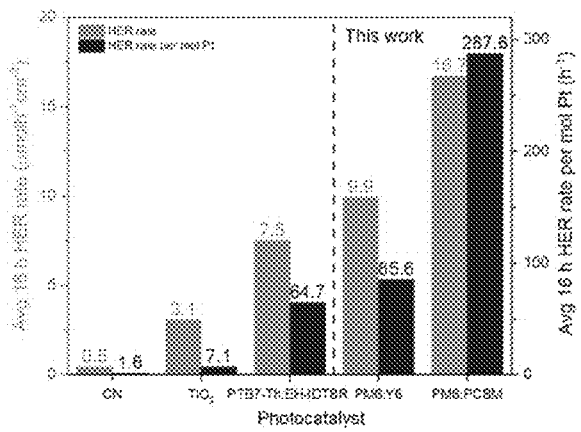
FIG. 69 is a graph showing the performance comparison reflected by average HER rates and Pt turnover frequencies over 16 h of the optimized PM6:Y6 7:3 and PM6:PCBM 2:8 NPs compared to a range of benchmark photocatalysts according to an exemplary embodiment of the present disclosure.
Figure 70:
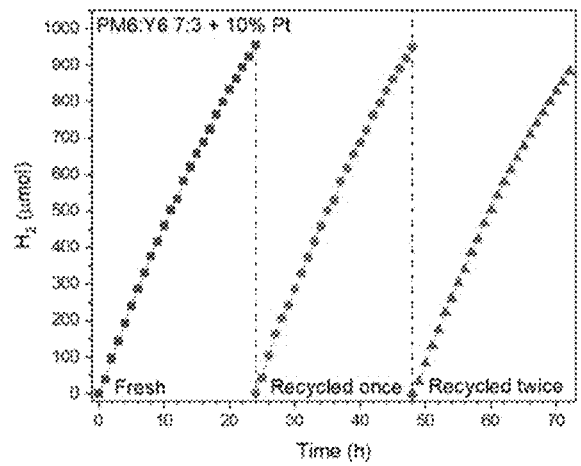
FIG. 70 is a graph showing the 72 h $H_2$ evolution stability tests of PM6:Y6 7:3 NPs loaded with 10 wt. % Pt according to an exemplary embodiment of the present disclosure.
Figure 71:
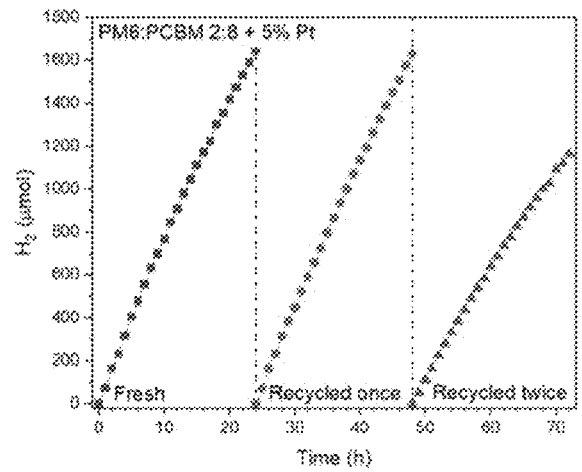
FIG. 71 is a graph showing the 72 h $H_2$ evolution stability tests of PM6:PCBM 2:8 NPs loaded with 5 wt. % Pt according to an exemplary embodiment of the present disclosure.
Figure 72:
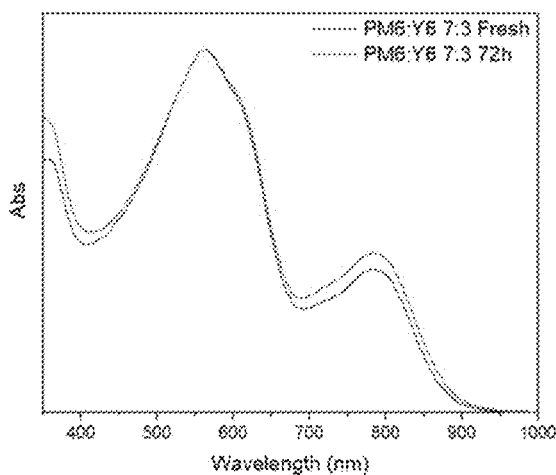
FIG. 72 is a graph showing the normalized absorption spectra before and after 72 h of $H_2$ evolution of PM6:Y6 7:3 NPs according to an exemplary embodiment of the present disclosure.
Figure 73:
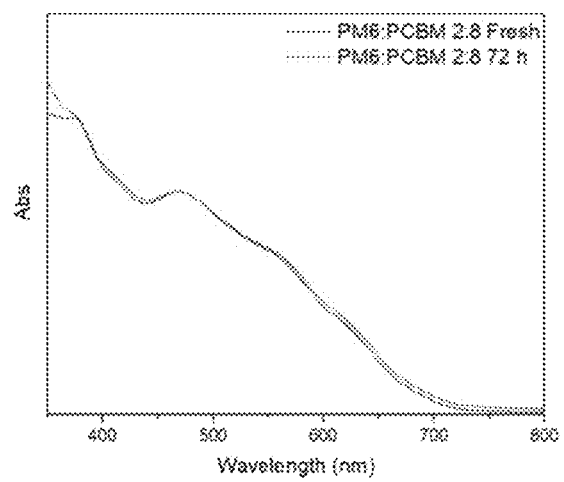
FIG. 73 is a graph showing the normalized absorption spectra before and after 72 h of $H_2$ evolution of PM6:PCBM 2:8 NPs according to an exemplary embodiment of the present disclosure.

In one embodiment, the HER rates of the optimized PM6:Y6 7:3 and PM6:PCBM 2:8 NPs were higher compared to a range of benchmark HEPs, with the comparison data shown in FIGS. 68-69. H$_2$ evolution was measured under AM1.5g irradiation at 100 mWcm$^{-2}$ (1 sun intensity) and the HER rates were normalized to the illumination area rather than to the photocatalyst mass. This is intended to aid the comparison of the data presented in present disclosure with those measured by other research groups. In FIGS. 68-69, the experiment conditions were: PM6:Y6 7:3, PM6:PCBM 2:8, and PTB7-Th:EH-IDTBR: 1 mg photocatalyst, 12 ml 0.2 mol l$^{-1}$ ascorbic acid (AA). P25 TiO$_2$ and CN: 50 mg photocatalyst, 12 ml 10% triethanolamine (TEOA). The desired Pt loading was achieved by adding a specific amount of K$_2$PtCl$_6$ to the photocatalyst suspension. All measurements were performed under AM1.5g irradiation at an intensity of 100 mWcm$^{-2}$ and an illumination area of 4.4±0.1 cm$^2$. Note: To ensure a fair comparison, all the photocatalysts were measured in the same reactor using an identical illumination area and the amount of photocatalyst was adjusted to ensure that there was 0% light transmission within the absorption range of the photocatalyst. The Pt loadings for TiO$_2$ (1.5%),[75] CN (1%),[76] and PTB7-Th:EH-IDTBR (10%)[45] were chosen based on previously reported optima. The HER rates are higher for TiO$_2$ and CN with TEOA instead of AA as the sacrificial hole scavenger.[45] The Pt normalized HER rates were calculated based on the total amount of Pt added to the reactor.

In one embodiment, the average HER rates over 16 h of the optimized PM6:Y6 7:3 and PM6:PCBM 2:8 NPs (9.9±1.0 μmolh$^{-1}$ cm$^{-2}$ and 16.7±1.6 μmolh-1 cm-2 respectively) were almost 20 higher than that of commercial CN (0.5±0.1 μmolh-1 cm-2), over 3 times higher than that of P25 TiO$_2$ (3.1±0.1 μmolh$^{-1}$ cm$^{-2}$), and 1.3 times greater than that of PTB7-Th:EHIDTBR NPs (7.5±0.1 molh$^{-1}$ cm$^2$), an efficient organic HEP.[45] In a preferred embodiment, the average HER rates over 16 h of the optimized PM6:Y6 7:3 and PM6:PCBM 2:8 NPs (9.9±1.0 μmolh$^{-1}$ cm$^{-2}$ and 16.7±1.6 μmolh-1 cm-2 respectively) were over 30 times higher than that of commercial CN (0.5±0.1 μmolh-1 cm-2), over 5 times higher than that of P25 $TiO_2$ (3.1±0.1 µmolh$^{-1}$ cm$^{-2}$), and 2.2 times greater than that of PTB7-Th:EHIDTBR NPs (7.5±0.1 µmolh$^{-1}$ cm$^{-2}$).

In one embodiment, the optimized PM6:PCBM NPs utilize the Pt co-catalyst more efficiently than the PM6:Y6 NPs or any of the benchmark photocatalysts, as evidenced by their greatly enhanced HER rates per mole of Pt. This can be attributed to the efficient generation of long lived charges in the PM6:PCBM heterojunction as detailed above and their relatively low (5 wt. %) optimum Pt loading.

In one embodiment, organic semiconductor NP $H_2$ evolution photocatalysts composed of PM6:Y6 and PM6:PCBM blends were developed.

In a preferred embodiment, the optimized PM6:Y6 NPs achieved a HER rate of 9.9 µmolh$^{-1}$ cm$^2$ (43.9 mmolh$^{-1}$ g$^{-1}$) and were active from 400 nm to 900 nm. The optimized PM6:PCBM NPs achieved EQEs of 8.7% to 6.6% at 400 to 620 nm and a HER rate of 16.7 µmol$^{-1}$ cm$^{-2}$ (73.7 mmolh$^{-1}$ g$^{-1}$) under a light intensity of 1 sun.

Photophysical characterization using a combination of TAS and PIAS revealed that efficient exciton dissociation took place at the D/A heterojunctions within the NPs, leading to the accumulation of remarkably long lived photogenerated charges even in the absence of added Pt or AA. These charges were efficiently extracted upon the addition of the Pt co-catalyst and AA, which suggests that they were responsible for the photocatalytic activity of the NPs. The PM6:PCBM NPs exhibited faster charge generation and greater long-lived charge accumulation than the PM6:Y6 NPs, with the latter attributed to their more phase segregated nanomorphology more effectively retarding charge recombination. This is consistent with their higher EQEs compared to the PM6:Y6 NPs. These results demonstrate that organic photocatalysts that contain a D/A heterojunction can intrinsically dissociate excitons to generate long-lived, reactive charges without relying on rapid reductive exciton quenching by a sacrificial reagent to drive charge separation.[71,77,78] This marks an important step towards designing efficient organic photocatalysts that can operate without the aid of undesirable sacrificial reagents.

Having described the many embodiments of the present disclosure in detail, it will be apparent that modifications and variations are possible without departing from the scope of the invention defined in the appended claims. Furthermore, it should be appreciated that all examples in the present disclosure, while illustrating many embodiments of the invention, are provided as non-limiting examples and are, therefore, not to be taken as limiting the various aspects so illustrated.

It is intended that the invention not be limited to the particular embodiment disclosed herein contemplated for carrying out this invention, but that the invention will include all embodiments falling within the scope of the claims.

EXAMPLES

Example 1

Materials

PM6 and Y6 were purchased from 1 material. PC71BM was purchased from Ossila. Sodium 2-(3-thienyl)ethyloxybutylsulfonate (TEBS) was purchased from Solaris Chem. All materials were used without further purification.

Example 2

Nanoparticle Fabrication

Individual stock solutions (0.50 mg/mL) of PM6, Y6, and $PC_{71}BM$ were prepared in chloroform. The solutions were heated overnight (80° C.) to ensure complete dissolution and filtered (0.2 µm PTFE). Nanoparticle precursor solutions were prepared from the stock solutions by mixing them in the ratio of the desired nanoparticle composition. 5 mL of the nanoparticle precursor solution was then added to a 0.5 wt. % solution of sodium 2-(3-thienyl)ethyloxybutylsulfonate (TEBS) in MilliQ® water (10 mL), and stirred vigorously for 15 min at 40° C. to form a pre-emulsion, which was then sonicated for 5 min with an ultrasonic processor (Sonics® VibraCell™ VCX130PB) to form a mini-emulsion. The mini-emulsion was heated at 85° C. under a stream of air to remove the chloroform, leaving a surfactant stabilised nanoparticle dispersion in water.

Example 3

Dynamic Light Scattering (DLS)

The size distribution of each nanoparticle batch was measured by dynamic light scattering (DLS, Malvern Panalytical®, Zetasizer® ZS). FIGS. 20 and 21 show that all NP batches had unimodal size distributions and that the Zavg hydrodynamic diameter within each series remained relatively constant. This is important when comparing HER rates between nanoparticles with different compositions because NP size affects the total available surface area, which may affect the HER rate. Having samples with similar size distributions minimizes this variation and allows the effects of nanoparticle composition and morphology to be isolated.

DLS parameters of PM6:Y6 NPs formed from a range of PM6:Y6 blend ratios are shown in Table below:

| Sample | Z-Average diameter (nm) | Dispersity |
| --- | --- | --- |
| PM6 | 82.94 | 0.180 |
| PM6:Y6 9:1 | 84.63 | 0.186 |
| PM6:Y6 8:2 | 83.03 | 0.187 |
| PM6:Y6 7:3 | 101.6 | 0.272 |
| PM6:Y6 6:4 | 93.58 | 0.221 |
| PM6:Y6 5:5 | 87.35 | 0.189 |
| PM6:Y6 4:6 | 99.00 | 0.283 |
| Y6 | 83.12 | 0.188 |

DLS parameters of PM6:PCBM NPs formed from a range of PM6:PCBM blend ratios are shown in Table below:

| Sample | Z-Average diameter (nm) | Dispersity |
| --- | --- | --- |
| PM6 | 83.45 | 0.197 |
| PM6:PC$_{71}$BM 7:3 | 89.59 | 0.175 |
| PM6:PC$_{71}$BM 6:4 | 85.25 | 0.154 |
| PM6:PC$_{71}$BM 5:5 | 83.09 | 0.146 |
| PM6:PC$_{71}$BM 4:6 | 84.23 | 0.167 |
| PM6:PC$_{71}$BM 3:7 | 91.64 | 0.125 |
| PM6:PC$_{71}$BM 2:8 | 86.71 | 0.114 |
| PM6:PC$_{71}$BM 1:9 | 84.67 | 0.124 |
| PC$_{71}$BM | 82.52 | 0.121 |

Example 4

Energy Level Measurement Using UPS-IPES

Ultraviolet photoelectron spectroscopy (UPS) and inverse photoemission spectroscopy (IPES) were conducted within the same interconnected UHV (10 −10 mbar) Scienta Omicron® multi-probe system, with UPS measured first and then IPES. Samples were prepared by spincoating (4000 rpm, 2-5 mg/ml) in a nitrogen glove box on freshly evaporated Au/Si(100) and transferred to vacuum mounted in electrical contact to Omicron style plates. UPS was conducted with a He(1) vacuum ultraviolet source (focus) with and a Sphere II hemispherical electron analyser with a 7-channeltron detector, with a 5 eV pass energy. Samples were recorded under a negative bias of 9.97 V to observe the secondary electron cut-off. IPES was recorded in a home-built system which consisted of a spherical chamber, which housed: a manipulator to hold the sample and apply a retarding bias of 20 V, an internal electron source gun (Staib®) with a BaO cathode, with a 0.25-0.5 energy dispersion, internal lens collimator in which light can pass through a quartz window into an assembly of a further lens, band pass filter (280 nm, 4.43 eV) and solid state PMT detector (Hammatsu). Spectra were acquired by ramping the electron source energy in the range of 20-30 eV and monitoring the raw PMT intensity. The Ef position and analyzer work function was calibrated by measuring the Ef step-edge of a clean Ar+ Au film, the spectra were merged on the same binding energy scale (w.r.t local surface vacuum level) by taking into account the measured work functions in UPS and electron affinity measured in IPES. The energetic onsets (HOMO, LUMO) were determined by an approximate linear extrapolation at the edge of the spectra. Uncertainty is estimated at 0.05 eV for UPS and 0.05-0.1 eV for IPES.

Example 5

Energy Level Measurement Using Photoelectron Emission Spectroscopy in Air (PESA) and UV-Visible Absorption Spectroscopy Measurements were carried out on thin films of the individual semiconductors spin coated on plasma cleaned glass substrates. The semiconductor workfunction (corresponding to the HOMO energy level) was measured by PESA using a Riken AC-2 Photoelectron Spectrometer. The semiconductor band gap (Eg) was estimated from the absorption onset (2) measured using an Agilent® Cary 5000 UV-Vis-NIR spectrometer using Equation 1. The semiconductor LUMO energy level was estimated using Equation 2.

Eg (eV)=1240/λ(nm)   Equation 1:

LUMO (eV)=HOMO (eV)−Eg (eV)   Equation 2:

Example 6

CryoTEM

Cryo Transmission Electron Microscopy (cryoTEM) of the samples was carried out with a Titan Krios 80-300 TEM from Thermo Fisher Scientifi®, USA. This microscope is optimized for carrying out cryoTEM analysis of liquid samples. It is also equipped with an energy-filter of model GIF Quantum 968 from Gatan®, Inc., USA, underneath the column to filter the energy-loss electrons to improve the contrast in the acquired images. Moreover, behind the GIF column, a highly sensitive direct electron complementary metal oxide semiconductor (CMOS) camera of model K2, also from Gatan®, Inc., USA, was installed for the recording of high-resolution images at extremely low electron dose conditions (~1 e/Å2). Specimen preparation of samples for cryoTEM analysis was carried out by using an automated plunge-freezing tool of model Vitrobot™ Mark-IV. Moreover, the specimens were prepared with a special type of copper TEM-grid of model Quantifoil™ MultiA. These grids have a carbon layer with various size holes and were chosen with a purpose of varying ice-thickness in the holes. In this way, the chance of organic particles being present in the specimen was dramatically higher than with the single hole-size carbon containing grid. Each specimen was prepared by placing 3.5 micro-litre of solution onto grids followed by 1 second of blotting-time and plunge-freezing into liquid ethane cryogen. The cryoTEM analysis was performed by setting the microscope at the accelerating voltage of 300 kV. Prior to the analysis, the microscope as well as GIF were aligned to have higher quality images. Furthermore, the images were recorded under so called dose-fractionation conditions. In fact, instead of acquiring a single frame with total electron beam exposure time, the images were acquired in stacks that contained frames whose exposure time was more than ten times smaller than the total exposure time. The acquired stacks were then aligned and summed along z-direction in order to have final images. This exercise of image-recording ensured higher quality images of organic particles with as minimum damage as possible. The total electron dose given to images, acquired at low-magnifications (<50,000×) was kept below 10 e/Å2. Whereas, higher magnification images (>100,000×) received the electron dose of about 20 e/Å2 so as to maintain a good signal-to-noise condition. It is to be noted that the entire image acquisition as well as processing was performed using Gatan® Microscopy Suite of version 3.2.

Example 7

Hydrogen Evolution

Hydrogen evolution was measured using ascorbic acid (AA) as a sacrificial electron donor. Nanoparticles (1 mg) in 0.2 M AA (12 mL, pH 2.4) were loaded into a recirculating batch reactor (illumination area=4.4±0.1 cm$^2$) which has been previously reported.[30] The desired Pt loading was achieved by adding a specific amount of aqueous potassium hexachloroplatinate solution (0.401 mg/mL Pt). The reactor was evacuated and purged with Ar 5 times to remove oxygen, and the pressure was set to 100 Torr. The suspension was stirred and illuminated with a solar simulator (Asahi Max 303) fitted with a UV-IR mirror module and an AM1.5g filter. The light intensity at the sample surface was adjusted to 100 mWcm$^{-2}$ (1 sun) before each experiment using a calibrated reference solar cell (Newport 91150V) and H$_2$ evolution was quantified by a gas chromatograph equipped with a thermal conductivity detector. An opaque insert with a cuboid shaped cavity that holds the nanoparticle suspension under the light beam was used to accurately quantify the illumination area. The length of each side of the cross section of the cavity was 2.1±0.04 cm. The cross-sectional area of the cavity, which also corresponds to the illumination area of the sample, was 4.4±0.1 cm$^2$. The dimensions of the cross section of the cavity were chosen to be similar to those of the calibrated silicon photodiode (2.0×2.0 cm) used to calibrate the intensity of the light source to 1 sun. This ensures that any inhomogeneities in the light intensity within the illumination area are accounted for when calibrating the light intensity because the output of the photodiode is dependent on the total photon flux on its surface.

Example 8

EQE Measurements

EQE measurements were carried out in the same way as hydrogen evolution measurements, but with suitable band pass filters fitted to the light source. The sample was first illuminated under simulated solar light for 3 h to complete Pt photodeposition. Then the reactor was evacuated and purged with Ar 5 times to remove all the $H_2$ evolved during this time. The light source was fitted with a band pass filter, and the photocatalyst was illuminated with filtered light within a narrow wavelength range. The EQE was calculated using Equation 3, where $nH_2$ represents the number of moles of $H_2$ evolved per hour, and n photons represents the total number of photons incident on the sample surface (Illumination area=4.4±0.1 $cm^2$) per hour. Photon flux was measured using a calibrated spectrometer (Ocean Optics® USB2000 calibrated with an Ocean Optics® DH3-plus light source) fitted with a fibre optic cable and a 0.4778 $cm^2$ cosine corrector.

$$\text{EQE (\%)}=2n\ H_2\times 100\%/n\ \text{photons} \qquad \text{Equation 3:}$$

Example 9

Absorption and Photoluminescence (PL) Spectra

The absorption spectra were recorded in an Agilent® Cary 60 UV-Vis. The PL spectra of PM6:Y6 blends were recorded using and integrated Andor® DU420A-BEX2-DD camera, KY193 spectrograph and Avantes® integrating sphere system. This system has a quantum efficiency (EQE) over 20% in the range of 650 nm to 900 nm, by combing the detector (iDus® 420 BEX2-DD, EQE over 90%) and the grating (SR2-GRT-0300-1000). The PL system is calibrated by a Avantes® AvaLight-HAL-CAL-ISP50-MINI light sources with known spectrum. Collimated Laser Diode Modules (CPS532 and CPS780, THORLABS®) were used as excitation source at 532 nm (33.4 mW $cm^{-2}$) and 780 nm (33.6 mW $cm^{-2}$). All NPs suspensions were prepared in water with an absorbance of 0.05 at the excitation wavelength to ensure equal numbers of absorbed photons.

The PL spectra of PM6:Y6 blends were recorded using and integrated Andor® DU420A-BEX2-DD camera, KY193 spectrograph and Avantes® integrating sphere system. This system has a quantum efficiency (EQE) over 20% in the range of 650 nm to 900 nm, by combing the detector (iDus® 420 BEX2-DD, EQE over 90%) and the grating (SR2-GRT-0300-1000). The PL system is calibrated by a Avantes® AvaLight-HAL-CAL-ISP50-MINI light sources with known spectrum. Collimated Laser Diode Modules (CPS532 and CPS780, THORLABS®) were used as excitation source at 532 nm (33.4 mW $cm^{-2}$) and 780 nm (33.6 mW $cm^{-2}$). All NPs suspensions were prepared in water with an absorbance of 0.05 at the excitation wavelength to ensure equal numbers of absorbed photons.

Example 10

Transient Absorption Spectroscopy (TAS)

Ultrafast TAS analysis of heterojunction nanoparticles dispersed in water was carried out by using a amplified Ti:sapphire laser (Solstice®, Spectra Physics®), with a 800 nm laser pulse (<200 fs, 1 kHz repetition rate). The laser pulse is divided into the pump and the probe by using a beam splitter. The pump laser at the excitation wavelength used is generated through an optical parametric amplifier (TOPAS Prime, Light Conversion) and a frequency mixer (NirUVis, Light Conversion). The probe pulse at specific time delays is generated through a mechanical delay stage, which delay it by an adjustable period (maximum of 6 ns) relative to pump pulse. The continuous white light probe in the visible (450-800 nm) or NIR (850-1400 nm) region is generated by focusing the probe pulse into a sapphire crystal. Then, the probe pulse is divided before the sample into two pulses, one is directed to the sample and the other is used as the reference. Both pulses are directed to separated multichannel spectrometer (Si or InGaAs sensor). The continuum probe pulse on the samples is spatially overlapped with the pump pulse. The pump pulse is chopped by a synchronized chopper with a frequency of 500 Hz. Pulse energies were measured using an energy meter (OPHIR® Photonics, VEGA P/N 7Z01560) with a 500 µm diameter aperture. The samples were measured in Argon atmosphere. All suspensions were measured at equal numbers of absorbed photons, with an absorbance of 0.6 at the excitation wavelength.

Microsecond—Second TAS was carried out by using a Nd:YAG laser (OPOTEK Opolette 355 II, 6 ns pulse width), which generates UV pulses (355 nm) or visible/NIR pulses (410-2200 nm). The probe beam is generated from a 100 W quartz halogen lamp and sequentially directed through the sample and then to a monochromator before directed it onto a Si photodiode detector (Hamamatsu S1722-01). Pump pulses are directed to the sample through a liquid light guide and are overlapped with the probe beam at the position of the sample. Data acquisitions are triggered by scattered laser light using a photodiode. Appropriate long pass filters are positioned before the sample and between the sample and the detector to attenuate scattered laser light. A home-built LabVIEW-based software package was used to acquire the data on two different time scales simultaneously: the microsecond—millisecond signal is sampled using an oscilloscope (Tektronix® DPO 3012) after amplification (Costronics 2011 amplifier), whereas the millisecond—second signal is sampled without amplification using a DAQ card (National Instruments® USB-6361). Pulse energies were measured using an energy meter (OPHIR® Photonics, VEGA P/N 7Z01560). All NPs suspensions were measured at equal numbers of absorbed photons, with an absorbance of 0.6 at the excitation wavelength and in an Argon atmosphere.

Example 11

Photoinduced Absorption Spectroscopy (PIAS)

PIAS analysis were carry out on modified microsecond—second TAS setup. A high-power LED (Cree LED®, XLamp® XP-E XPERED-L1-0000-00801, 630 nm) was used as excitation source, which is driven by a high-precision DC power supply (TTi QL564P). The LED is directed to the sample through liquid light guide. Light pulses are generated via a MOSFET transistor (STMicroelectronics® STF8NM5ON) and the gate is modulated by the DAQ card (National Instruments®, USB-6361). All data were sampled without prior amplification using the DAQ card. Excitation fluences were measured with a digital power meter (Thorlabs® PM100), using a silicon photodiode power sensor (Thorlabs® S120UV).

All the PIA kinetics were measured at the same conditions, 635 nm LED excitation and fluency 20 mWcm$^{-2}$. The NPs suspensions were prepared at equal numbers of absorbed photons (absorbance of 0.6 at the excitation wavelength) and measured in Argon atmosphere. The conditions were optimized to obtain improved signal-to-noise ratio in NPs samples under normal catalytic conditions, however measurement artifact was observed in the kinetics of NPs with low intensity PIA signals (PM6 and PM6:Y6 NPs).

Figure 86:
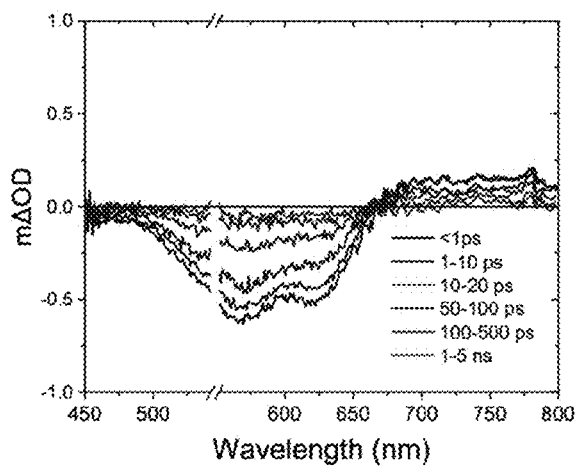
FIG. 86 is a graph showing transient absorption spectra of neat PM6 excited at 550 nm (4.4 µJ $cm^{-2}$) and probed at visible region according to an exemplary embodiment of the present disclosure.
Figure 87:
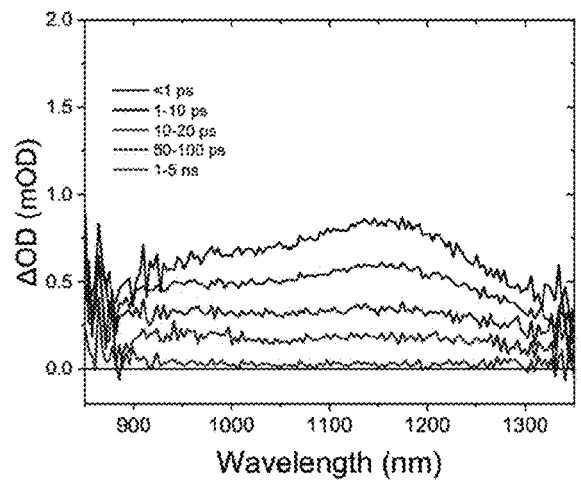
FIG. 87 is a graph showing transient absorption spectra of neat PM6 excited at 550 nm (4.4 µJ $cm^{-2}$) and probed at near IR region according to an exemplary embodiment of the present disclosure.

The accumulated charge density was estimated by using the Beer-Lambert law relation $A=\varepsilon.c.l$, where A is the absorbance measured in the PIAS spectra, and $\varepsilon$ is the extinction coefficient (estimated at 600 nm to be 31500 $M^{-1}$ $cm^{-1}$ from the magnitude of the PM6 ultrafast transient absorption spectra in FIG. 86), c is the concentration of charges and l is the optical path (1 cm). This was converted to the charges/NP by using the solution absorption relative to a 100 nm thick spin coated donor/acceptor film and an NP radius of 40 nm. There is approximately a factor of 2 uncertainty in this estimate, due to uncertainty in the excitation spot size used to determine a Example 12

Calculation of H Calculation of $H_2$ Evolution Rate Per Nanoparticle Evolution Rate Per Nanoparticle
Assumptions:
  All NPs have a diameter of 80±20 nm
  Density of PM6 and Y6=1.0±0.2 g $cm^{-3}$
  Density of PCBM=1.5±0.2 g $cm^{-3}$
  1±0.05 mg of NPs in reactor
  PM6/PCBM HER rate=73.3±7 μmol/h=0.020±0.002 μmol/s=1.20±0.1×$10^{16}$ molecules/s
  PM6/Y6 HER rate=43.9±4 μmol/h=0.012±0.001 μmol/s=7.2±0.7×$10^{15}$ molecules/s
PM6:PCBM 2:8
  NP density=((2×1±0.2)+(1.5±0.2×8))/10=1.4±0.16 g $cm^{-3}$=1.4±0.16×$10^6$ g $m^{-3}$
  Volume of 1 NP=(4/3)pix(40±10×$10^{-9}$)$^3$=2.68±2.01× $10^{-22}$ $m^3$
  Total NP volume=1±0.05×$10^{-3}$ g/1.4±0.16×$10^6$ g $m^{-3}$=7.14±0.89×$10^{-10}$ $m^3$
  NP number=7.14±0.89×$10^{-10}$ $m^3$/2.68±2.01×$10^{-22}$ $m^3$=2.67±2.03×$10^{12}$
  $H_2$ evolution rate per NP=1.20±0.1×$10^{16}$ molecules/s/2.67±2.03×$10^{12}$ NPs=4.51±3.45×$10^3$ molecules $H_2 s^{-1} NP^{-1}$
PM6:Y6 7:3
  NP density=1.0±0.2×$10^6$ g $m^{-3}$
  Volume of 1 NP=(4/3)pix(40±10×$10^{-9}$)$^3$=2.68±2.01× $10^{-22}$ $m^3$
  Total NP volume=1±0.05×$10^{-3}$ g/1.0±0.2×$10^6$ g $m^{-3}$=1.0±0.21×$10^{-9}$ $m^3$
  NP number=1.0±0.21×$10^{-9}$ $m^3$/2.68±2.01×$10^{-22}$ $m^3$=3.73±2.91×$10^{12}$
  $H_2$ evolution rate per NP=7.23±0.7×$10^{15}$ molecules/s/3.73±2.91×$10^{12}$ NPs=1.94±1.52×$10^3$ molecules $H_2 s^{-1} NP^{-1}$
Note: The uncertainty in the particle size is the main factor contributing to the uncertainties in the $H_2$ evolution rates per NP.

REFERENCES

The following references are referred to above and are incorporated herein by reference:
1. Buriak, J. M. Your Research Results Look Compelling, but Are They Reliable? *Chem. Mater.* 2014, 26, 2211-2213.
2. Rajeshwar, K.; Thomas, A.; Janaky, C. Photocatalytic Activity of Inorganic Semiconductor Surfaces: Myths, Hype, and Reality. *J. Phys. Chem. Lett.* 2015, 6, 139-147.
3. Kisch, H. Semiconductor Photocatalysis☐Mechanistic and Synthetic Aspects. *Angew. Chem., Int. Ed.* 2013, 52, 812-847.
4. Snaith, H. J. The perils of solar cell efficiency measurements. *Nat. Photonics* 2012, 6, 337-340.
5. Coridan, R. H.; Nielander, A. C.; Francis, S. A.; McDowell, M. T.; Dix, V.; Chatman, S. M.; Lewis, N. S. Methods for comparing the performance of energy-conversion systems for use in solar fuels and solar electricity generation. *Energy Environ. Sci.* 2015, 8, 2886-2901.
6. Hodes, G. Photoelectrochemical Cell Measurements: Getting the Basics Right. *J. Phys. Chem. Lett.* 2012, 3, 1208-1213.
7. Buriak, J. M.; Kamat, P. V.; Schanze, K. S. Best Practices for Reporting on Heterogeneous Photocatalysis. *ACS Appl. Mater. Interfaces* 2014, 6, 11815-11816.
8. Serpone, N.; Sauve, G.; Koch, R.; Tahiri, H.; Pichat, P.; Piccinini, P.; Pelizzetti, E.; Hidaka, H. Standardization protocol of process efficiencies and activation parameters in heterogeneous photocatalysis: relative photonic efficiencies. *J. Photochem. Photobiol., A* 1996, 94, 191-203.
9. Rajeshwar, K. Solar Energy Conversion and Environmental Remediation Using Inorganic Semiconductor—Liquid Interfaces: The Road Traveled and the Way Forward. *J. Phys. Chem. Lett.* 2011, 2, 1301-1309.
10. Braslaysky, S. E.; Braun, A. M.; Cassano, A. E.; Emeline, A. V.; Litter, M. I.; Palmisano, L.; Parmon, V. N.; Serpone, N. Glossary of terms used in photocatalysis and radiation catalysis (IUPAC Recommendations 2011). *Pure Appl. Chem.* 2011, 83, 931-1014.
11. ISO 10678, 2010.
12. Kudo, A.; Miseki, Y. Heterogeneous photocatalyst materials for water splitting. *Chem. Soc. Rev.* 2009, 38, 253-278.
13. Chen, Z.; Dinh, H. N.; Miller, E. *Photoelectrochemical Water Splitting Standards, Experimental Methods, and Protocols*; Springer: New York, 2013 (EBook).
14. Takanabe, K.; Domen, K. Toward Visible Light Response: Overall Water Splitting Using Heterogeneous Photocatalysts. *Green* 2011, 1, 313-322.
15. Chen, Z.; Jaramillo, T. F.; Deutsch, T. G.; Kleiman-Shwarsctein, A.; Forman, A. J.; et al. Accelerating materials development for photoelectrochemical hydrogen production: Standards for methods, definitions, and reporting protocols. *J. Mater. Res.* 2010, 25, 3-16.
16. Bisquert, J.; Gimenez, S. *Photoelectrochemical Solar Fuel Production: From Basic Principles to Advanced Devices*; Springer: New York, 2016 (EBook).
17. Kisch, H. On the Problem of Comparing Rates or Apparent Quantum Yields in Heterogeneous Photocatalysis. *Angew. Chem., Int. Ed.* 2010, 49, 9588-9589.
18. Kisch, H.; Bahnemann, D. Best Practice in Photocatalysis: Comparing Rates or Apparent Quantum Yields. *J. Phys. Chem. Lett.* 2015, 6, 1907-1910.
19. Liu, X.; Zhao, L.; Domen, K.; Takanabe, K. Photocatalytic hydrogen production using visible-light-responsive $Ta_3N_5$ photo-catalyst supported on monodisperse spherical $SiO_2$ particulates. *Mater. Res. Bull.* 2014, 49, 58-65.
20. Kandiel, T. A.; Takanabe, K. Solvent-induced deposition of Cu—Ga—In—S nanocrystals onto a titanium dioxide surface for visible-light-driven photocatalytic hydrogen production. *Appl. Catal., B* 2016, 184, 264-269.
21. Yamakata, A.; Yoshida, M.; Kubota, J.; Osawa, M.; Domen, K. Potential-Dependent Recombination Kinetics of Photogenerated Electrons in n- and p-Type GaN Photoelectrodes Studied by Time-Resolved IR Absorption Spectroscopy. *J. Am. Chem. Soc.* 2011, 133, 11351-11357.

22. Yoshida, M.; Yamakata, A.; Takanabe, K.; Kubota, J.; Osawa, M.; Domen, K. ATR-SEIRAS Investigation of the Fermi Level of Pt Cocatalyst on a GaN Photocatalyst for Hydrogen Evolution under Irradiation. *J. Am. Chem. Soc.* 2009, 131, 13218-13219.
23. Townsend, T. K.; Browning, N. D.; Osterloh, F. E. Overall photocatalytic water splitting with $NiO_x$—$SrTiO_3$-A revised mechanism. *Energy Environ. Sci.* 2012, 5, 9543-9550.
24. Garcia-Esparza, A. T.; Takanabe, K. A simplified theoretical guideline for overall water splitting using photocatalyst particles. *J. Mater. Chem. A* 2016, 4, 2894-2908.
25. Yu, W.; Isimjan, T.; Gobbo, S. D.; Anjum, D. H.; Abdel-Azeim, S.; Cavallo, L.; Garcia-Esparza, A. T.; Domen, K.; Xu, W.; Takanabe, K. Tethering Metal Ions to Photocatalyst Particulate Surfaces by Bifunctional Molecular Linkers for Efficient Hydrogen Evolution. *ChemSusChem* 2014, 7, 2575-2583.
26. Bhunia, M. K.; Melissen, S.; Panda, M. R.; Sarawade, P.; Basset, J.-M.; Anjum, D. H.; Mohammed, O. F.; Sautet, P.; Le Bahers, T.; Takanabe, K. Denritic Tip-on Polytriazine-Based Carbon Nitride Photocatalyst with High Hydrogen Evolution Activity. *Chem. Mater.* 2015, 27, 8237-8247.
27. Buriak, J. M.; Jones, C. W.; Kamat, P. V.; Schanze, K. S.; Schatz, G. C.; Scholes, G. D.; Weiss, P. S. Virtual Issue on Best Practices for Reporting the Properties of Materials and Devices. *Chem. Mater.* 2016, 28, 3525-3526.
28. Schneider, J.; Bahnemann, D. W. Undesired Role of Sacrificial Reagents in Photocatalysis. *J. Phys. Chem. Lett.* 2013, 4, 3479-3483.
29. Ohtani, B. Preparing Articles on Photocatalysis Beyond the Illusions, Misconceptions, and Speculation. *Chem. Lett.* 2008, 37, 216-229.
30. Hoffert, M. I. et al. Advanced technology paths to global climate stability: energy for a greenhouse planet. *Science* 298, 981-7 (2002).
31. Mills, A. D. & Wiser, R. H. Strategies to mitigate declines in the economic value of wind and solar at high penetration in California. *Appl. Energy* 147, 269-278 (2015).
32. Creutzig, F. et al. The underestimated potential of solar energy to mitigate climate change. *Nat. Energy* 2, 17140 (2017). 33. Ball, M. & Weeda, M. The hydrogen economy—Vision or reality? *Int. J. Hydrogen Energy* 40, 7903-7919 (2015).
34. Jia, J. et al. Solar water splitting by photovoltaic-electrolysis with a solar-to-hydrogen efficiency over 30%. *Nat. Commun.* 7, 13237 (2016).
35. Grätzel, M. Photoelectrochemical cells. *Nature vol.* 414 338-344 (2001).
36. Pinaud, B. A. et al. Technical and economic feasibility of centralized facilities for solar hydrogen production via photocatalysis and photoelectrochemistry. *Energy Environ. Sci.* 6, 1983 (2013).
37. Fabian, D. M. et al. Particle suspension reactors and materials for solar-driven water splitting. *Energy Environ. Sci.* 8, 2825-2850 (2015).
38. Hisatomi, T., Kubota, J. & Domen, K. Recent advances in semiconductors for photocatalytic and photoelectrochemical water splitting. *Chem. Soc. Rev.* 43, 7520-7535 (2014).
39. Ng, B. et al. Z—Scheme Photocatalytic Systems for Solar Water Splitting. *Adv. Sci.* 7, 1903171 (2020).
40. FUJISHIMA, A. & HONDA, K. Electrochemical Photolysis of Water at a Semiconductor Electrode. *Nature* 238, 37-38 (1972).
41. Takata, T. et al. Photocatalytic water splitting with a quantum efficiency of almost unity. *Nature* 581, 411-414 (2020).
42. Maeda, K. & Domen, K. Photocatalytic Water Splitting: Recent Progress and Future Challenges. *J. Phys. Chem. Lett.* 1, 2655-2661 (2010).
43. Kosco, J., Moruzzi, F., Willner, B. & McCulloch, I. Photocatalysts Based on Organic Semiconductors with Tunable Energy Levels for Solar Fuel Applications. *Adv. Energy Mater.* 10, 2001935 (2020).
44. Dai, C. & Liu, B. Conjugated polymers for visible-light-driven photocatalysis. *Energy Environ. Sci.* 13, 24-52 (2019).
45. Kosco, J. et al. Enhanced photocatalytic hydrogen evolution from organic semiconductor heterojunction nanoparticles. *Nat. Mater.* 19, 559-565 (2020).
46. Liu, A. et al. Panchromatic Ternary Polymer Dots Involving Sub-Picosecond Energy and Charge Transfer for Efficient and Stable Photocatalytic Hydrogen Evolution. *J. Am. Chem. Soc.* jacs.0c12654 (2021) doi:10.1021/jacs.0c12654.
47. Bai, Y. et al. Accelerated Discovery of Organic Polymer Photocatalysts for Hydrogen Evolution from Water through the Integration of Experiment and Theory. *J. Am. Chem. Soc.* 141, 9063-9071 (2019).
48. Landfester, K. The Generation of Nanoparticles in Miniemulsions. *Adv. Mater.* 13, 765-768 (2001).
49. Yuan, J. et al. Single-Junction Organic Solar Cell with over 15% Efficiency Using Fused-Ring Acceptor with Electron-Deficient Core. *Joule* 3, 1140-1151 (2019).
50. Pan, M.-A. et al. 16.7%-efficiency ternary blended organic photovoltaic cells with PCBM as the acceptor additive to increase the open-circuit voltage and phase purity. *J. Mater. Chem. A* 7, 20713-20722 (2019).
51. Wadsworth, A., Hamid, Z., Kosco, J., Gasparini, N. & McCulloch, I. The Bulk Heterojunction in Organic Photovoltaic, Photodetector, and Photocatalytic Applications. *Advanced Materials vol.* 32 2001763 (2020).
52. Wang, X. et al. Sulfone-containing covalent organic frameworks for photocatalytic hydrogen evolution from water. *Nat. Chem.* 10, 1180-1189 (2018).
53. Trasatti, S. The absolute electrode potential: an explanatory note (Recommendations 1986). 1 Electroanal. *Chem. Interfacial Electrochem.* 209, 417-428 (1986).
54. Wu, J. et al. Exceptionally low charge trapping enables highly efficient organic bulk heterojunction solar cells. *Energy Environ. Sci.* 13, 2422-2430 (2020).
55. Wenderich, K. & Mul, G. Methods, Mechanism, and Applications of Photodeposition in Photocatalysis: A Review. *Chem. Rev.* 116, 14587-14619 (2016).
56. Kosco, J. et al. The Effect of Residual Palladium Catalyst Contamination on the Photocatalytic Hydrogen Evolution Activity of Conjugated Polymers. *Adv. Energy Mater.* 1802181 (2018) doi:10.1002/aenm.201802181.
57. Ran, J., Zhang, J., Yu, J., Jaroniec, M. & Qiao, S. Z. Earth-abundant cocatalysts for semiconductor-based photocatalytic water splitting. *Chemical Society Reviews vol.* 43 7787-7812 (2014).
58. Sachs, M. et al. Understanding structure-activity relationships in linear polymer photocatalysts for hydrogen evolution. *Nat. Commun.* 9, 4968 (2018).
59. Kotani, H. et al. Efficient Near-Infrared Light-Driven Hydrogen Evolution Catalyzed by a Saddle-Distorted Porphyrin as a Photocatalyst. *ACS Appl. Energy Mater.* 3, 3193-3197 (2020).
60. Jiang, W. et al. Integration of Multiple Plasmonic and Co-Catalyst Nanostructures on TiO2 Nanosheets for Visible-Near-Infrared Photocatalytic Hydrogen Evolution. *Small* 12, 1640-1648 (2016).
61. Wang, P., Huang, B., Dai, Y. & Whangbo, M. H. Plasmonic photocatalysts: Harvesting visible light with noble metal nanoparticles. *Physical Chemistry Chemical Physics vol.* 14 9813-9825 (2012).
62. Jie Lv et al. Additive-induced miscibility regulation and hierarchical morphology enable 17.5% binary organic solar cells. *Energy Environ. Sci.* 14, 3044-3052 (2021).
63. Li, R. et al. Spatial separation of photogenerated electrons and holes among {010} and {110} crystal facets of BiVO 4. *Nat. Commun.* 4, 1-7 (2013).
64. Dimitrov, S. D. et al. Towards optimisation of photocurrent from fullerene excitons in organic solar cells. *Energy Environ. Sci.* 7, 1037-1043 (2014).
65. Cook, S., Furube, A., Katoh, R. & Han, L. Estimate of singlet diffusion lengths in PCBM films by time-resolved emission studies. *Chem. Phys. Lett.* 478, 33-36 (2009).
66. Karki, A. et al. The role of bulk and interfacial morphology in charge generation, recombination, and extraction in non-fullerene acceptor organic solar cells. *Energy Environ. Sci.* 13, 3679-3692 (2020).
67. Wang, R. et al. Charge Separation from an Intra-Moiety Intermediate State in the High-Performance PM6:Y6 Organic Photovoltaic Blend. *J. Am. Chem. Soc.* 142, 12751-12759 (2020).
68. Wang, K. et al. Interplay between Intrachain and Interchain Excited States in Donor—Acceptor Copolymers. *J. Phys. Chem. B* 125, 7470-7476 (2021).
69. Le Formal, F. et al. Rate Law Analysis of Water Oxidation on a Hematite Surface. *J. Am. Chem. Soc.* 137, 6629-6637 (2015).
70. Francàs, L., Mesa, C. A., Pastor, E., Le Formal, F. & Durrant, J. R. Chapter 5 Rate Law Analysis of Water Splitting Photoelectrodes. in *Advances in Photoelectrochemical Water Splitting: Theory, Experiment and Systems Analysis* 128-162 (The Royal Society of Chemistry, 2018). doi:10.1039/9781782629863-00128.
71. Sachs, M. et al. Tracking Charge Transfer to Residual Metal Clusters in Conjugated Polymers for Photocatalytic Hydrogen Evolution. *J. Am. Chem. Soc.* 142, 14574-14587 (2020).
72. Yang, W. et al. Electron Accumulation Induces Efficiency Bottleneck for Hydrogen Production in Carbon Nitride Photocatalysts. *J. Am. Chem. Soc.* 141, 11219-11229 (2019).
73. Pendlebury, S. R. et al. Dynamics of photogenerated holes in nanocrystalline $\alpha$-$Fe_2O_3$ electrodes for water oxidation probed by transient absorption spectroscopy. *Chem. Commun.* 47, 716-718 (2011).
74. Collado, L. et al. Unravelling the effect of charge dynamics at the plasmonic metal/semiconductor interface for $CO_2$ photoreduction. *Nat. Commun.* 9, 4986 (2018).
75. Maeda, K. et al. Photocatalytic Activities of Graphitic Carbon Nitride Powder for Water Reduction and Oxidation under Visible Light. *J. Phys. Chem. C* 113, 4940-4947 (2009).
76. Haselmann, G. M. & Eder, D. Early-Stage Deactivation of Platinum-Loaded TiO2 Using In Situ Photodeposition during Photocatalytic Hydrogen Evolution. *ACS Catal.* 7, 4668-4675 (2017).
77. Rodenberg, A. et al. Mechanism of photocatalytic hydrogen generation by a polypyridyl-based cobalt catalyst in aqueous solution. *Inorg. Chem.* 54, 646-657 (2015).
78. Lin, W.-C. et al. Effect of energy bandgap and sacrificial agents of cyclopentadithiophene-based polymers for enhanced photocatalytic hydrogen evolution. *Appl. Catal. B: Environ.* 298, 120577 (2021).

All documents, patents, journal articles and other materials cited in the present application are incorporated herein by reference.

While the present disclosure has been disclosed with references to certain embodiments, numerous modifications, alterations, and changes to the described embodiments are possible without departing from the sphere and scope of the present disclosure, as defined in the appended claims. Accordingly, it is intended that the present disclosure is not limited to the described embodiments, but that it has the full scope defined by the language of the following claims, and equivalents thereof.

What is claimed is:

1. A photocatalytic reactor comprising:
a lid;
a gas tight seal;
prism shaped cavity;
a glass enclosure; and
at least one of a photocatalyst solution, gel, powder, film or suspension,
wherein the at least one of the photocatalyst solution, gel, powder, film or suspension is placed inside the prism shaped cavity,
wherein the lid is disposed above the glass enclosure with the gas tight seal disposed between the lid and the glass enclosure to ensure that the photocatalytic reactor is gas-tight,
wherein the gas tight seal maintains the pressures within the photocatalytic reactor in a range of approximately 1-759 mmHg.

2. The photocatalytic reactor recited in claim 1, further comprising a magnetic stirring bar for stirring a mixture with a magnetic stirrer.

3. The photocatalytic reactor recited in claim 2, wherein the photocatalytic reactor is stirred from below.

4. The photocatalytic reactor recited in claim 1, further comprising a heating, cooling, and/or thermostatic device placed at the bottom of the reactor.

5. The photocatalytic reactor recited in claim 4, wherein the photocatalytic reactor is configured to be cooled from below.

6. The photocatalytic reactor recited in claim 1, wherein the photocatalytic reactor comprises a light source.

7. The photocatalytic reactor recited in claim 6, wherein a photocatalyst distribution throughout the cross-section of a light beam emanating from the light source is homogenous.

8. The photocatalytic reactor recited in claim 6, wherein the photocatalytic reactor is illuminated from the light source.

9. The photocatalytic reactor recited in claim 6, wherein the photocatalytic reactor is configured such that no condensation forms on an optical glass window at the top of the reactor, leaving a condensation free light path to a sample.

10. The photocatalytic reactor recited in claim 6, wherein the light source has substantially homogenous light intensity throughout an illumination area, and
wherein substantially 100% of the photocatalyst is illuminated substantially 100% of the time with light of a known spectrum and intensity.

11. The photocatalytic reactor recited in claim 6, wherein the light source is selected from a group consisting of a solar simulator, xenon lamp fitted with a bandpass filter, and a light emitting diode.

12. The photocatalytic reactor recited in claim 6, wherein the light source is configured to align a generally straight vertical light path through a center of the prism-shaped cavity.

13. The photocatalytic reactor recited in claim 6, further comprising a reference cell placed within the prism-shaped cavity, wherein a top surface of the reference cell is perpendicular with a generally straight vertical light path emanating from the light source.

14. The photocatalytic reactor recited in claim 13, wherein the reference cell has the same dimensions as the shape of the base of the prism-shaped cavity.

15. The photocatalytic reactor recited in claim 1, further comprising:
   a polytetrafluoroethylene (PTFE) insert having a prism-shaped cavity, a top surface, and a bottom surface with openings on both the top and bottom surfaces.

16. The photocatalytic reactor recited in claim 15, wherein the cross-section of the cavity of the PTFE insert is selected from a group of geometrical shapes consisting of a square, a circle, and octagon, a star, and a triangle.

17. The photocatalytic reactor recited in claim 15, wherein the cross-section of the cavity of the PTFE insert is approximately 2 mm×2 mm square to 1000 mm×1000 mm square.

18. The photocatalytic reactor recited in claim 15, further comprising a reference cell placed within the prism-shaped cavity of the PTFE insert, wherein a top surface of the reference cell is perpendicular with a generally straight vertical light path emanating from a light source.

19. The photocatalytic reactor recited in claim 18, wherein the reference cell has the same dimensions as the cross-section of the prism-shaped cavity of the PTFE insert.

20. The photocatalytic reactor recited in claim 1, wherein the photocatalyst is at least one organic semiconductor photocatalysts.

21. The photocatalytic reactor recited in claim 1, wherein the photocatalyst is nanoparticles (NPs) comprising of hetero-conjugated electron donor/acceptor (D/A).

22. The photocatalytic reactor recited in claim 1, wherein the photocatalyst is nanoparticles (NPs) comprising of conjugated polymer PM6 electron donors matched with PCBM or Y6 electron acceptors.

23. The photocatalytic reactor recited in claim 1, wherein the photocatalyst powder is at least one selected from the group consisting of $TiO_2$, $SrTiO_3$, $BiVO_4$, carbon nitride, conjugated microporous polymers, covalent organic frameworks, metal organic frameworks, hybrid perovskites and combination thereof.

24. The photocatalytic reactor recited in claim 1, wherein the photocatalyst film is at least one selected from the group consisting of $TiO_2$, $SrTiO_3$, $BiVO_4$, solid solutions, carbon nitride, conjugated microporous polymers, covalent organic frameworks, metal organic frameworks, hybrid perovskites such as methylammonium lead iodide, conjugated polymer films, Z-scheme photocatalytic sheets and combination thereof.

25. The photocatalytic reactor recited in claim 1, wherein the photocatalyst gel is at least one selected from the group consisting of conjugated polymer hydrogels, self-assembled supramolecular gels, hydrogels encapsulating the photocatalyst powder and combination thereof.

26. The photocatalytic reactor recited in claim 1, wherein the photocatalyst solution is at least one selected from the group consisting of solutions of water soluble conjugated polymers or conjugated small molecules, solutions containing photosensitizers and combination thereof.

* * * * *